(12) United States Patent
Cooper et al.

(10) Patent No.: US 11,806,648 B1
(45) Date of Patent: Nov. 7, 2023

(54) FILTER ASSEMBLY

(71) Applicant: WHIRLPOOL CORPORATION, Benton Harbor, MI (US)

(72) Inventors: David P. Cooper, Dowagiac, MI (US); Mark C. Graff, Michigan City, IN (US); James C. L. Guarino, Kalamazoo, MI (US); Chad Rotter, Saugatuck, MI (US); Daniel Louis Sigmund, Golden, CO (US); Steven J. Kuehl, Sylva, NC (US); Joseph R. Peters, St. Joseph, MI (US); Justin Glasgow, Sulphur Springs, TX (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 18/308,305

(22) Filed: Apr. 27, 2023

Related U.S. Application Data

(63) Continuation of application No. PCT/IB2022/054007, filed on Apr. 29, 2022.

(60) Provisional application No. 63/182,175, filed on Apr. 30, 2021.

(51) Int. Cl.
*B01D 35/30* (2006.01)
*B01D 15/30* (2006.01)

(52) U.S. Cl.
CPC .......... *B01D 15/30* (2013.01); *B01D 2201/16* (2013.01); *B01D 2201/302* (2013.01)

(58) Field of Classification Search
CPC ................ B01D 35/30; B01D 2201/16; B01D 2201/302

USPC ................... 210/232, 97, 130, 440–444, 455
See application file for complete search history.

(56) References Cited

U.S. PATENT DOCUMENTS

| | | | |
|---|---|---|---|
| 4,935,135 | A | 6/1990 | Nakashima et al. |
| 5,019,251 | A | 5/1991 | Sundolm |
| 5,826,854 | A | 10/1998 | Janvrin et al. |
| 6,024,869 | A | 2/2000 | Stifelman |
| 6,355,177 | B2 | 3/2002 | Senner et al. |
| 6,423,222 | B1 | 7/2002 | Shively et al. |
| 6,555,000 | B2 | 4/2003 | Knight |
| 6,685,829 | B1 | 2/2004 | Baumann et al. |
| 7,000,894 | B2 | 2/2006 | Olson et al. |
| 7,067,054 | B2 | 6/2006 | Fritze |
| 7,147,773 | B2 | 12/2006 | Mitchell et al. |
| 7,186,338 | B2 | 3/2007 | Boisvert |
| 7,360,658 | B2 | 4/2008 | Clausen et al. |
| 7,442,301 | B2 | 10/2008 | Huda |
| 7,610,932 | B2 | 11/2009 | Olson et al. |
| 7,763,170 | B2 | 7/2010 | Bassett et al. |

(Continued)

FOREIGN PATENT DOCUMENTS

| CN | 109126264 A | 1/2019 |
|---|---|---|
| GB | 2188399 B | 6/1990 |

(Continued)

*Primary Examiner* — Madeline Gonzalez
(74) *Attorney, Agent, or Firm* — Price Heneveld LLP

(57) ABSTRACT

A filter unit includes a body portion that receives a water filter. An engaging portion is coupled to the body portion. A bypass actuator rotates relative to the engaging portion to rotationally and axially operate a bypass valve of a fluid manifold. The bypass actuator drives axial engagement of the engaging portion with a valve assembly of the fluid manifold. The bypass actuator extends through the body portion and the engaging portion.

20 Claims, 67 Drawing Sheets

(56) References Cited

U.S. PATENT DOCUMENTS

| | | | |
|---|---|---|---|
| 8,097,156 B2 | 1/2012 | Tubby et al. | |
| 8,097,157 B2 | 1/2012 | Tubby et al. | |
| 8,097,158 B2 | 1/2012 | Tubby et al. | |
| 8,127,934 B2 * | 3/2012 | Stamey, Jr. | B01D 35/147 |
| | | | 210/438 |
| 8,137,551 B1 | 3/2012 | Huda et al. | |
| 8,202,419 B2 | 6/2012 | Wallerstorfer et al. | |
| 8,354,024 B2 | 1/2013 | Ihle et al. | |
| 8,366,930 B2 | 2/2013 | Huda et al. | |
| 8,627,675 B2 | 1/2014 | Kruckenberg et al. | |
| 8,673,146 B2 | 3/2014 | Huda et al. | |
| 8,709,246 B2 | 4/2014 | Branscomb | |
| 8,911,623 B2 | 12/2014 | Tubby et al. | |
| 9,044,699 B2 | 6/2015 | Gale et al. | |
| 9,061,225 B2 | 6/2015 | Sherman et al. | |
| 9,067,154 B1 | 6/2015 | Branscomb et al. | |
| 9,233,322 B1 | 1/2016 | Huda et al. | |
| 9,320,993 B2 | 4/2016 | Patera et al. | |
| 9,345,995 B2 | 5/2016 | Tubby et al. | |
| 9,452,375 B2 | 9/2016 | Mitchell | |
| 9,527,021 B2 | 12/2016 | Gatica et al. | |
| 9,687,762 B2 | 6/2017 | Tubby et al. | |
| D795,390 S | 8/2017 | Huda et al. | |
| 9,737,834 B1 | 8/2017 | Baird | |
| 9,789,424 B2 | 10/2017 | Reckin et al. | |
| 9,845,259 B2 | 12/2017 | Williams et al. | |
| 9,885,445 B2 | 2/2018 | Joung et al. | |
| 9,901,852 B2 | 2/2018 | Huda et al. | |
| 9,931,589 B2 | 4/2018 | Tubby et al. | |
| 9,987,572 B2 | 6/2018 | Mitchell et al. | |
| 9,993,757 B2 | 6/2018 | Joung et al. | |
| 10,010,817 B2 | 7/2018 | Honermann et al. | |
| 10,010,820 B1 | 7/2018 | Kruckenberg et al. | |
| 10,040,703 B2 | 8/2018 | Huda et al. | |
| 10,071,326 B2 | 9/2018 | Schmoll | |
| 10,179,303 B2 | 1/2019 | Honermann et al. | |
| 10,357,728 B2 | 7/2019 | Ardes | |
| 10,500,530 B2 | 12/2019 | Park et al. | |
| 10,525,387 B2 | 1/2020 | Campbell | |
| 10,532,296 B1 | 1/2020 | Keenan | |
| 10,590,006 B2 | 3/2020 | Baird et al. | |
| 10,639,570 B2 | 5/2020 | You et al. | |
| 10,682,593 B2 | 6/2020 | Baird | |
| 10,702,814 B2 | 7/2020 | Honermann et al. | |
| 2007/0012611 A1 | 1/2007 | An | |
| 2007/0199879 A1 | 8/2007 | Bors et al. | |
| 2007/0227959 A1 | 10/2007 | Sinur et al. | |
| 2008/0185330 A1 | 8/2008 | Sinur et al. | |
| 2012/0031515 A1 | 2/2012 | Whitaker | |
| 2014/0238919 A1 | 8/2014 | Shaffer | |
| 2016/0304359 A1 | 10/2016 | Cur et al. | |
| 2017/0056794 A1 | 3/2017 | Chernov et al. | |
| 2017/0259195 A1 | 9/2017 | Mitchell | |
| 2017/0361252 A1 | 12/2017 | Vogt et al. | |
| 2018/0008916 A1 | 1/2018 | Krause et al. | |
| 2019/0038813 A1 | 2/2019 | Prosl | |
| 2020/0256478 A1 | 8/2020 | Schmitt et al. | |

FOREIGN PATENT DOCUMENTS

| | | |
|---|---|---|
| GB | 2257052 A | 1/1993 |
| JP | H11138151 A | 5/1999 |
| WO | 2004096409 A1 | 11/2004 |
| WO | 20070620915 A1 | 6/2007 |
| WO | 2010033470 A2 | 3/2010 |
| WO | 2013138287 A1 | 9/2013 |
| WO | 2020084424 A1 | 4/2020 |

* cited by examiner

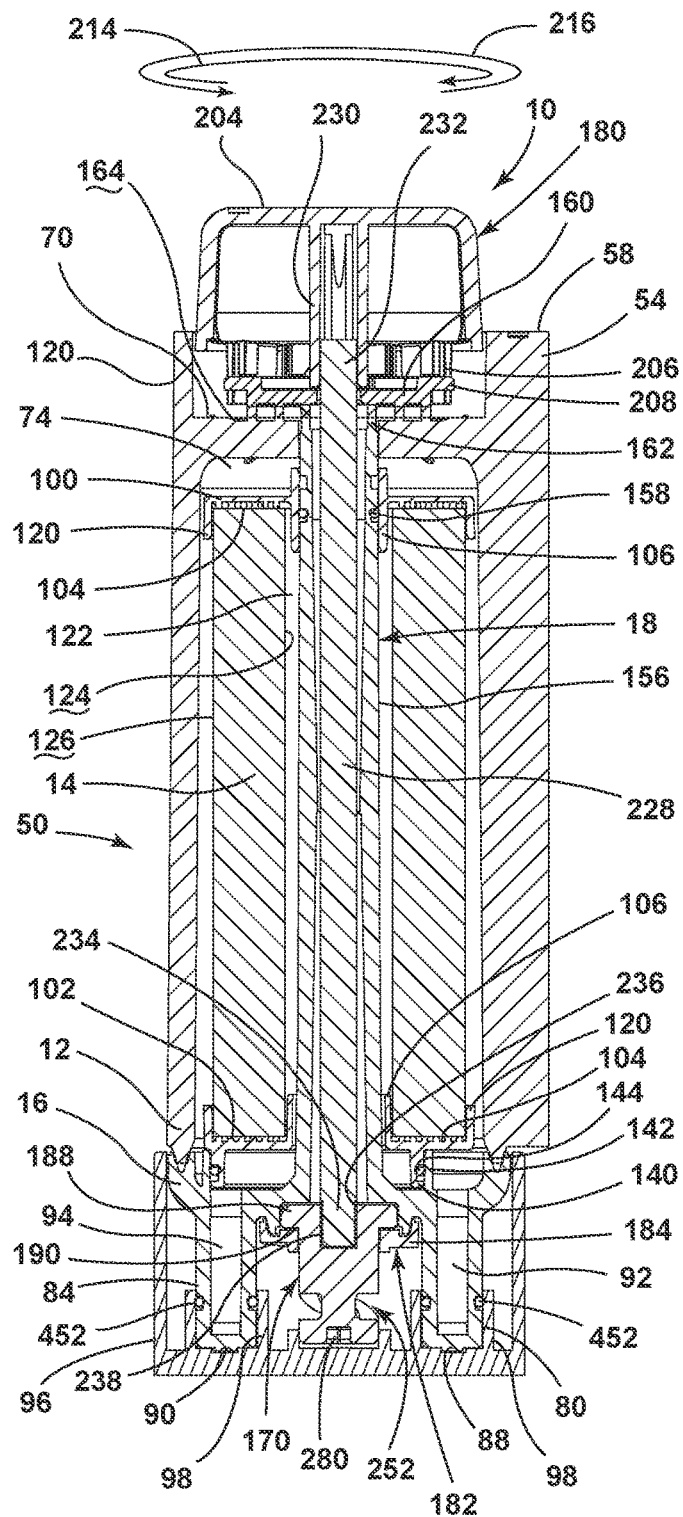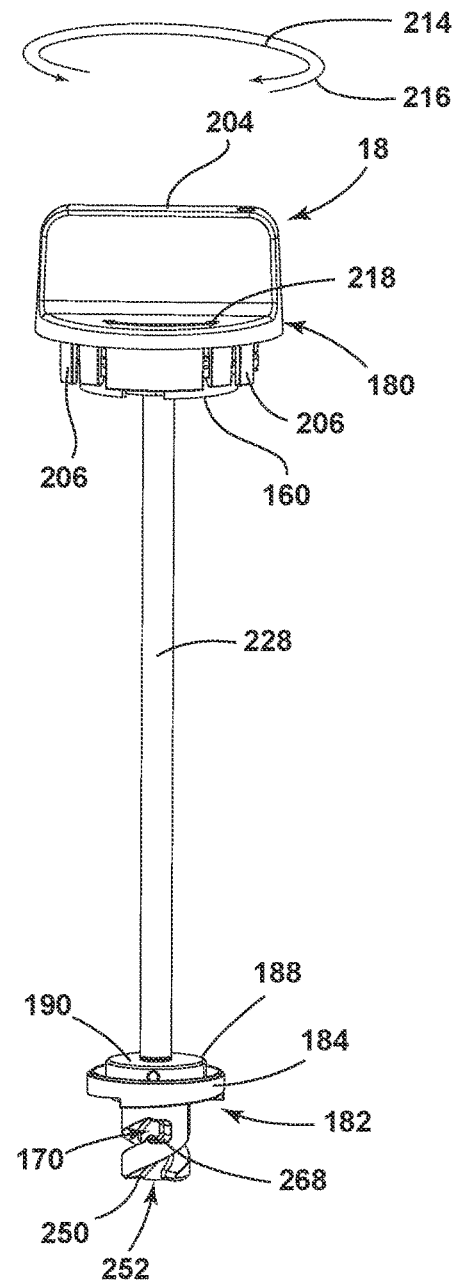
FIG. 4
FIG. 5

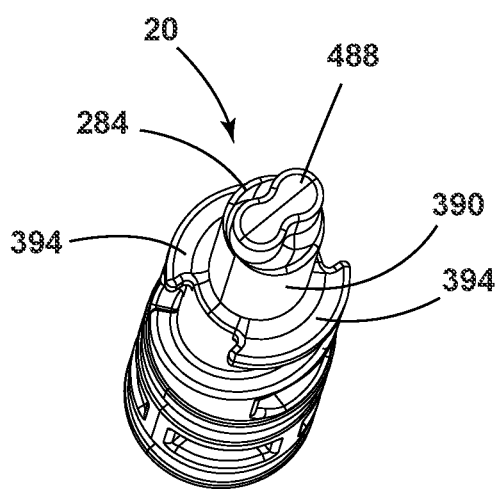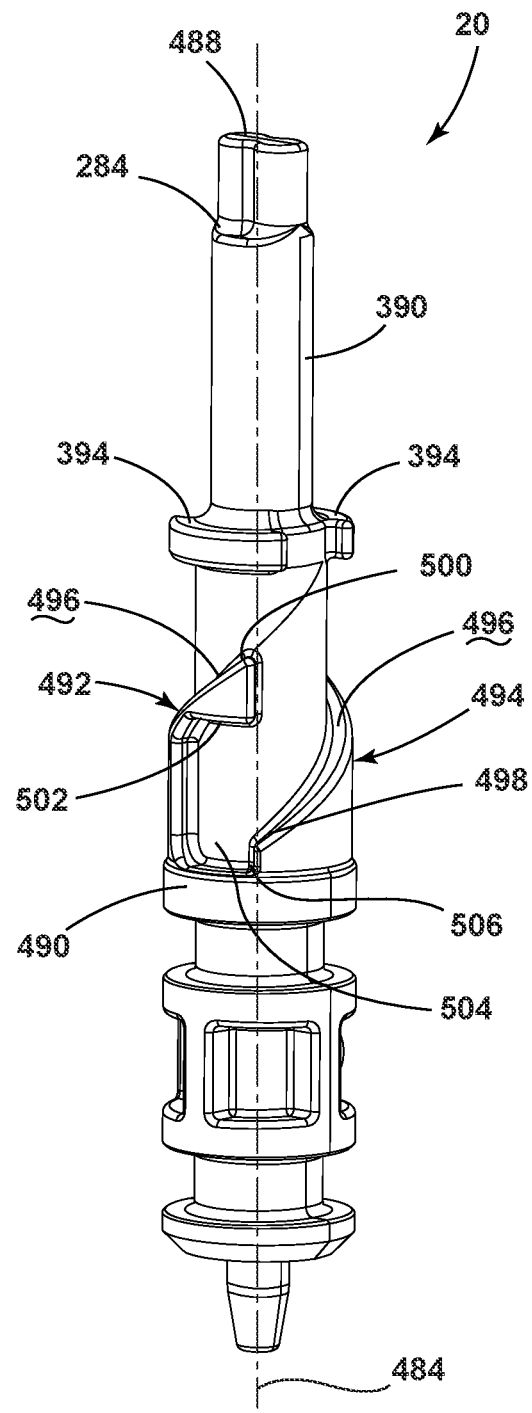
FIG. 27
FIG. 28

FILTER ASSEMBLY

CROSS-REFERENCE TO RELATED APPLICATIONS

This application is a continuation of International Application No. PCT/IB2022/054007, filed on Apr. 29, 2022, entitled "FILTER ASSEMBLY," which claims priority to U.S. Provisional Application No. 63/182,175, filed on Apr. 30, 2021, entitled "FILTER ASSEMBLY," both of which are hereby incorporated herein by reference in their entireties.

FIELD OF THE DISCLOSURE

The present disclosure generally relates to a filter assembly, and more specifically, to a filter assembly that includes a filter unit configured to selectively engage a fluid manifold.

BACKGROUND OF THE DISCLOSURE

Some appliances may dispense water. The water may be filtered.

SUMMARY OF THE DISCLOSURE

According to one aspect of the present disclosure, a filter unit includes a body portion that receives a water filter. An engaging portion is coupled to the body portion. A bypass actuator rotates relative to the engaging portion to rotationally and axially operate a bypass valve of a fluid manifold. The bypass actuator drives axial engagement of the engaging portion with a valve assembly of the fluid manifold. The bypass actuator extends through the body portion and the engaging portion.

According to another aspect of the present disclosure, a filter unit includes a bypass actuator configured to selectively engage a bypass valve of a fluid manifold. The bypass actuator is rotationally operable to drive each of a rotational motion of the bypass valve about a bypass rotational axis and an axial motion of the bypass valve along the bypass rotational axis. An engaging portion selectively cooperates with a rotational operation of the bypass actuator to axially engage a valve assembly of the fluid manifold in a direction parallel with the bypass rotational axis. The filter unit also includes a body portion. The bypass actuator is rotationally operable with respect to the body portion. The engaging portion is fixed with respect to the body portion.

According to yet another aspect of the present disclosure, a filter unit includes an actuating assembly configured to selectively engage a fluid manifold in an engaged state. Fluid is configured to flow through a bypass channel of the fluid manifold when the actuating assembly is in the engaged state. The actuating assembly is configured to house a filter media. A bypass actuator extends through the actuating assembly and is configured to selectively engage the fluid manifold when in the engaged state. The bypass actuator is rotationally operable relative to the actuating assembly. Rotation of the bypass actuator in the engaged state is configured to operate a bypass valve of the fluid manifold and also axially operate the actuating assembly relative to a valve assembly of the fluid manifold during operation from the engaged state to an installed state. The fluid is configured to flow through the filter media when the actuating assembly is in the installed state.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 4 is a cross-sectional view of the filter unit of FIG. 2, taken along lines IV-IV;

FIG. 5 is a side perspective view of a bypass actuator separated from a filter unit, according to the present disclosure;

FIG. 27 is an end perspective view of a bypass valve, according to the present disclosure;

FIG. 28 is a side perspective view of a bypass valve, according to the present disclosure;

Figure 1A:
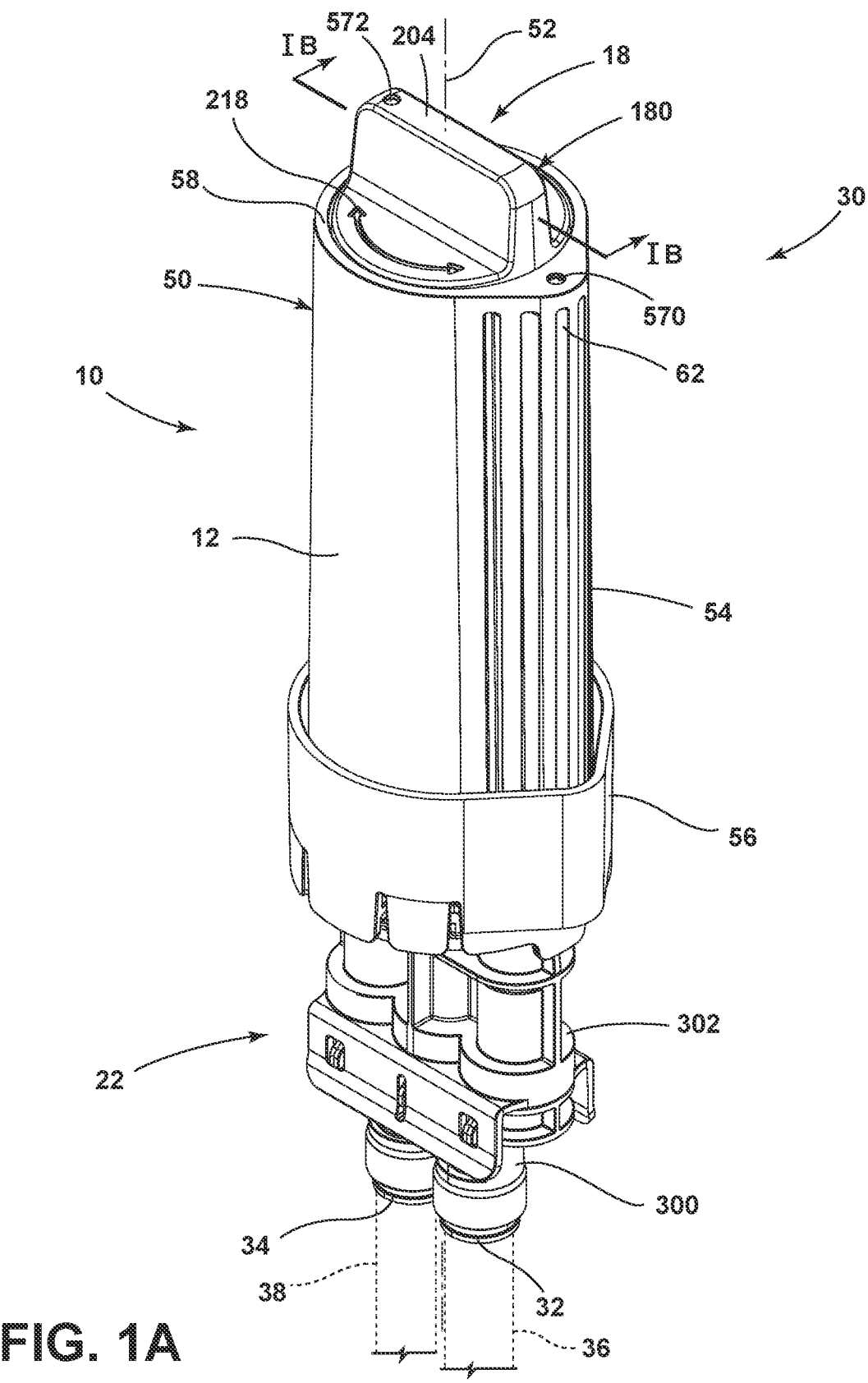
FIG. 1A is a side perspective view of a filter assembly having a filter unit and a fluid manifold, according to the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a filter assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1B:
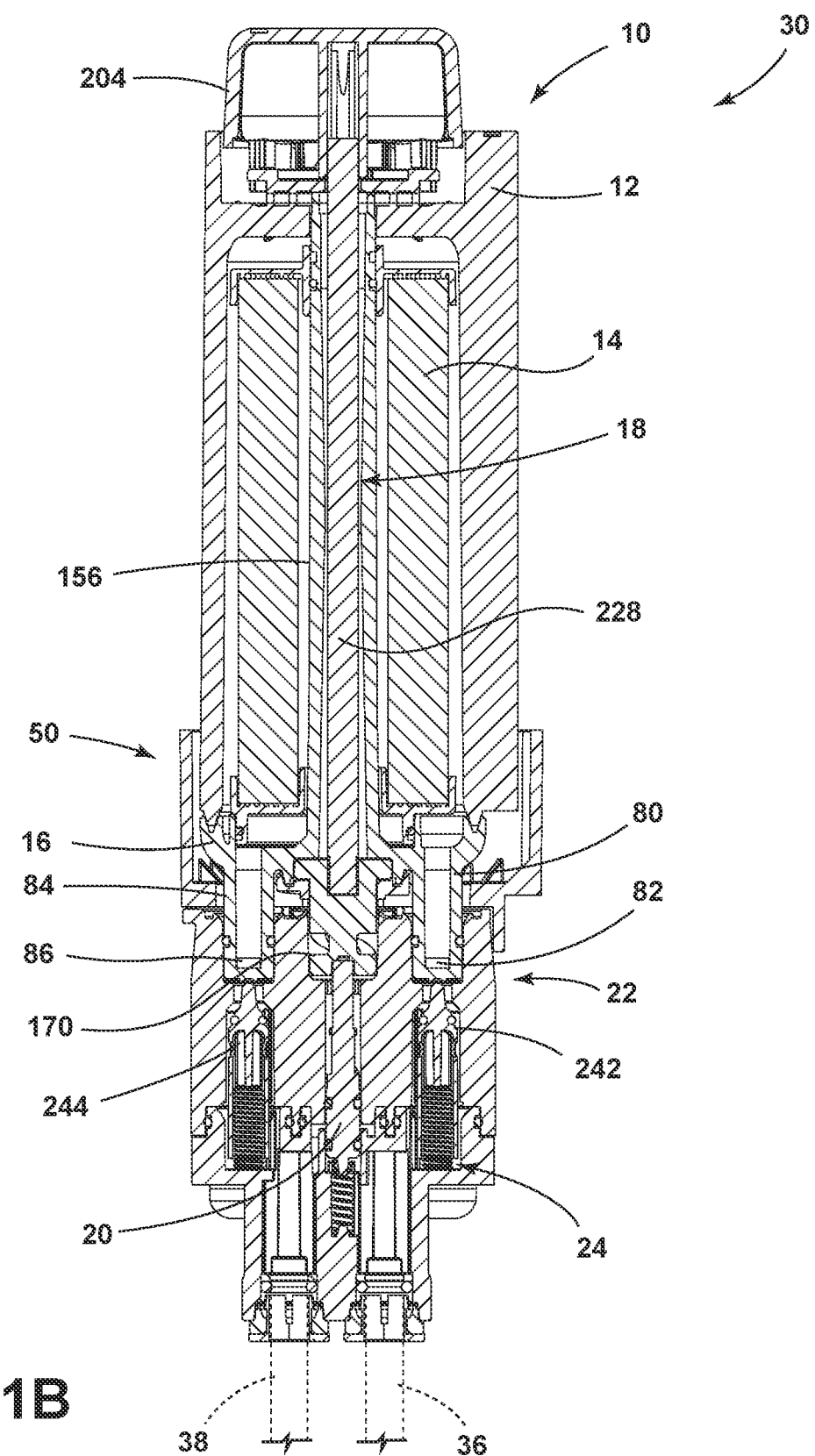
FIG. 1B is a cross-sectional view of the filter assembly of FIG. 1A, taken along the lines IB-IB, according to the present disclosure.

For purposes of description herein, the terms "upper," "lower," "right," "left," "rear," "front," "vertical," "horizontal," and derivatives thereof shall relate to the disclosure as oriented in FIGS. 1A and 1B. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figures 73A, 73B:
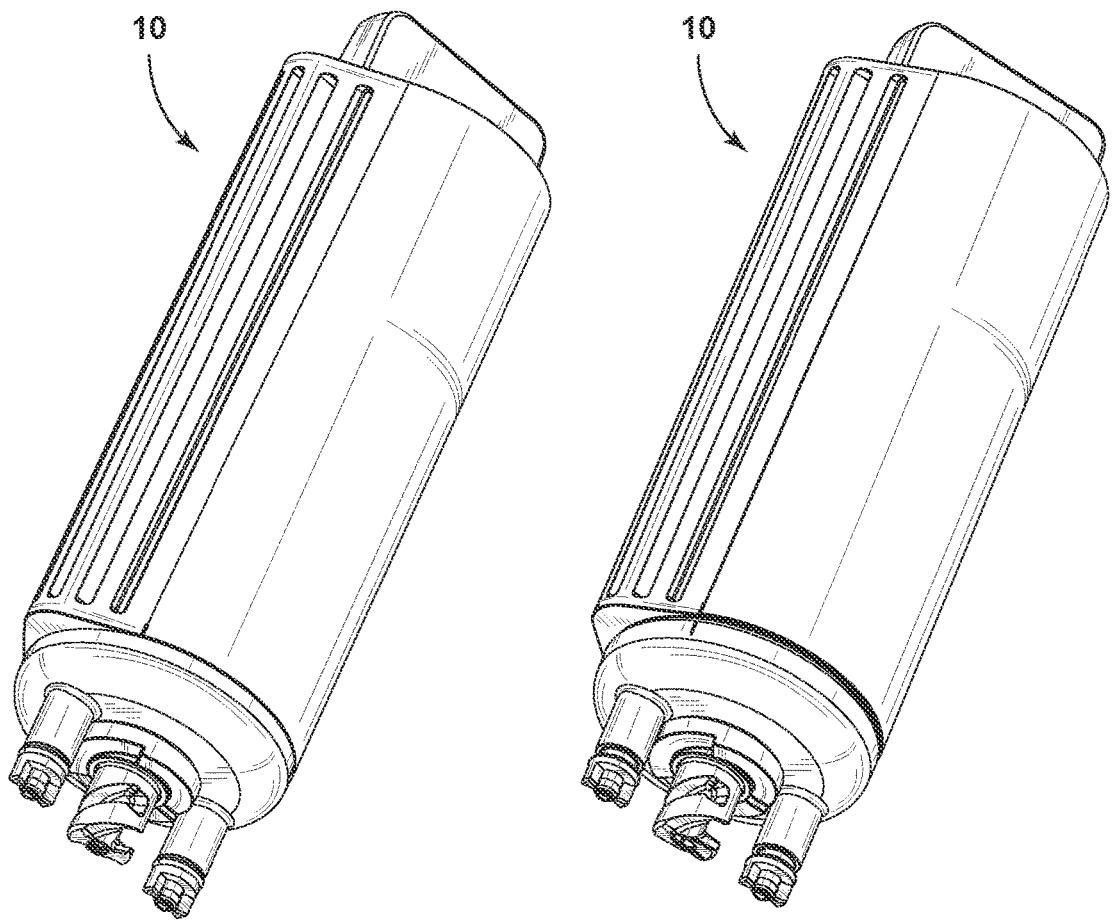
FIG. 73A is a side perspective view of a filter unit, according to the present disclosure.
FIG. 73B is another side perspective view of a filter unit, according to the present disclosure.

Referring to FIGS. 1A-73B, reference numeral 10 generally designates a filter unit that includes a body portion 12, which receives a water filter 14. An engaging portion 16 is coupled to the body portion 12. A bypass actuator 18 or bypass actuator assembly 18 rotates relative to the engaging portion 16 to rotationally operate a bypass valve 20 of a manifold assembly or fluid manifold 22. The bypass actuator 18 also axially operates the bypass valve 20. The bypass actuator 18 drives axial engagement of the engaging portion 16 with a valve assembly 24 of the fluid manifold 22. The bypass actuator 18 extends through the body portion 12, the water filter 14, and the engaging portion 16.

Figure 46:
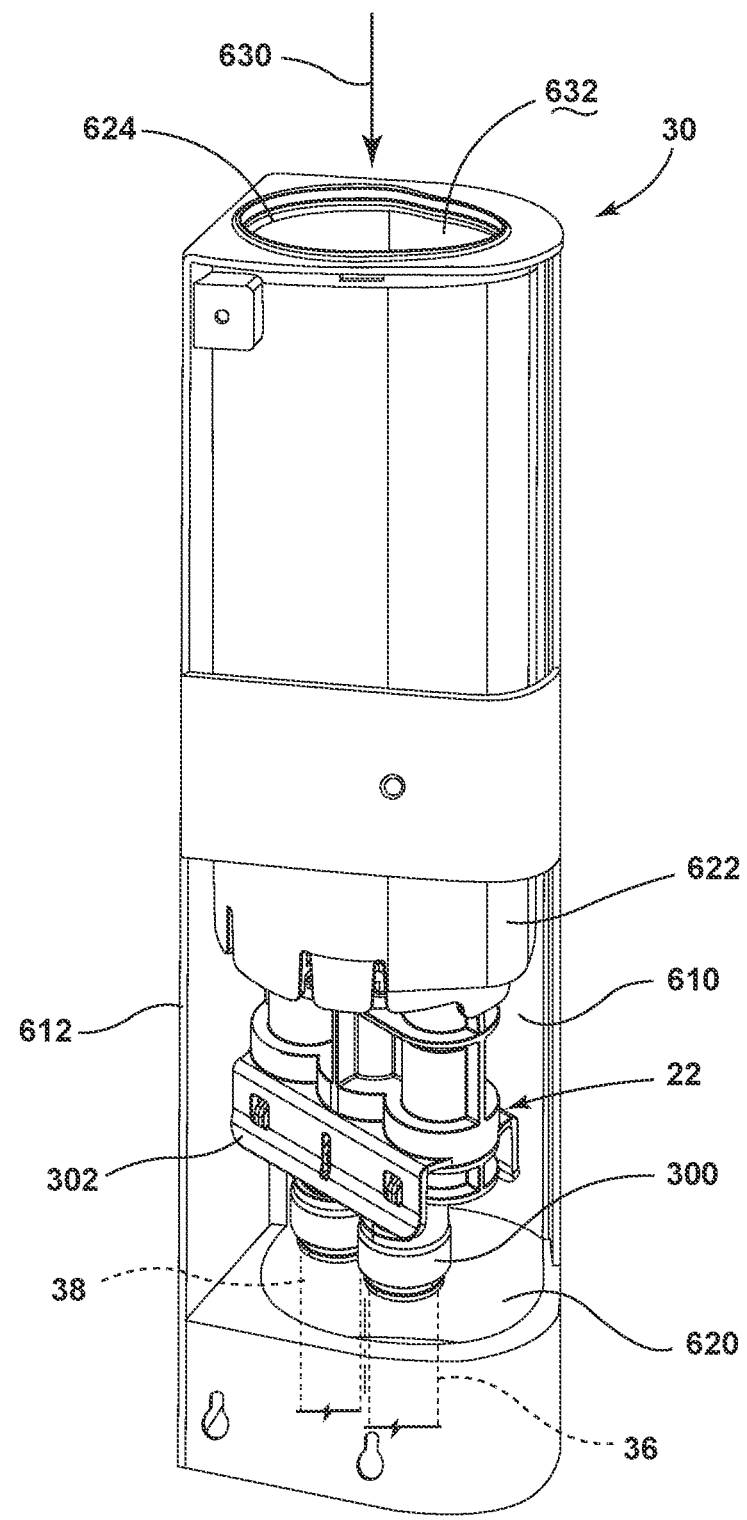
FIG. 46 is a side perspective view of a housing configured to receive a filter unit and having a fluid manifold, according to the present disclosure.

Referring to FIGS. 1A and 1B, a filter assembly 30 includes the filter unit 10 and the fluid manifold 22. The filter unit 10 selectively engages the fluid manifold 22 for filtering water. The fluid manifold 22 may be coupled to, or otherwise associated with, an appliance 40 (FIG. 46). The appliance 40 may be any household or commercial appliance 40 that utilizes filtered water, such as, for example, a refrigerator or refrigerated appliance 40.

The fluid manifold 22 includes a manifold inlet 32 and a manifold outlet 34. The manifold inlet 32 is configured to engage tubing 36 that extends between a water source or water supply and the fluid manifold 22. The manifold outlet 34 is configured to engage tubing 38 that extends between the fluid manifold 22 and a subsequent water location for providing or storing the filtered water, such as a dispenser, a container, or an ice maker. The manifold inlet 32 and the manifold outlet 34 are generally disposed on a same side of the fluid manifold 22. Accordingly, the manifold inlet 32 and the manifold outlet 34 are positioned on the side of the fluid manifold 22 opposite the filter unit 10.

Figure 2:
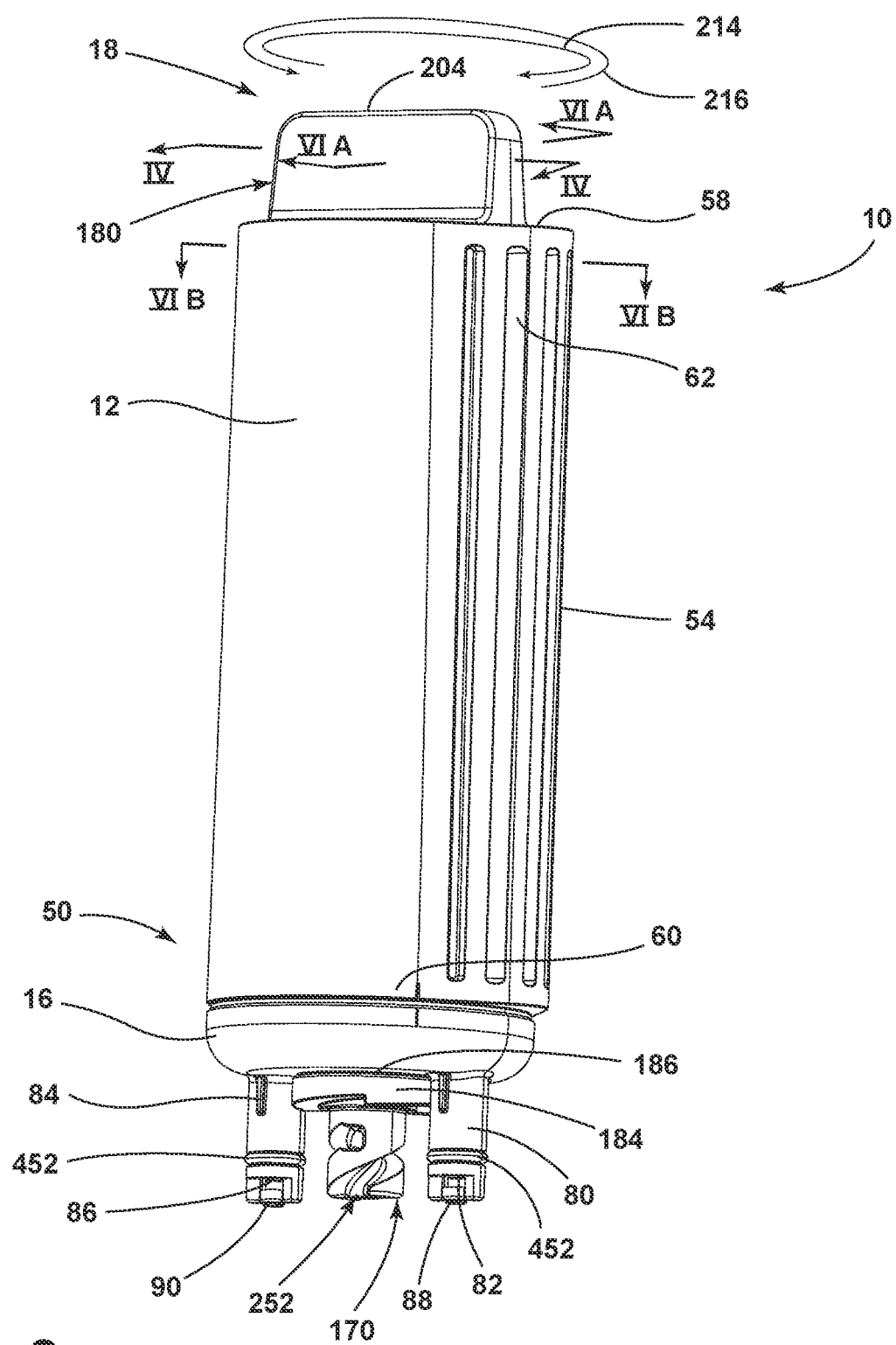
FIG. 2 is a side perspective view of a filter unit, according to the present disclosure.
Figure 13:
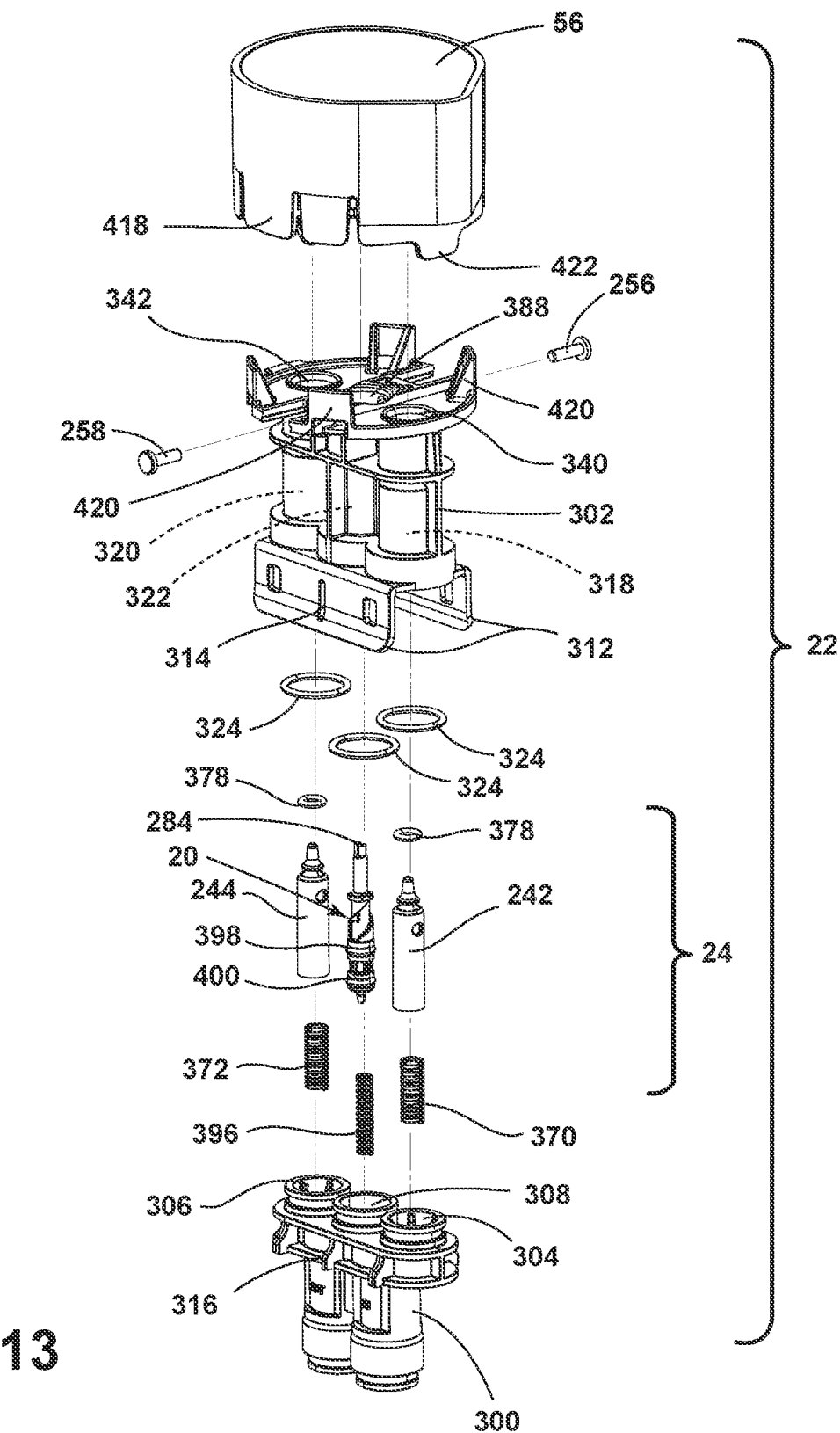
FIG. 13 is an exploded view of a fluid manifold, according to the present disclosure.
Figure 14:
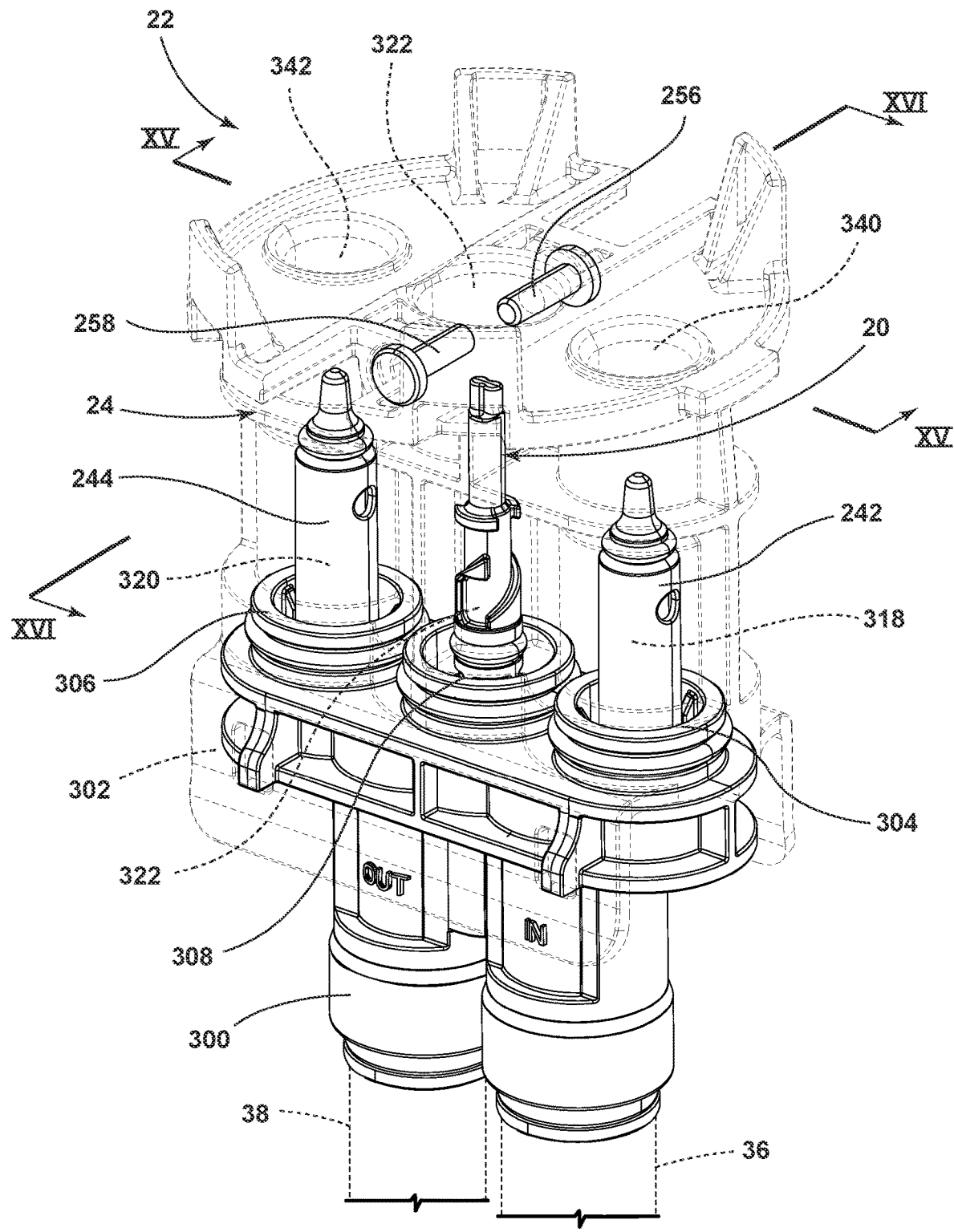
FIG. 14 is a side perspective view of a valve assembly within a fluid manifold with a housing in phantom and with a guide feature removed, according to the present disclosure.

Referring to FIG. 2, the filter unit 10 includes an actuating assembly 50 that includes the body portion 12 and the engaging portion 16, which operates to actuate the valve assembly 24 (FIG. 13) of the fluid manifold 22. The body portion 12 extends along a longitudinal axis 52 (FIGS. 1A and 1B) of the filter unit 10. The body portion 12 is generally an elongated shape, such as a cylinder, a teardrop, or other generally elongated-prism shapes, but any shape is within the scope of this disclosure. In aspects of the device having an extruded teardrop shape, the filter unit 10 generally includes a locating feature configured as a lobe 54, which provides a shape that facilitates alignment with the fluid manifold 22. The lobe 54 assists a user in properly aligning the filter unit 10 with the fluid manifold 22 through the use of a guide member 56 (FIG. 13), discussed further herein. The lobe 54 extends along the length of the body portion 12. Typically, the lobe 54 extends from a first end 58 of the body portion 12 to a second end 60 of the body portion 12. The lobe 54 has a generally parabolic or bell shape, which contributes to the teardrop shape of the filter unit 10.

The lobe 54 may have or define one or more features. In the illustrated example, the lobe 54 includes or defines grooves 62 extending between the first end 58 and the second end 60. The grooves 62 are arranged in a parallel configuration. Generally, there are three grooves 62 arranged on each side of the lobe 54. In certain aspects, the lobe 54 may have ribs that protrude at least slightly from a surface of the lobe 54. It is contemplated that the features on the lobe 54, such as the grooves 62 or ribs, may be configured as a series of elongated features that are aligned with one another without departing from the teachings herein.

The lobe 54 is an exemplary locating feature utilized on the filter unit 10. The filter unit 10 may include any practicable configuration of a locating feature, generally on the body portion 12. The locating feature may be defined by, coupled to, or otherwise attached to the filter unit 10. The locating feature may extend an entire length of the body portion 12 or a portion of the length. The locating feature may be defined in the body portion 12, on the body portion 12, flush with the body portion 12, or extend from the body portion 12. The locating feature assists the user in properly aligning the filter unit 10 with the fluid manifold 22.

Figure 3:
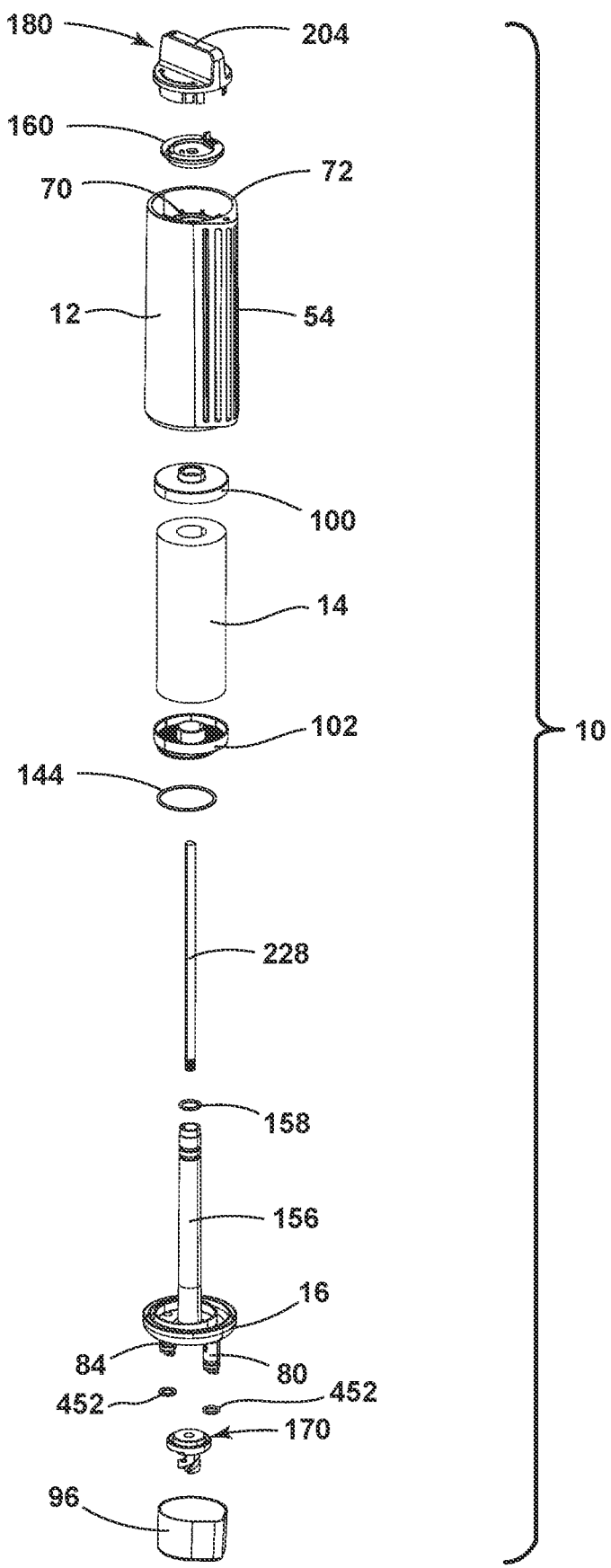
FIG. 3 is an exploded view of a filter unit, according to the present disclosure.

Referring still to FIG. 2, as well as FIGS. 3 and 4, the first end 58 of the body portion 12 defines a recessed region 70 surrounded by an outer wall 72. The recessed region 70 partially encloses an interior 74 of the body portion 12. The second end 60 of the body portion 12 is open, which allows the water filter 14 to be inserted into the interior 74 of the body portion 12.

The second end 60 of the body portion 12 is coupled to the engaging portion 16. The engaging portion 16 generally refers to the portion of the actuating assembly 50 that more directly engages the valve assembly 24 of the fluid manifold 22. The engaging portion 16 may also be considered a fluid receiving and/or delivery portion or end of the filter unit 10. The engaging portion 16 partially encloses the interior 74 of the body portion 12 to retain the water filter 14 within the actuating assembly 50.

The engaging portion 16 is fixed relative to the body portion 12. The engaging portion 16 is a fluid directing end configured to selectively engage a water source, such as the fluid manifold 22 (FIGS. 1A and 1B), to filter water through the filter unit 10. The engaging portion 16 includes a first extension or projection 80 that defines a filter inlet 82 and a second extension or projection 84 that defines a filter outlet 86. Accordingly, the fluid directing end of the filter unit 10 is configured to direct water into the filter unit 10 from the water source and subsequently out of the filter unit 10 after the water is filtered. The filter inlet 82 and the filter outlet 86 are generally offset from distal ends 88, 90 of the first and second projections 80, 84, respectively. Water flows, passes, or travels through the filter inlet 82, through an interior 92 of the first projection 80, and into the water filter 14. Once filtered, the water flows, passes, or travels through an interior 94 of the second projection 84 and through the filter outlet 86.

The filter unit 10 may include an end cap 96, which may be selectively coupled to the filter unit 10 and be disposed about the projections 80, 84. The end cap 96 may be advantageous during manufacturing, shipping, storage, etc. The end cap 96 is coupled to the body portion 12 adjacent to the engaging portion 16 of the filter unit 10. The end cap 96 is configured to conceal and protect the projections 80, 84 and a portion of the bypass actuator 18. The end cap 96 is configured to be removed prior to engagement of the filter unit 10 with the fluid manifold 22.

As illustrated in FIG. 4, the end cap 96 defines two receiving protrusions 98. The receiving protrusions 98 define inner channels configured to receive the first and second projections 80, 84 of the filter unit 10. The bypass actuator 18 extends between the two receiving protrusions 98. The receiving protrusions 98 assist with protecting the projections 80, 84, as well as maintaining the engaging portion 16 within a select position within the end cap 96. The receiving protrusions 98 may also assisting securing the end cap 96 to the filter unit 10.

Referring still to FIGS. 2-4, the body portion 12 receives the water filter 14. The water filter 14 may include any form of filter media for filtering water traveling or flowing through the filter unit 10. The water filter 14 is disposed between a first retainer 100 and a second retainer 102. The first retainer 100 is disposed proximate to the first end 58 of the body portion 12, and the second retainer 102 is disposed proximate to the second end 60 of the body portion 12. Each of the first retainer 100 and the second retainer 102 define a recess 104 between an inner rim 106 and an outer rim 120 for receiving and holding the water filter 14. The water filter 14 defines a hollow interior 122. Accordingly, the water filter 14 generally have an "O" cross-sectional shape. The inner rims 106 extend into the hollow interior 122 to engage an inner surface 124 of the water filter 14. The outer rim 120 extends along an outer surface 126 of the water filter 14. The first and second retainers 100, 102 operate to secure the water filter 14 in a selected position within the interior 74 of the body portion 12 as water flows through the water filter 14.

The second retainer 102 includes a lip 140 that extends in an opposing direction relative to the inner and outer rims 106, 120 of the second retainer 102. The engaging portion 16 includes a rim 142 that abuts the lip 140 of the second retainer 102. A sealing member, generally configured as an O-ring 144, is disposed between the lip 140 of the second retainer 102 and the rim 142 of the engaging portion 16 to form a seal.

Referring still to FIGS. 2-4, the inner rims 106 of the first and second retainers 100, 102 engage a sleeve 156 that extends through the hollow interior 122 of the water filter 14. The sleeve 156 is illustrated as part of the engaging portion 16. Generally, the engaging portion 16, including the sleeve 156, can be formed through an injection molding process. It is also contemplated that the sleeve 156 may be a separate component coupled to the engaging portion 16. The inner rim 106 of the first retainer 100 extends both into the hollow interior 122 of the water filter 14 and away from the water filter 14, increasing an engagement area between the first retainer 100 and the sleeve 156. A sealing member or O-ring 158 is disposed between the inner rim 106 of the first retainer 100 and the sleeve 156 to define a seal that encloses the hollow interior 122. The sleeve 156 generally extends between the first end 58 and the second end 60 of the body portion 12. Additionally, the sleeve 156 extends through the hollow interior 122 of the water filter 14.

Additionally or alternatively, the sleeve 156 extends through the recessed region 70 of the first end 58 of the body portion 12 to engage a support plate 160. An end 162 of the sleeve 156 has a width less than a width of the remainder of the sleeve 156 to form an interference fit with the support plate 160. The support plate 160 engages a surface 164 of the recessed region 70.

The filter unit 10 includes the bypass actuator 18 for driving movement of the bypass valve 20 in the fluid manifold 22. The bypass actuator 18 is independently rotatable with respect to the actuating assembly 50. Typically, the bypass actuator 18 is also axially fixed relative to the actuating assembly 50. The bypass actuator 18 includes a fastener 170 disposed proximate to the engaging portion 16. The bypass actuator 18 may also include a latch, fastener, coupling feature, etc. disposed proximate to the engaging portion 16. The bypass actuator 18 includes opposing retention features 180, 182 (e.g., opposing retention structures) for securing the bypass actuator 18 to the actuating assembly 50.

Figure 6A:
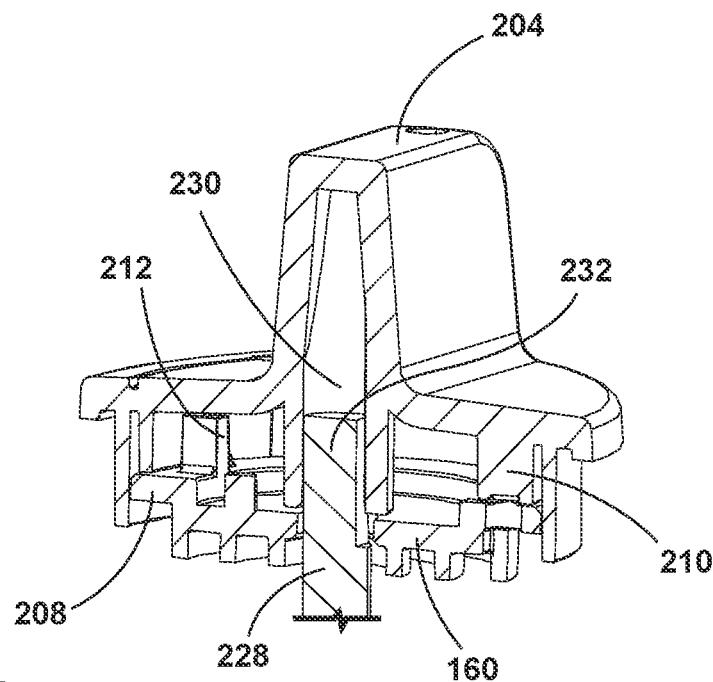
FIG. 6A is a partial cross-sectional view of a knob of the filter unit of FIG. 2, taken along lines VIA-VIA.
Figure 6B:
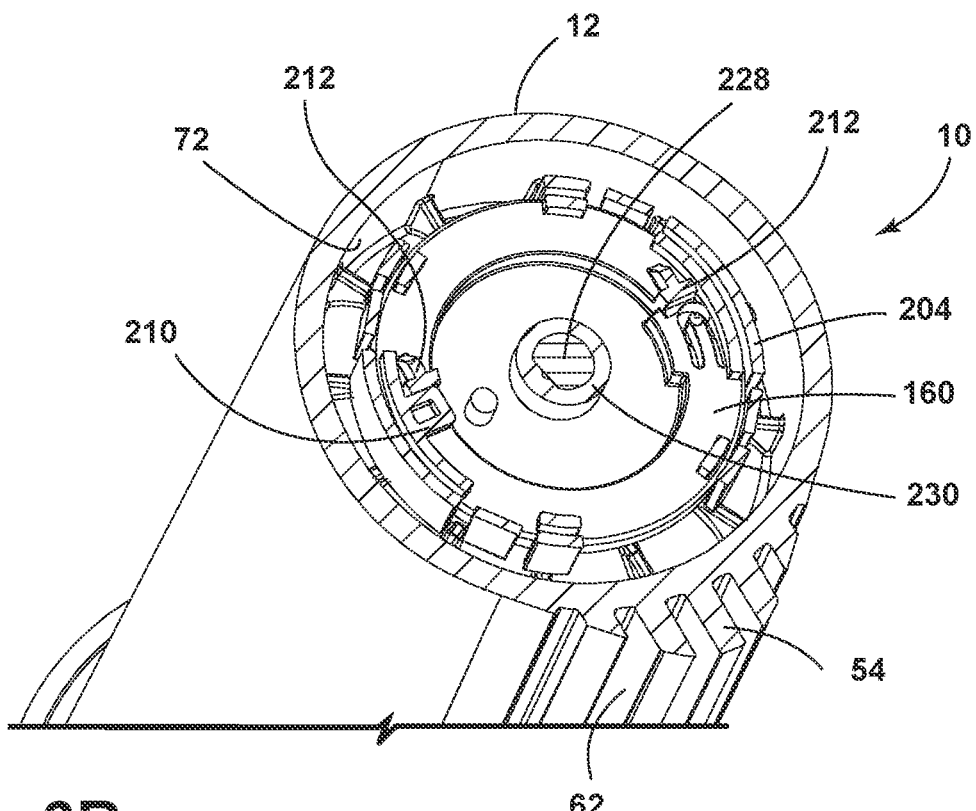
FIG. 6B is a partial cross-sectional view of a knob of the filter unit of FIG. 2, taken along line VIB-VIB.

Referring still to FIG. 4, as well as FIGS. 5-6B, the first retention feature 180 is configured as a cover 184 coupled to a central surface 186 (FIG. 7) of the engaging portion 16. The cover 184 is disposed between the first projection 80 and the second projection 84. The cover 184 axially fixes the fastener 170 with respect to the engaging portion 16. A radial flange 188 extends from a proximal end 190 of the fastener 170 and is housed by the cover 184. The cover 184 allows the fastener 170 to rotate and prevents axial movement of the fastener 170 relative to the engaging portion 16 (e.g., maintains an axial position of the fastener 170 relative to the engaging portion 16).

The second retention feature 182 is configured as a knob 204 disposed proximate to the first end 58 of the body portion 12. While the cover 184 and the radial flange 188 hold the bypass actuator 18 relative to the body portion 12, the knob 204 also retains the bypass actuator 18 relative to the body portion 12 and minimizes decoupling or de-aligning of the bypass actuator 18 from an axial alignment within the body portion 12. The cover 184 and the knob 204 secure the bypass actuator 18 at each end 58, 60 of the body portion 12. The cover 184 and the knob 204 limit axial movement of the bypass actuator 18 relative to the body portion 12. Accordingly, in various aspects, the filter unit 10 includes multiple securing mechanisms that cooperate to contemporaneously allow rotational movement and prevent axial movement of the bypass actuator 18 relative to the actuating assembly 50. Moreover, the knob 204 may be an operating end of the bypass actuator 18. The operating end may cause rotation of the fastener 170. It is contemplated that at least a portion of the motion can be a linear force applied by the user to cause rotational motion of the fastener 170.

The knob 204 is disposed partially within a space defined by the recessed region 70 and the outer wall 72. The knob 204 includes snap features 206 that engage a radial extension 208 of the support plate 160. The snap features 206 retain the engagement between the knob 204 and the support plate 160, while slidably engaging the radial extension 208. Accordingly, the knob 204 rotates relative to the support plate 160.

Referring still to FIGS. 6A and 6B, the knob 204 defines internal projections 210 that engage stop projections 212 of the support plate 160. The stop projections 212 extend vertically from the support plate 160, away from the surface 164 of the recessed region 70. The stop projections 212 abut the internal projections 210 of the knob 204 to allow rotation in a first rotational direction 214 and a second rotational direction 216 through a certain rotational range. The abutting engagement between the internal projections 210 and the stop projections 212 limits or prevents rotation of the knob 204 relative to the support plate 160 outside of this rotational range. Accordingly, the support plate 160 defines the rotational range of the knob 204 relative to the actuating assembly 50. The opposing retention features 180, 182 secure the bypass actuator 18 to the actuating assembly 50. There may be more or fewer stop projections 212, which may increase or decrease the rotational range of the knob 204 without departing from the teachings herein.

The knob 204 may include an indicator 218 to guide the user to rotate the knob 204 in the first and second rotational directions 214, 216, respectively. In the illustrated example, the indicator 218 is indented into the knob 204. In such examples, the indicator 218 may be included in the knob 204 during a molding process. It is also contemplated that the indicator 218 may be painted on the knob 204, may be a protrusion extending from the knob 204, or otherwise included in the filter unit 10.

The knob 204 is operably coupled to the fastener 170 via a shaft 228. The shaft 228 extends through the sleeve 156 and, consequently, through the interior 74 that houses the water filter 14. The sleeve 156 provides space for the rotation of the shaft 228 without substantial interference from water flowing through the filter unit 10 and/or from the water filter 14. The knob 204 defines an inner channel 230 for receiving a first end 232 of the shaft 228. The inner channel 230 typically defines a "D"-shape to receive the first end 232 of the shaft 228, which defines a mating shape. The "D"-shape of the inner channel 230 and the first end 232 of the shaft 228 provides an interference fit, such that the shaft 228 is rotated in response to rotation of the knob 204 by the user. It is contemplated that the "D"-shape may be loosely fit within the inner channel 230 and abut surfaces or features within the inner channel 230 to rotate the shaft 228 with the knob 204. While the "D" shape is indicated, other shapes or features can be used to rotationally secure the inner channel 230 to the shaft 228.

With further reference to FIGS. 6A and 6B, the second end 234 of the shaft 228 is coupled to the fastener 170. The proximal end 190 of the fastener 170 defines a channel 236 for receiving the second end 234 of the shaft 228. The second end 234 of the shaft 228 defines a textured region 238 for providing a frictional or interference fit with the fastener 170. The textured region 238 may include ridges, projections, threads, irregularities, or other features that engage an inner surface of the fastener 170. When the user rotates the knob 204, the fastener 170 is also rotated. It should be understood that the "D" shape of the inner channel 230 and the textured region 238 of the shaft 228 are exemplary securing mechanisms. It should also be understood that other fastening mechanisms and methods can be utilized for securing the shaft 228 at each of the first and second ends 232, 234.

Figure 7:
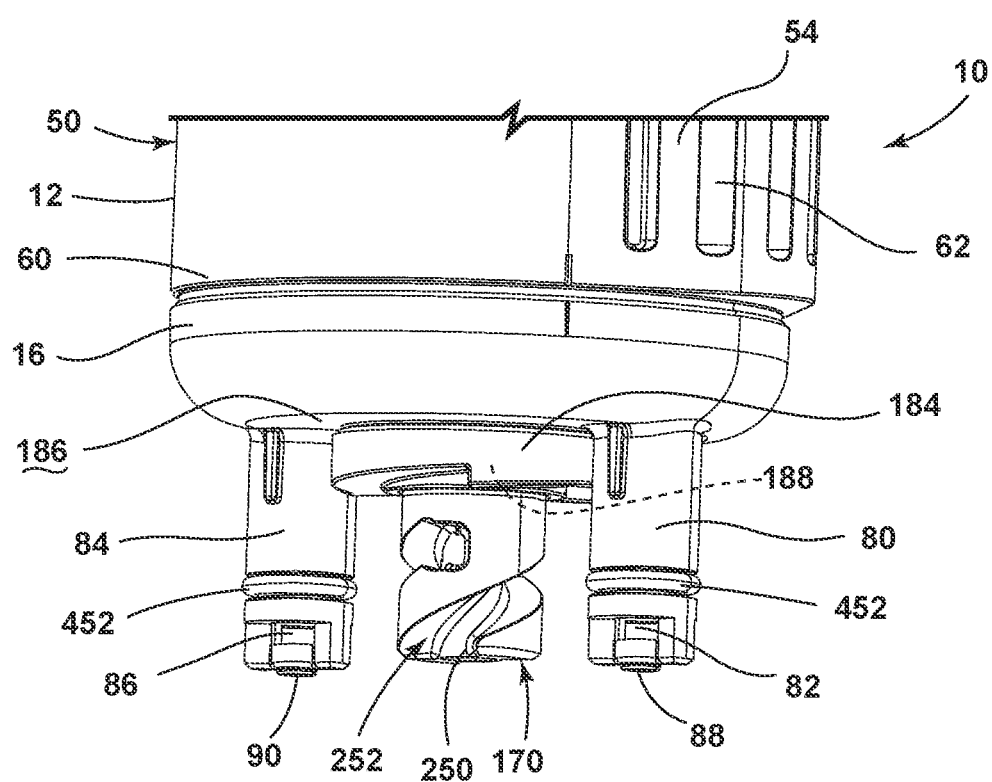
FIG. 7 is a partial side perspective view of an engaging portion of a filter unit, according to the present disclosure.
Figure 8:
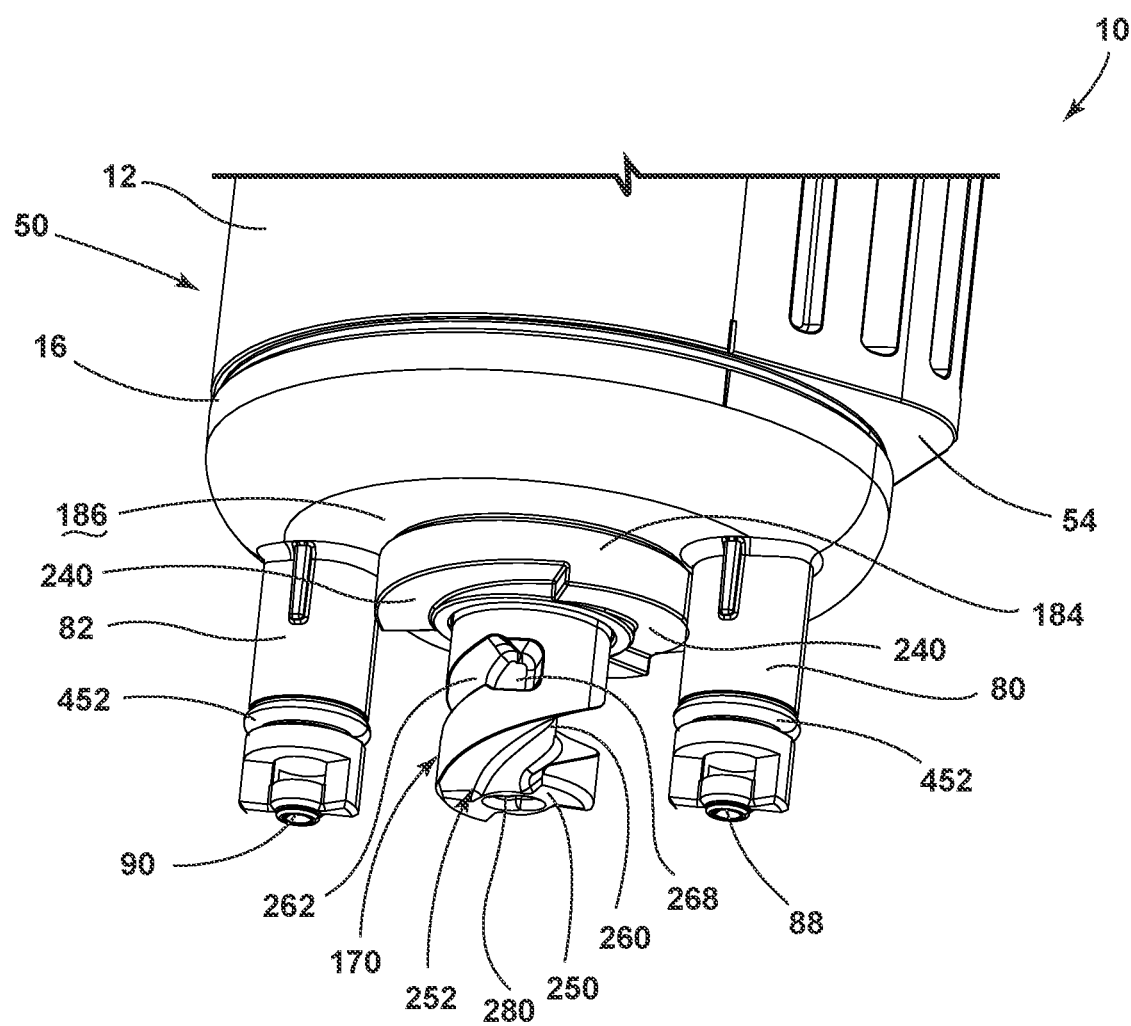
FIG. 8 is a partial side perspective view of an engaging portion of a filter unit, according to the present disclosure.
Figure 9:
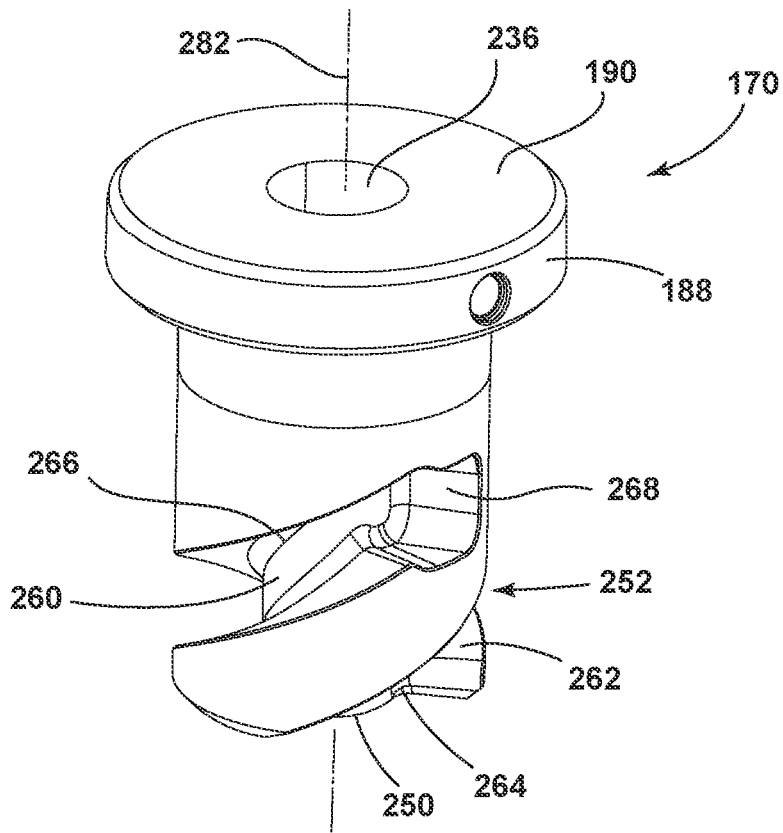
FIG. 9 is a side perspective view of a fastener of a bypass actuator, according to the present disclosure.

Referring to FIGS. 7 and 8, the fastener 170 of the bypass actuator 18 is disposed proximate to the engaging portion 16, with the radial flange 188 disposed between the cover 184 and the engaging portion 16. The cover 184 includes sections of sloped surfaces 240. The sloped surfaces 240 engage a tool or machine that spin welds or otherwise welds, adheres, or couples the cover 184 to the engaging portion 16.

The fastener 170 may be an actuating end of the bypass actuator 18. The fastener 170 is disposed between the first projection 80, which defines the filter inlet 82, and the second projection 84, which defines the filter outlet 86. The first projection 80, the second projection 84, and the fastener 170 define a collinear arrangement. Stated differently, the body portion 12 includes a symmetrical reference plane that intersects with the first projection 80, the second projection 84, and the bypass actuator 18. Generally, the fastener 170 is disposed a substantially same distance from each of the first projection 80 and the second projection 84.

Additionally or alternatively, each of the first projection 80, the second projection 84, and the fastener 170 extend in a same direction for a substantially similar distance from the central surface 186 of the engaging portion 16. In certain aspects, each of the first projection 80, the second projection 84, and the fastener 170 extend in a range of from about 0.5 cm to about 2 cm from the central surface 186 of the engaging portion 16. The substantially similar length of the first projection 80, the second projection 84, and the fastener 170 allows for each of an inlet valve 242, an outlet valve 244, and the bypass valve 20 of the valve assembly 24 to be actuated concurrently (FIG. 13) or in a predetermined actuation sequence.

Figure 10:
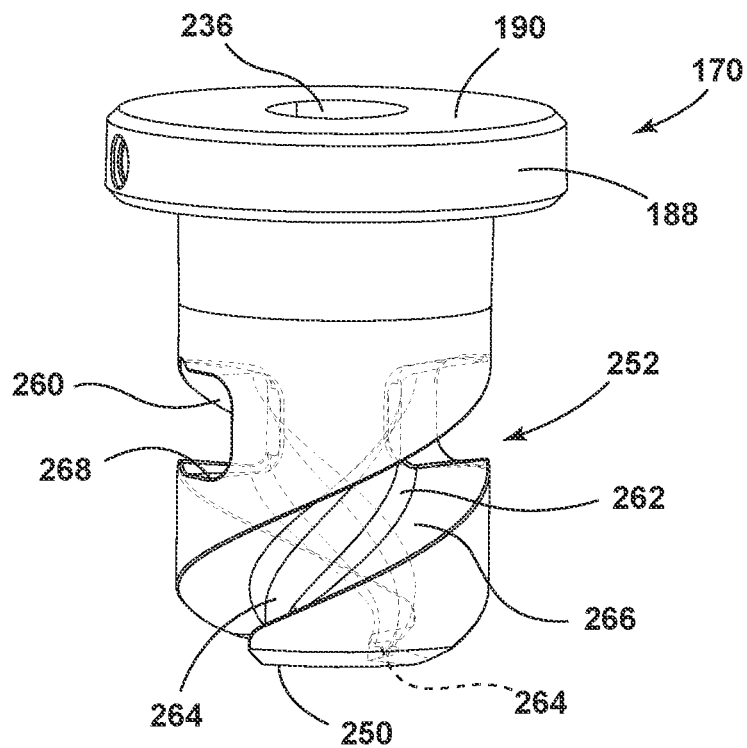
FIG. 10 is a side perspective view of a fastener of a bypass actuator, according to the present disclosure.

Referring to FIGS. 7-13, the fastener 170 includes the proximal end 190 coupled to the shaft 228 (FIG. 4) and a distal end 250 configured to engage the bypass valve 20. The radial flange 188 extends from the proximal end 190 and has a width greater than a width of a remainder of the fastener 170. The fastener 170 defines an interface 252 for selectively engaging at least one retaining feature 256, 258 of the fluid manifold 22. As illustrated in FIGS. 10 and 11A, the interface 252 includes two ramps or sloped grooves 260, 262 allowing the fastener 170 to engage two retaining features 256, 258 concurrently. The interface 252 has two openings 264 at the distal end 250 of fastener 170 for receiving the retaining features 256, 258 and engaging the retaining features 256, 258 with the sloped grooves 260, 262, respectively.

Each sloped groove 260, 262 extends from the distal end 250 and toward the proximal end 190 of the fastener 170. The sloped grooves 260, 262 guide axial and rotational movement of the fastener 170, and, in turn, guide axial movement of the filter unit 10 relative to the fluid manifold 22. The interface 252 may be configured as at least one slope, ramp, channel, receptacle, groove, step, or other guide features that allow for axial and rotational movement of the fastener 170.

The interface 252 includes at least one helical section 266. In the illustrated example, the sloped grooves 260, 262 spiral or extend in the same direction (e.g., counter clockwise) along the fastener 170 toward the proximal end 190 to define the helical shape or section 266. By extending in the same direction, the sloped grooves 260, 262 do not interfere with one another and generally define a double helix. Each sloped groove 260, 262 may have a generally consistent pitch or slope between the distal end 250 and the proximal end 190 of the fastener 170. The slope may be about 45° along the entire sloped grooves 260, 262, respectively. It is also contemplated that the slope may differ at the openings 264 and detents 268 while remaining generally constant therebetween.

Alternatively, in certain aspects, the pitch or slope may be variable between the distal end 250 and the proximal end 190. The pitch proximate to the distal end 250 may be shallower, providing a greater proportional degree of rotational movement than axial movement to provide a greater mechanical advantage in the axial direction to ensure an initial engagement with the fluid manifold 22. In such aspects, due to the shallower pitch proximate to the openings 264, a rotation of approximately 5° may cause engagement between the fastener 170 and the retaining features 256, 258. The pitch may then become steeper, to increase the axial movement. In certain aspects, the steeper pitch may be about 45°.

Referring still to FIGS. 7-13, the openings 264 may be a receiving section of the sloped grooves 260, 262 for receiving the retaining features 256, 258. The openings 264 may intersect the reference plane at an engaging portion of the reference plane. As the fastener 170 is rotated, the bypass actuator 18 translates the sloped grooves 260, 262 through the reference plane from the engaging portion of the reference plane to an installed portion of the reference plane. Stated differently, different portions of the sloped grooves 260, 262 intersect the reference plane as the fastener 170 is rotated. An axial distance from the engaging portion to the installed portion of the reference plane represents an insertion depth of the filter inlet 82 and the filter outlet 86 relative to the fluid manifold 22 (e.g., the water source).

With further reference to FIGS. 9-13, the interface 252 includes the detent 268 for engaging each retaining feature 256, 258 proximate to the proximal end 190 of the fastener 170. The detents 268 are configured to retain the fastener 170 in the selected position relative to the fluid manifold 22 by selectively securing the retaining features 256, 258. Each sloped groove 260, 262 extends approximately 180° around the fastener 170. Accordingly, the opening 264 to the first sloped groove 260 is generally vertically aligned with the detent 268 of the second sloped groove 262, and the opening 264 to the second sloped groove 262 is generally vertically aligned with the detent 268 of the first sloped groove 260. Based on the selected rotation of the fastener 170, each sloped groove 260, 262 may extend a different length along the fastener 170 to provide the selected rotation.

Figure 11A:
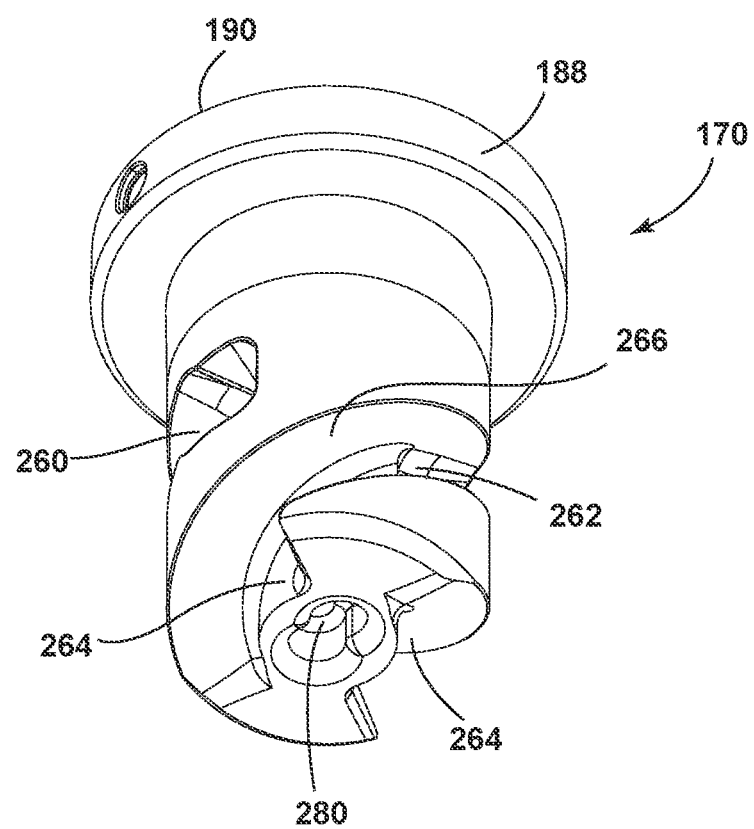
FIG. 11A is a side perspective view of a fastener of a bypass actuator, according to the present disclosure.
Figure 11B:
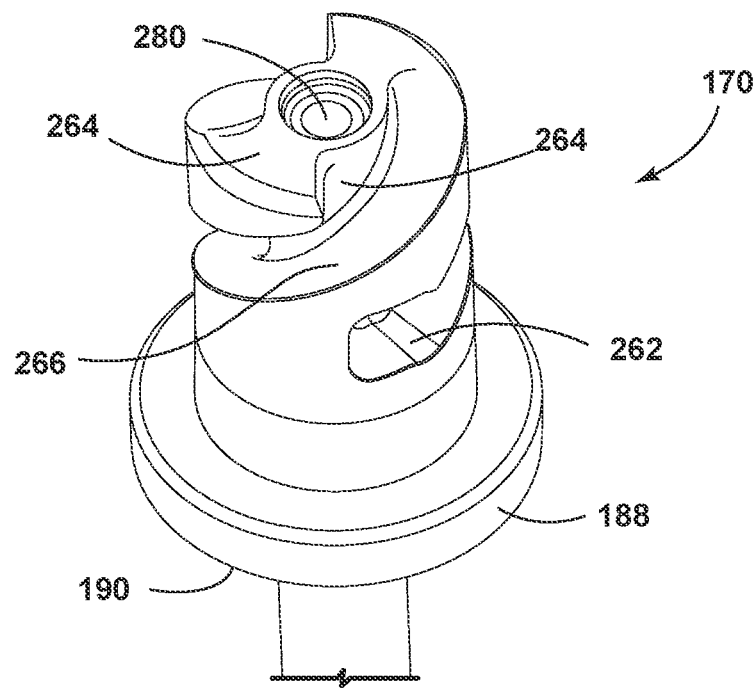
FIG. 11B is a side perspective view of the fastener of FIG. 11A, according to the present disclosure.
Figure 11C:
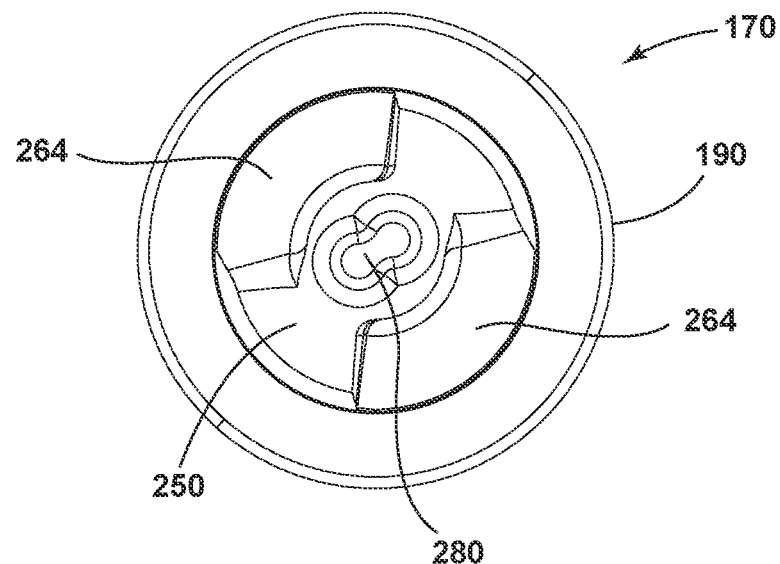
FIG. 11C is a plan view of the fastener of FIG. 11A, according to the present disclosure.
Figure 12A:
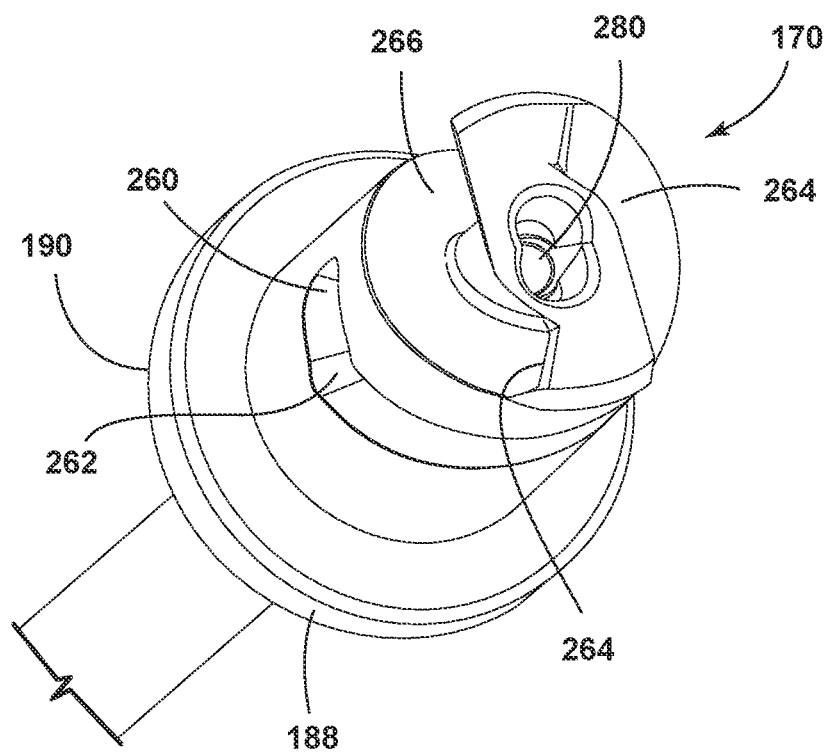
FIG. 12A is a bottom perspective view of a fastener of a bypass actuator, according to the present disclosure.
Figure 12B:
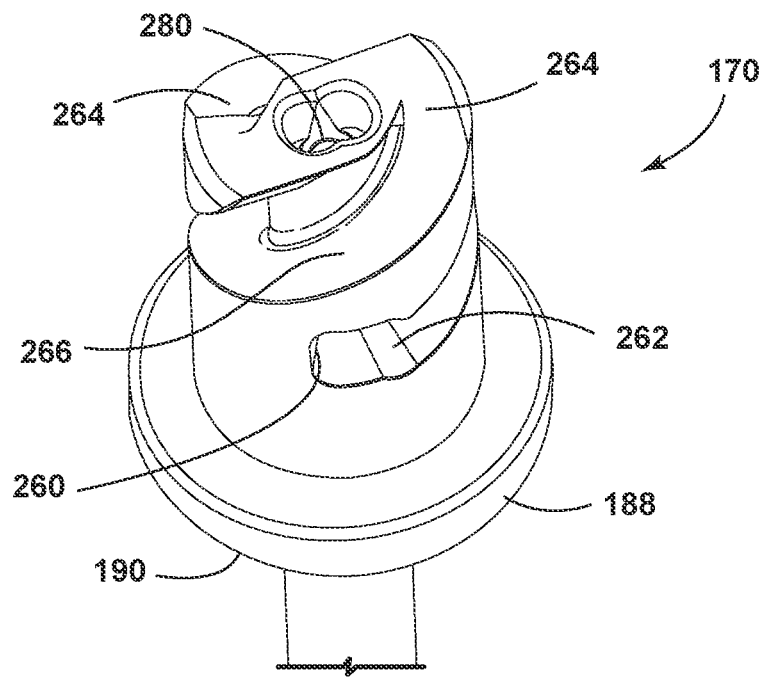
FIG. 12B is a side perspective view of the fastener of FIG. 12A, according to the present disclosure.
Figure 12C:
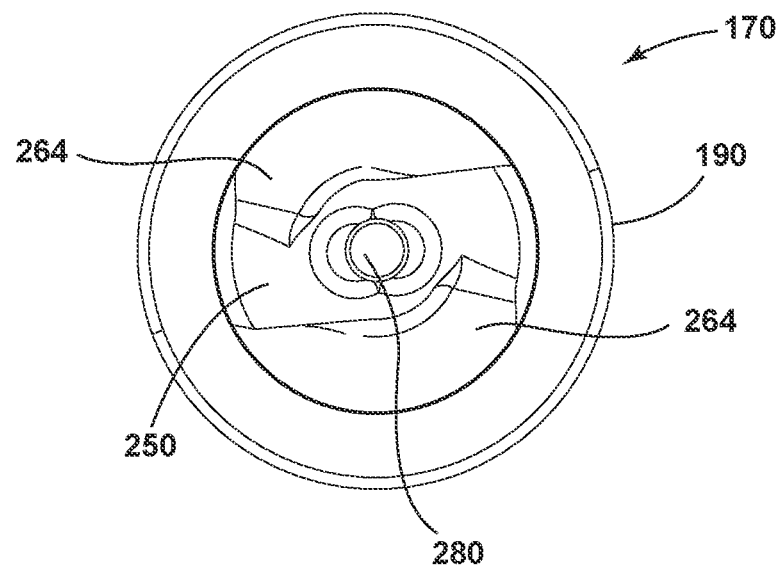
FIG. 12C is a plan view of the fastener of FIG. 12A, according to the present disclosure.

As illustrated in FIGS. 11C and 12C, the distal end 250 of the fastener 170 defines an interlock 280 configured to abut the bypass valve 20 in a mating engagement. The interlock 280 and the channel 236 that receives the shaft 228 (FIG. 4) are vertically aligned and disposed along a rotational axis 282 of the fastener 170. The interlock 280 being defined on the rotational axis 282 provides for a more balanced rotation of the fastener 170 to drive, or at least foster or initiate, rotational movement of the bypass valve 20 as it moves axially. The rotational axis 282 of the fastener 170 is included in the reference plane that extends through the inlet projection 80, the outlet projection 84, and the fastener 170.

The interlock 280 is configured to matingly engage or otherwise cooperate with an end 284 of the bypass valve 20. In the illustrated configuration, the interlock 280 is a recess having a lemniscate, "FIG. 8," or hourglass shape. It is contemplated that other shapes may also be employed without departing from the teachings herein. The interlock 280 may have a depth in a range of about 0.25 mm to about 5 mm to receive the end 284 of the bypass valve 20. The size, including depth, may vary based on the overall configuration of the filter assembly 30 and/or the interaction between the fastener 170 and the bypass valve 20. The shape of the interlock 280 allows the fastener 170 to receive the bypass valve 20 and remain engaged with the bypass valve 20 as each of the fastener 170 and the bypass valve 20 are moved. The interlock 280 may also be projections, protrusions, grooves, or other features that matingly engage with the bypass valve 20. The interlock 280 may include a shape having at least one axis of symmetry where the fastener 170 can engage the bypass valve 20 in more than one rotational orientation.

Referring to FIGS. 11A-11C, in various aspects, the distal end 250 of the fastener 170 defines a substantially symmetrical "bowtie" shape. The "bowtie" shape is formed with a central portion defining the interlock 280, and the openings 264 defined on opposing sides of the central portion. The sloped grooves 260, 262 extend from the openings 264 at one end of the "bowtie" shape to adjacent to the opposing end of the "bowtie" shape as the sloped grooves 260, 262 extend toward the proximal end 190.

Referring to FIGS. 12A-12C, the distal end 250 of the fastener 170 may define different shapes based on the movement of the retaining features 256, 258 along the sloped grooves 260, 262. While the distal end 250 in the example configuration illustrated in FIGS. 11A-11C defines the "bowtie" shape, the exemplary configuration illustrated in FIGS. 12A-12C has more of a "pinwheel" shape. The distal end 250 includes the central portion with the interlock 280, and two sides extending in opposing directions from the central portion. Each side is defined by the openings 264 and the sloped grooves 260, 262. The sides are angled toward the respective opening 264, with one edge of the "bowtie" on each side removed to form the angled "pinwheel" shape. This provides additional space for the retaining features 256, 258 moving along the sloped grooves 260, 262. In this configuration, the distal end 250 provides larger openings 264 into the sloped grooves 260, 262 and may have less interference with the movement of the retaining features 256, 258 through the openings 264 and along the sloped grooves 260, 262. Further, this configuration may provide for more tolerance for receiving and engaging the retaining features 256, 258.

Referring now to FIGS. 13-16, the fluid manifold 22 includes a base 300, a housing 302, and the guide member 56. The base 300 is configured to engage the tubing 36, 38, which fluidly couples the filter assembly 30 to the water supply source and subsequent water location (e.g., the dispenser, the container, the ice maker, etc.). The base 300 defines valve seats 304, 306, 308 for partially retaining the valve assembly 24. The valve assembly 24 generally includes the inlet valve 242, the outlet valve 244, and the bypass valve 20. The bypass valve 20 is disposed in the central valve seat 308 and the inlet valve 242 and the outlet valve 244 are disposed in the outer valve seats 304, 306, respectively. The valve seats 304, 306, 308 generally define a collinear arrangement, which corresponds with the collinear arrangement of the fastener 170 and the projections 80, 84 on the filter unit 10. The base 300 defines ribs that extend into a space defined by the outer valve seats 304, 306 to guide movement of the inlet and outlet valves 242, 244.

The housing 302 is coupled to the base 300 and cooperates with the base 300 to house the valve assembly 24. The housing 302 snap engages with the base 300. The housing 302 includes flanges 312 that each defines at least one aperture 314, and the base 300 includes projections 316 that snap-engage with the flanges 312. The projections 316 are disposed at least partially within corresponding apertures 314 to retain the housing 302 to the base 300. The housing 302 defines valve recesses or cavities 318, 320, 322 that align with the valve seats 304, 306, 308 to house the valve assembly 24. A sealing member or O-ring 324 extends around each valve seat 304, 306, 308 of the base 300. The O-rings 324 engage the housing 302 to seal the valve cavities 318, 320, 322.

The inlet valve cavity 318 is in fluid communication with an inlet port 340 that is configured to receive the first projection 80 of the filter unit 10 (FIG. 2). The outlet valve cavity 320 is in fluid communication with an outlet port 342 configured to receive the second projection 84 of the filter unit 10 (FIG. 2). The inlet and outlet valve cavities 318, 320 are narrowed proximate to the inlet port 340 and the outlet port 342, respectively, by stop features 344 extending radially into the inlet and outlet valve cavities 318, 320. The inlet and outlet valves 242, 244 each include a tip 346 that extends beyond the stop features 344 and into the respective inlet and outlet port 340, 342. Shoulders 348 of each of the inlet and outlet valves 242, 244 are configured to abut the stop features 344 when the inlet and outlet valves 242, 244 are in closed positions 350. The stop features 344 retain the inlet and outlet valves 242, 244 primarily in the inlet and outlet valve cavities 318, 320.

A first biasing member 370 extends between the base 300 and the inlet valve 242, and a second biasing member 372 extends between the base 300 and the outlet valve 244. The first and second biasing members 370, 372 bias the inlet and outlet valves 242, 244 toward the stop features 344. When the inlet and outlet valves 242, 244 abut the stop features 344 and the bypass valve 20 is in a bypass position 374, water flows through the manifold inlet 32, through a bypass channel 376, and through the manifold outlet 34 without entering the filter unit 10. The biasing members 370, 372 are illustrated as coil springs, but may be springs, coil springs, magnets, or other biasing features without departing from the teachings herein.

Referring still to FIGS. 13-16, each of the shoulders 348 for inlet valve 242 and the outlet valve 244 includes a sealing member or O-ring 378 extending around the shoulders 348. When the inlet and outlet valves 242, 244 are biased toward the stop features 344, the O-rings 378 abut the stop features 344 and provide a seal that prevents the water from flowing to the inlet and outlet ports 340, 342.

The valve assembly 24 also includes the bypass valve 20 positioned or located within the bypass valve cavity 322 of the fluid manifold 22. The bypass valve cavity 322 is in fluid communication with an actuator port 388 for receiving the fastener 170. The bypass valve 20 includes a stem 390, which includes the end 284 that extends into the actuator port 388. The housing 302 includes a stop feature 392 that extends into the bypass valve cavity 322. The bypass valve 20 includes projections 394 that abut the stop feature 392 and retain the bypass valve 20 primarily within the bypass valve cavity 322 while allowing the stem 390 to extend into the actuator port 388.

A third biasing member 396 extends between the base 300 and bypass valve 20. The third biasing member 396 biases the bypass valve 20 toward the stop feature 392 and toward the bypass position 374. The bypass valve 20 includes two sealing members or O-rings 398, 400. When in the bypass position 374, each O-ring 398 abuts an inner surface 402 of the housing 302 within the bypass valve cavity 322. The O-rings 398, 400 substantially prevent water flowing through the bypass channel 376 from traveling out of the bypass channel 376 and toward the actuator port 388. The biasing member 396 is illustrated as a coil spring, but may be a spring, a coil spring, magnets, or other biasing features without departing from the teachings herein.

Figure 15:
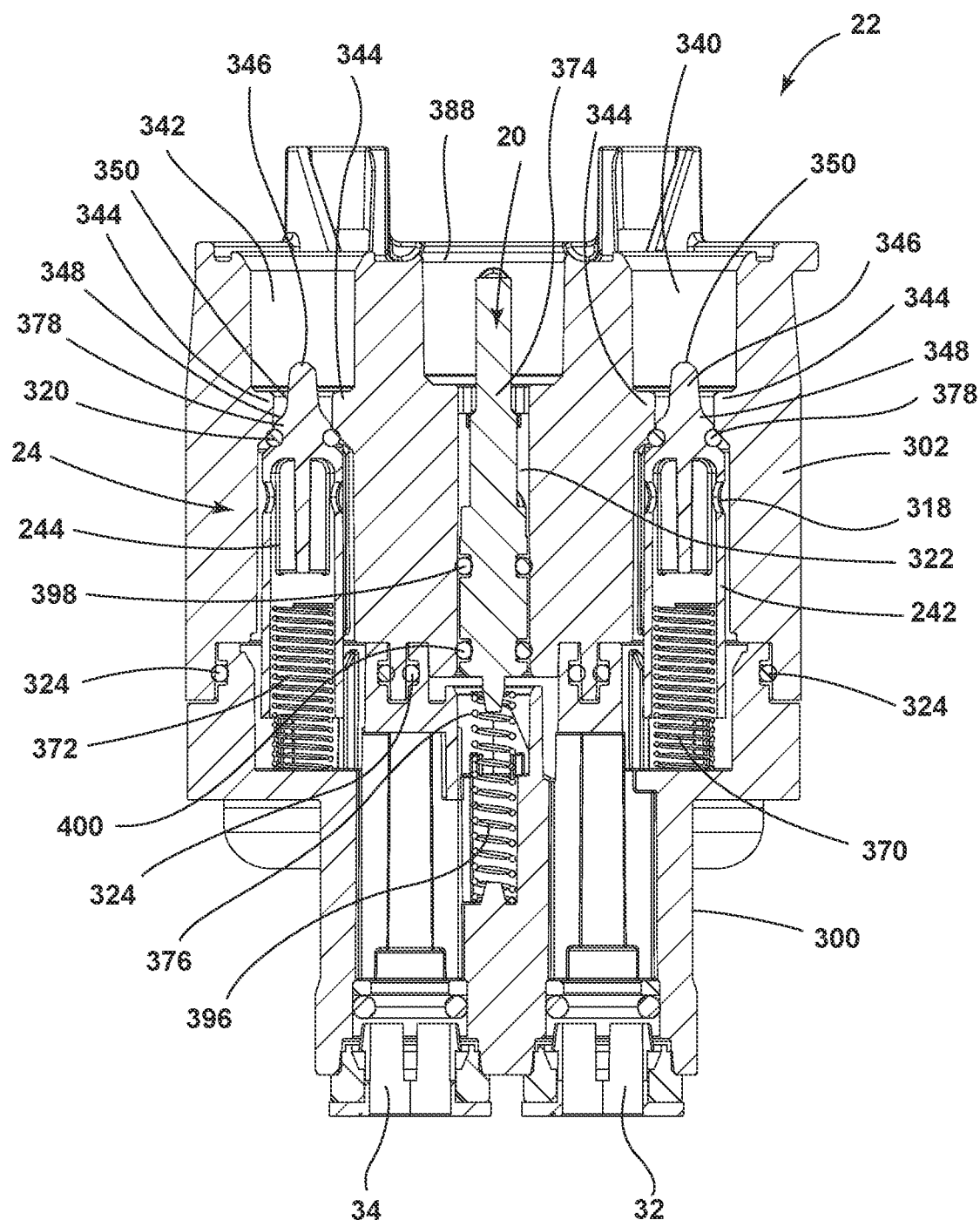
FIG. 15 is a cross-sectional view of the fluid manifold of FIG. 14, taken along line XV-XV, according to the present disclosure.
Figure 16:
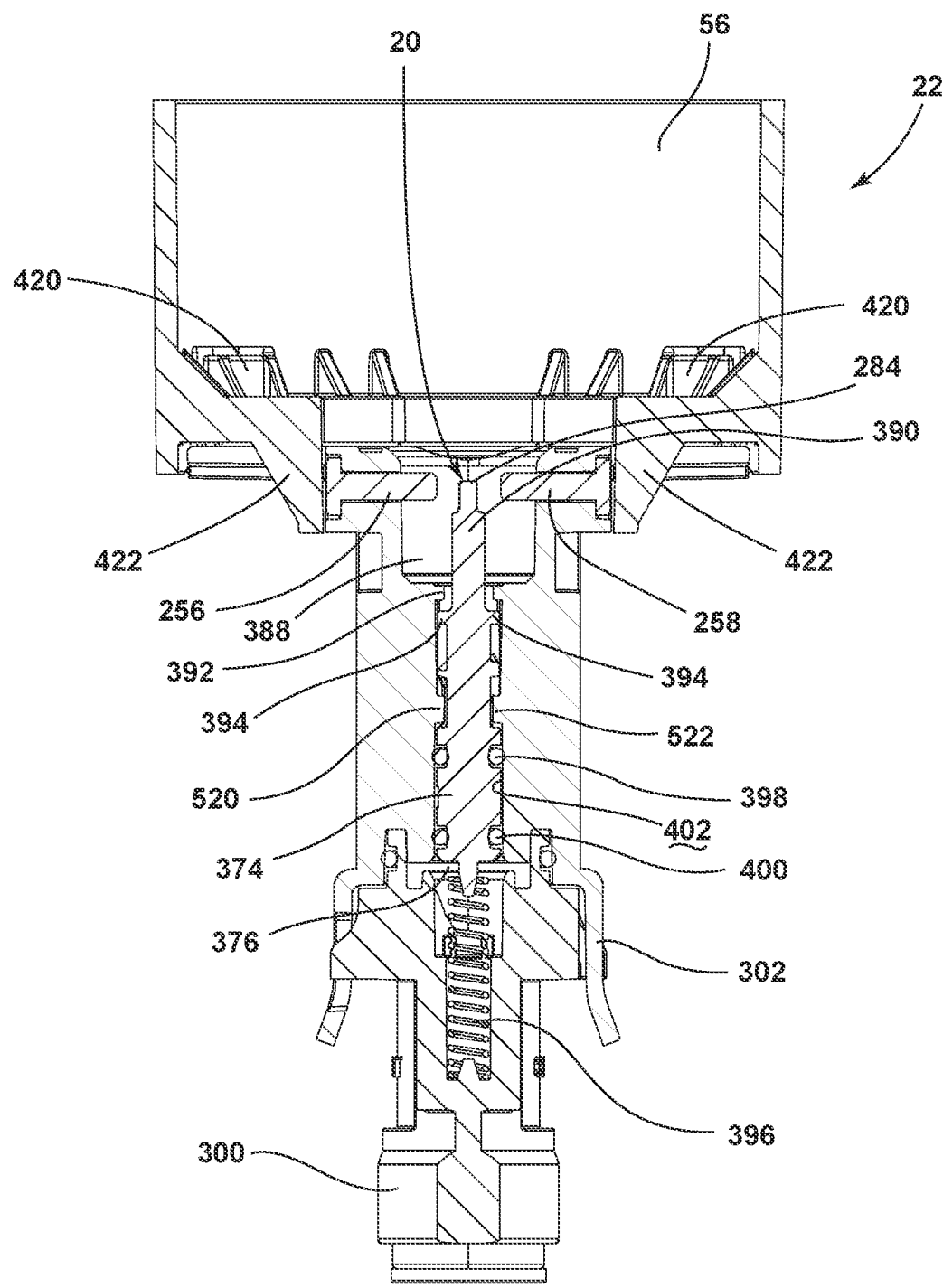
FIG. 16 is a cross-sectional view of the fluid manifold of FIG. 14, taken along line XVI-XVI, with a guide feature coupled to a housing of the fluid manifold, according to the present disclosure.
Figure 17:
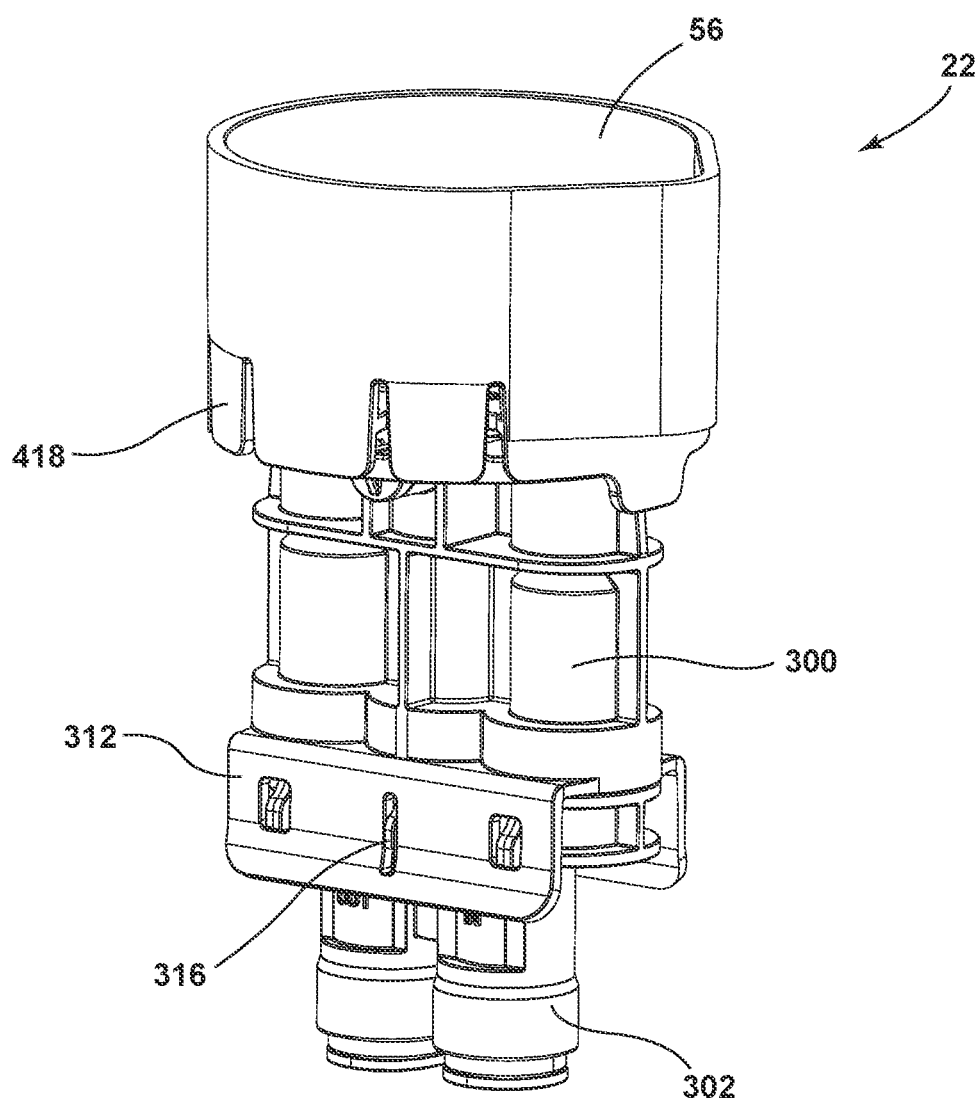
FIG. 17 is a side perspective view of a fluid manifold, according to the present disclosure.
Figure 18:
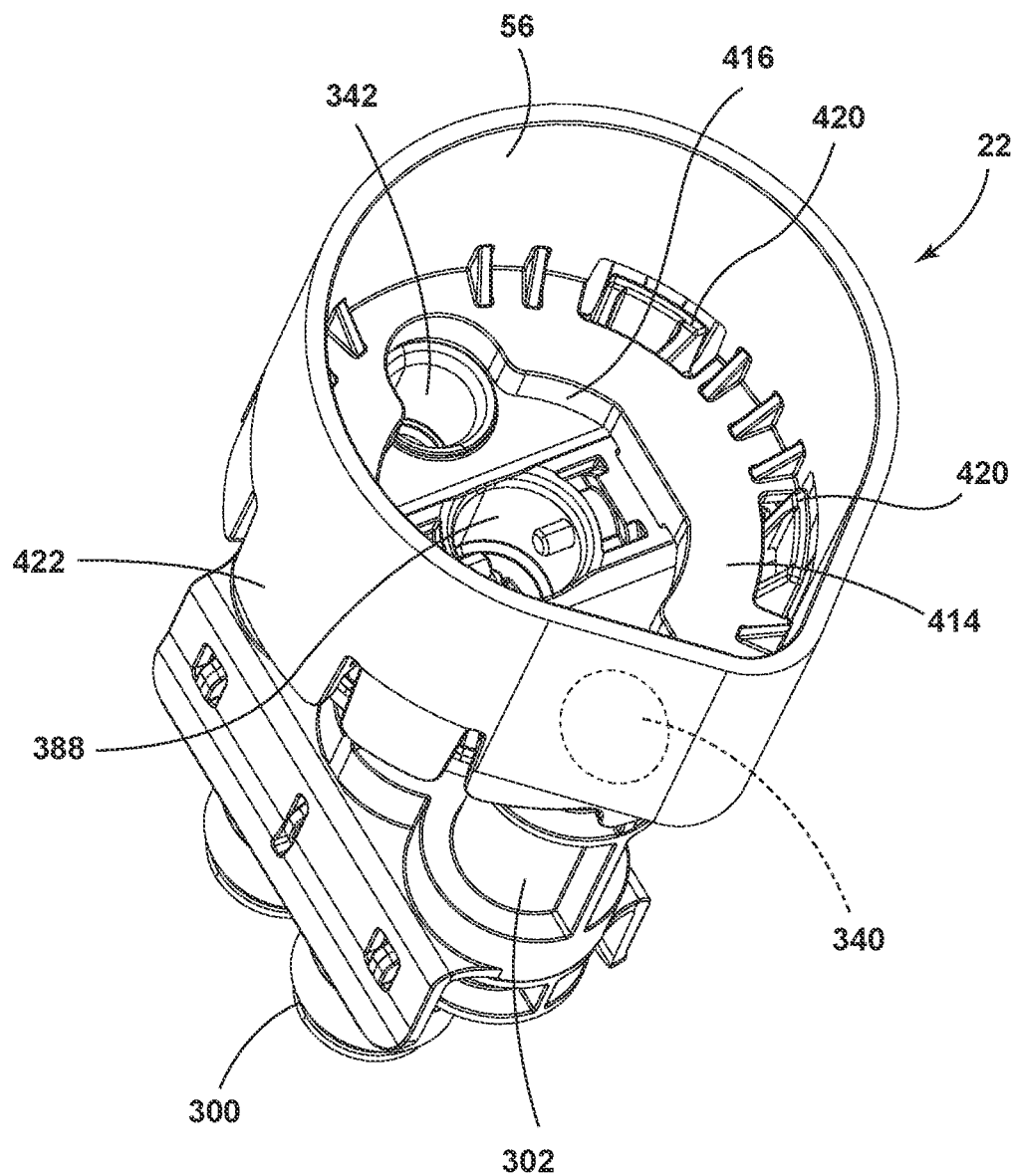
FIG. 18 is a side perspective view of a fluid manifold, according to the present disclosure.

Referring still to FIGS. 15 and 16, as well as FIGS. 17 and 18, as previously stated, the fluid manifold 22 includes the guide member 56. The guide member 56 is coupled to the housing 302 and guides engagement of the filter unit 10 with the fluid manifold 22. The guide member 56 defines a shape that mates with the shape of the filter unit 10 (e.g., the teardrop shape). A receiving surface 414 of the guide member 56 defines a guide opening 416 that assists in aligning the engaging portion 16 with the valve assembly 24 of the fluid manifold 22. The guide opening 416 extends around the inlet port 340, the outlet port 342, and the actuator port 388, providing a more precise location for inserting the filter unit 10. The guide member 56 includes snap members 418 that snap-engage with tabs 420 extending in a generally perpendicular direction from the housing 302.

The fluid manifold 22 includes the retaining features 256, 258 extending or projecting into the actuator port 388. Generally, there are two retaining features 256, 258 extending from the fluid manifold 22 and toward one another. The guide member 56 provides additional support proximate to each retention feature with support members 422 that engage the housing 302 proximate to the retaining features 256, 258. The guide member 56 is generally modular and is configured to be customizable, such that the guide member 56 may be utilized in appliances 40 (such as the non-limiting example shown in FIG. 52) having a variety of filter locations. When the bypass valve 20 is in the bypass position 374, the end 284 of the bypass valve 20 is disposed proximate to the retaining features 256, 258. This configuration allows for the fastener 170 to engage the bypass valve 20 and the retaining features 256, 258 generally concurrently.

Referring to FIGS. 19-22, during installation and removal of the filter unit 10 relative to the fluid manifold 22, the actuating assembly 50 is moved along the longitudinal axis 52 relative to the fluid manifold 22. During installation of the filter unit 10, the engaging portion 16 operates to activate each of the inlet valve 242 and the outlet valve 244. The first projection 80 and the second projection 84 selectively engage and activate the valve assembly 24 of the fluid manifold 22. Generally, the first projection 80 and the second projection 84 extend a similar distance from the central surface 186 of the engaging portion 16 to concurrently engage the inlet valve 242 and the outlet valve 244. However, the first and second projections 80, 84 may extend different lengths to sequentially activate the valve assembly 24. In certain aspects of the device, the engaging portion 16 may include only the first projection 80 for operating the inlet valve 242. In such an aspect of the device, fluid pressure can be utilized for operating the outlet valve 244. Additionally, in such an aspect, the first projection 80 may prevent rotational movement of the engaging portion 16 relative to the housing 302 of the fluid manifold 22.

When the filter unit 10 is moved to an engaged state 450, the first projection 80, which defines the filter inlet 82, is disposed within the inlet port 340, and the second projection 84, which defines the filter outlet 86, is disposed in the outlet port 342. Each of the first projection 80 and the second projection 84 include a seal, exemplified as an O-ring 452, disposed proximate the distal end 88, 90 for sealing within the fluid manifold 22. The O-rings 452 each cooperate with the housing 302 of the fluid manifold 22 to form a seal between the filter unit 10 and the inlet and outlet ports 340, 342 of the fluid manifold 22. The fastener 170 is disposed within the actuator port 388 and engages the bypass valve 20. The end 284 of the bypass valve 20 mates with the interlock 280 of the fastener 170. The end 284 of the bypass valve 20 defines a size and shape to fit within the interlock 280 in a mating or interference fit to retain the connection between the fastener 170 and the bypass valve 20.

In the engaged state 450, the fastener 170 is engaged with the bypass valve 20, and the bypass valve 20 remains in the bypass position 374. Additionally, the first projection 80 and the second projection 84 may not be engaged with the inlet valve 242 and the outlet valve 244, respectively. Alternatively, the first projection 80 and the second projection 84 may engage the inlet and outlet valves 242, 244, while the inlet and outlet valves 242, 244 remain in the closed positions 350, abutting the stop features 344. Accordingly, when the filter unit 10 is in the engaged state 450, the water flows through the bypass channel 376 and not the filter unit 10.

Figure 19:
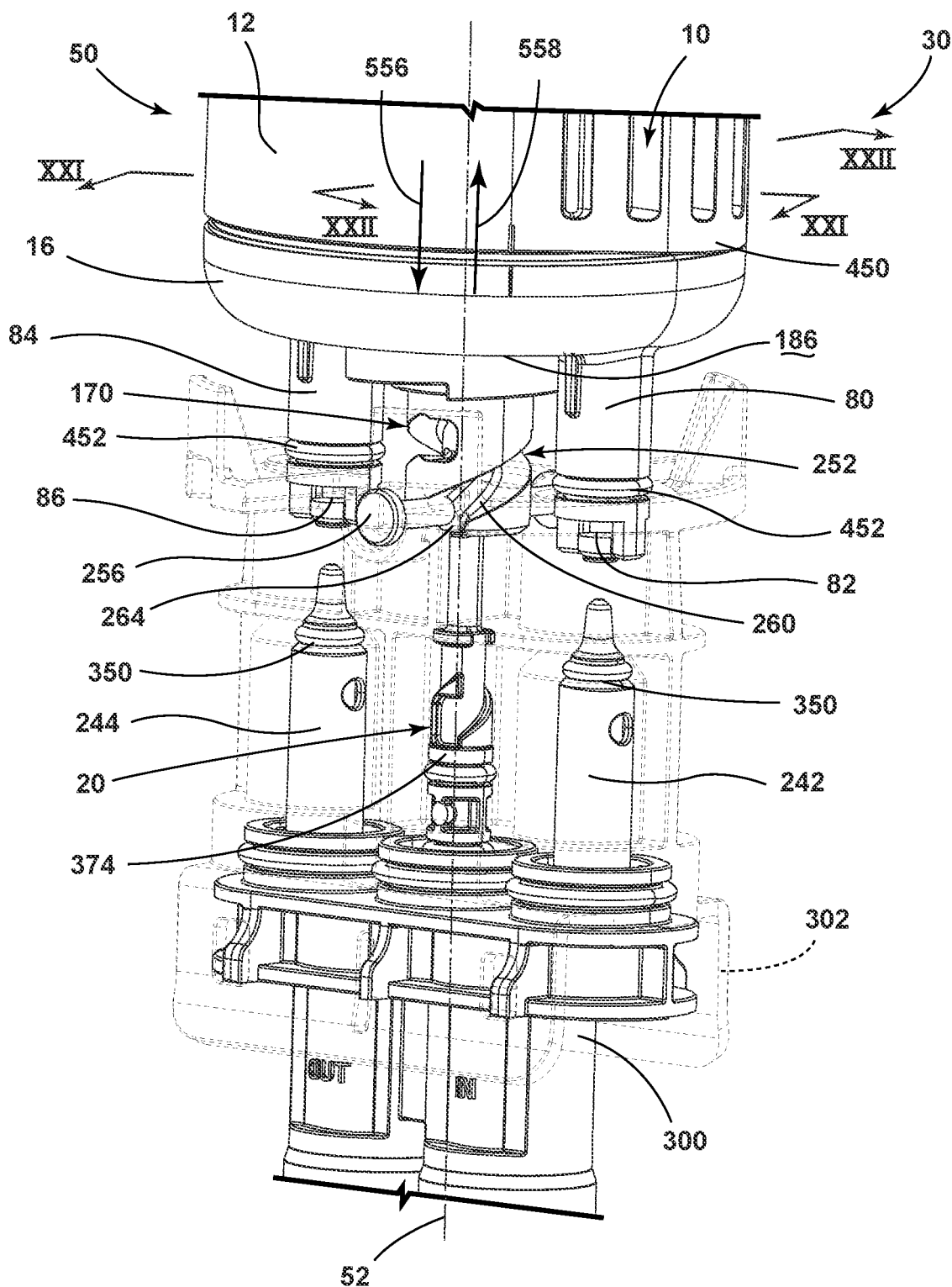
FIG. 19 is a partial perspective view of a filter assembly with a filter unit in an engaged state relative to a fluid manifold, according to the present disclosure.
Figure 20:
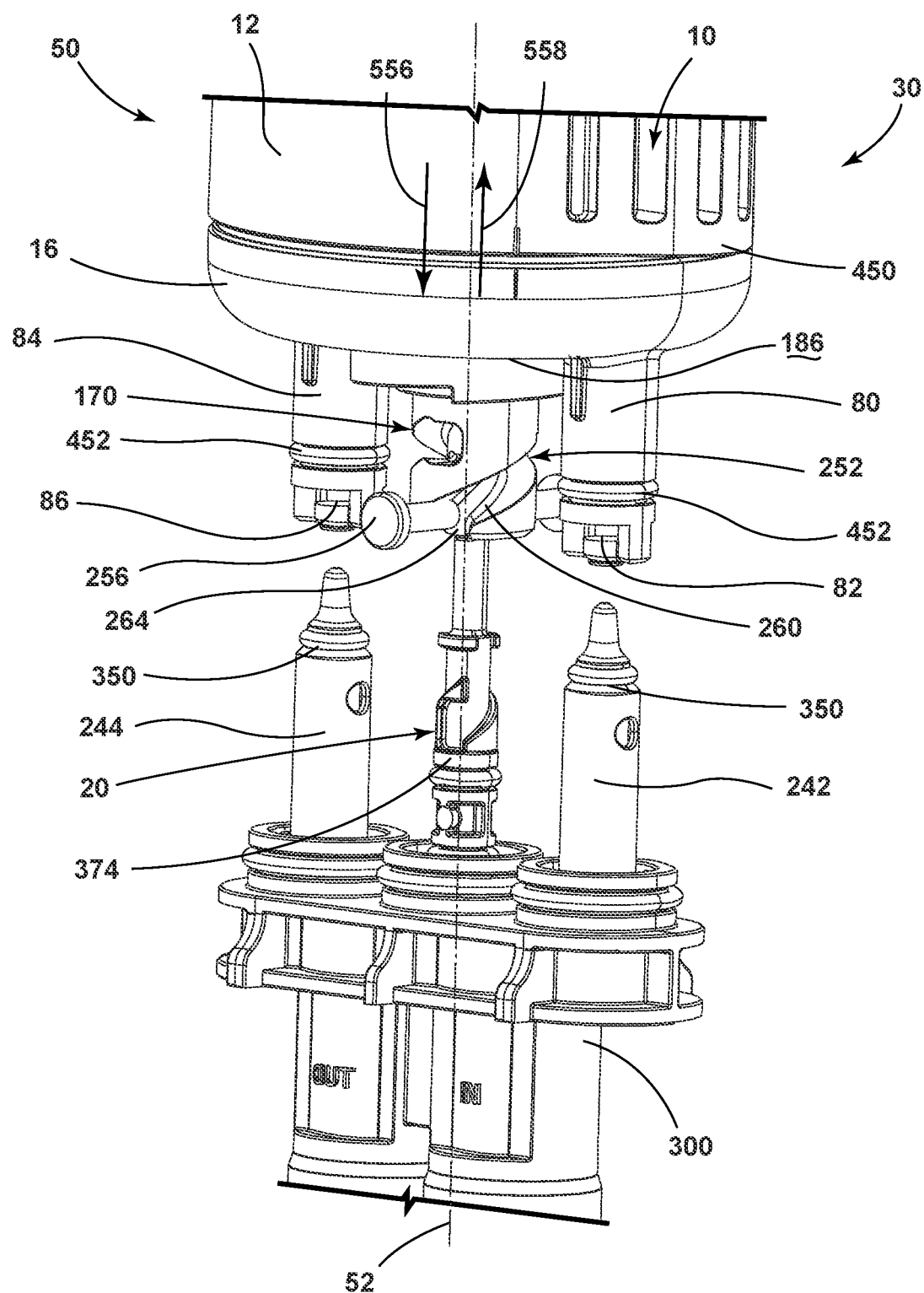
FIG. 20 is a partial perspective view of a filter assembly with a filter unit in an engaged state relative to a fluid manifold with a housing of the fluid manifold removed, according to the present disclosure.
Figure 21:
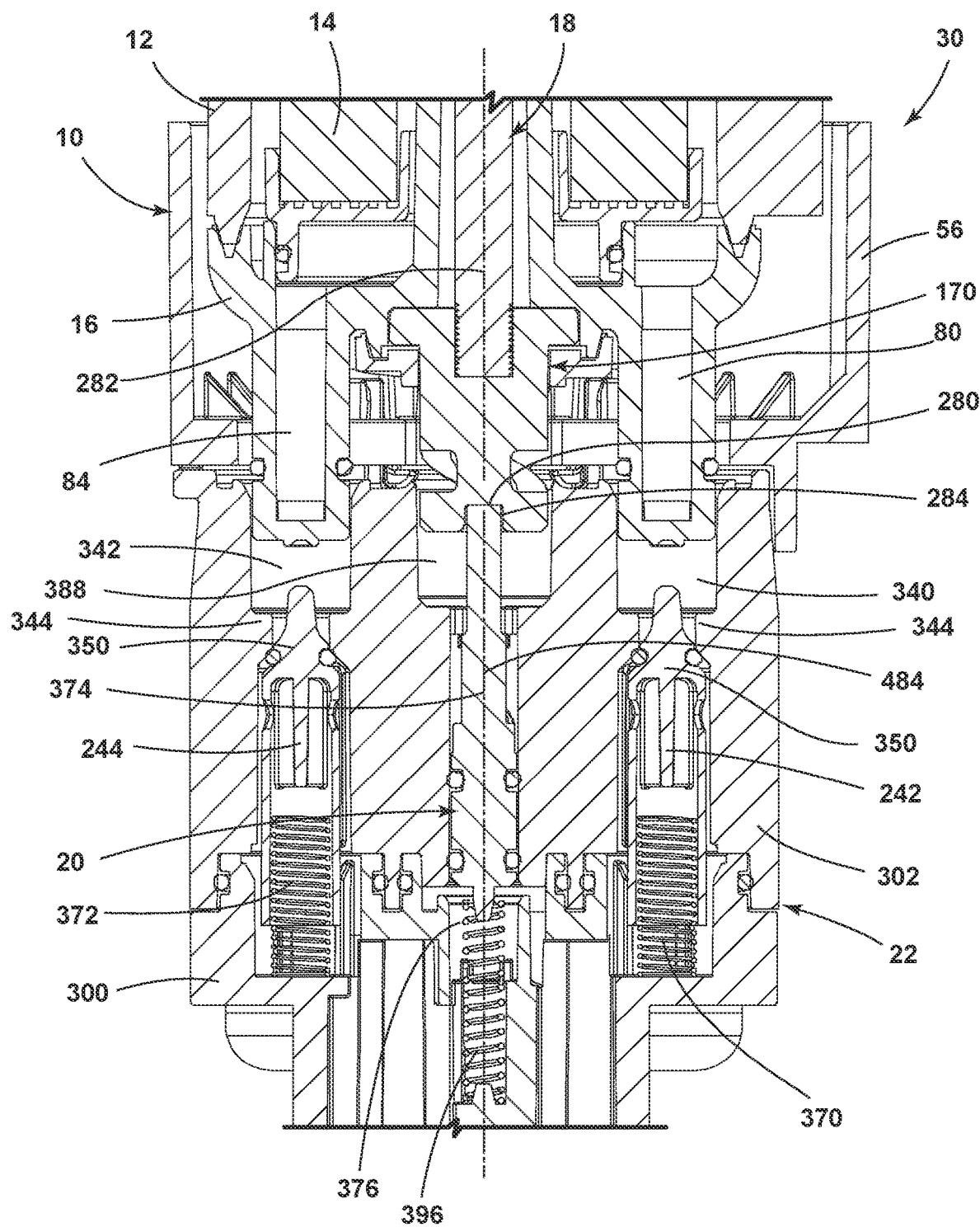
FIG. 21 is a cross-sectional view of the filter assembly of FIG. 19, taken along lines XXI-XXI, according to the present disclosure.
Figure 22:
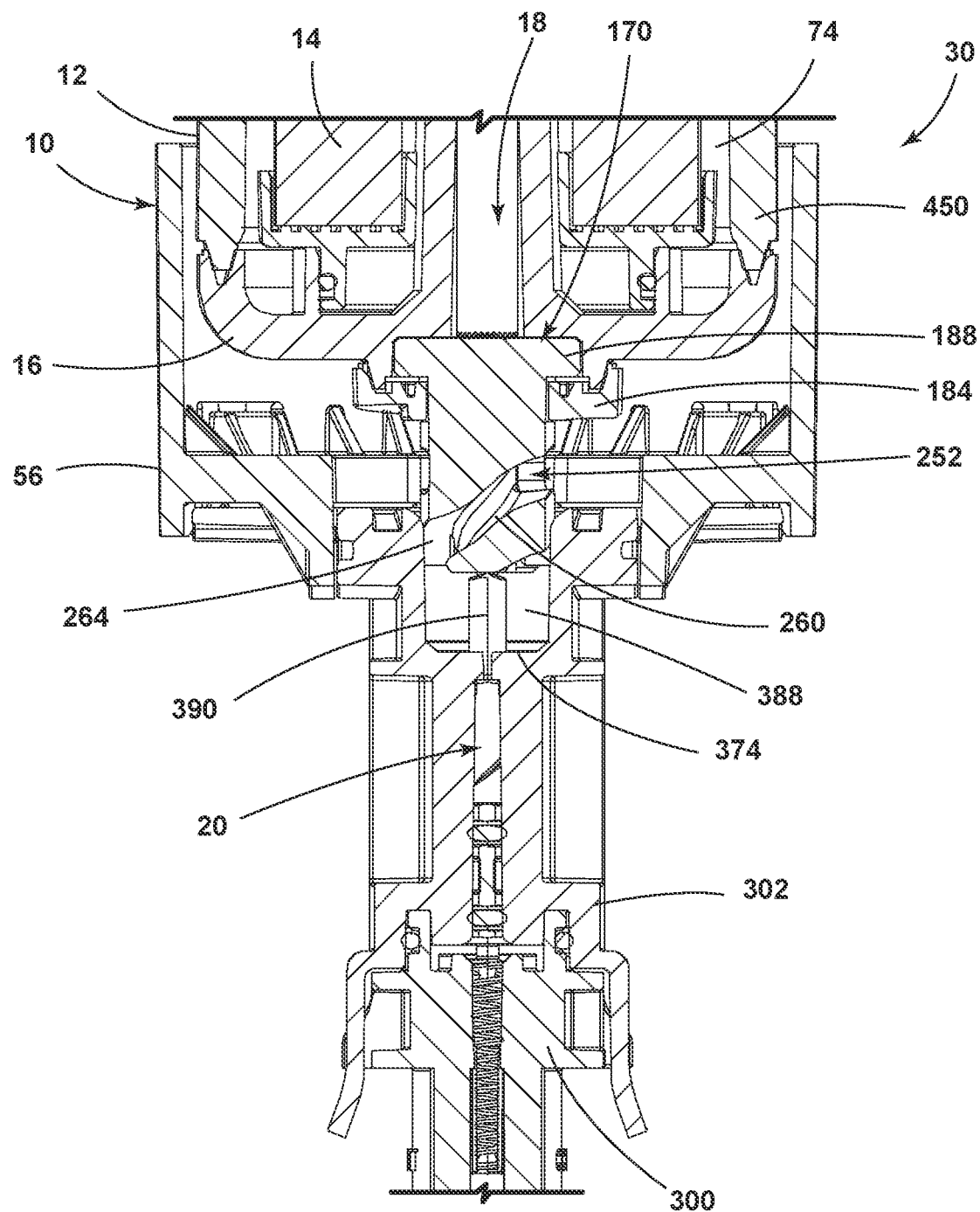
FIG. 22 is a cross-sectional view of the filter assembly of FIG. 19, taken along lines XXII-XXII, according to the present disclosure.

As the fastener 170 engages the end 284 of the bypass valve 20, the fastener 170 also engages the retaining features 256, 258. The fastener 170 is moved until the retaining features 256, 258 are disposed at the opening 264 of the corresponding sloped groove 260, 262, as illustrated in FIGS. 19 and 20. When the retaining features 256, 258 are engaged with the interface 252 of the fastener 170, the filter unit 10 may be moved to an installed state 454.

Referring to FIGS. 23-26, as the fastener 170 is rotated, the filter unit 10 is moved from the engaged state 450 toward the installed state 454. The fastener 170 rotates independently of the engaging portion 16, the body portion 12, and the housing 302 of the fluid manifold 22. The rotation of the fastener 170 draws the filter unit 10 toward the base 300 of the fluid manifold 22. In other words, the rotation of the fastener 170 axially adjusts the engaging portion 16 toward the valve assembly 24. The retaining features 256, 258 are illustrated as pins but may be any practicable feature for engaging the fastener 170. Alternatively, the fastener 170 may have other structures and formations that cooperate with various retainers, such as the retaining features 256, 258. The engagement between the retaining features 256, 258 and the fastener 170 limits or prevents axial movement of the filter unit 10 away from the fluid manifold 22 when the filter unit 10 is in the installed state 454.

As the fastener 170 is rotated, the engaging portion 16 selectively cooperates with the rotational operation of the bypass actuator 18 to axially engage the valve assembly 24. The first projection 80 and the second projection 84 are brought closer to and eventually into contact with the inlet valve 242 and the outlet valve 244, respectively. The distal end 88, 90 of each of the first and second projections 80, 84 defines a recess 464 for receiving the tip 346 of the inlet and outlet valves 242, 244, respectively. The recesses 464 retain the engagement with the tips 346 as the engaging portion 16, the inlet valve 242, and the outlet valve 244 are axially moved. This helps to prevent eccentric motion of the inlet and outlet valves 242, 244 when separated from the stop features 344.

The engaging portion 16 is adjusted axially and remains axially aligned with the base 300 of the fluid manifold 22 as the fastener 170 is rotated. At least one of the first and second projections 80, 84 prevents rotational movement of the engaging portion 16 relative to the housing 302 of the fluid manifold 22. The first and second projections 80, 84 overcome the biasing forces of the first and second biasing members 370, 372 to adjust the inlet and outlet valves 242, 244 to opened positions 466, allowing water to travel into the filter inlet 82, through the filter unit 10, and then out the filter outlet 86.

The rotation of the fastener 170 allows the sloped grooves 260, 262 to be operated relative to the retaining features 256, 258. The engagement between the fastener 170 and the retaining features 256, 258 operates to axially draw the filter unit 10 toward the base 300 of the fluid manifold 22. The pitch of the sloped grooves 260, 262 allows for precise movement of the filter unit 10 into the installed state 454, as well as a precise insertion depth of the filter unit 10. In addition, the mechanical advantage afforded by the sloped grooves 260, 262 provides for a tighter seal between the filter unit 10 and the fluid manifold 22.

When in the installed state 454, the retaining features 256, 258 are disposed within the detents 268. The detents 268 operate to hold the retaining features 256, 258 in a selected position of the interface 252 to secure the filter unit 10 in the installed state 454. These features are configured to secure the body portion 12 to the fluid manifold 22 to limit movement away from the fluid manifold 22 along the longitudinal axis 52 when the filter unit 10 is in the installed state 454. These features can operate to prevent over-insertion of the filter unit 10 and over-rotation of the fastener 170, which could lead to damage to the fluid manifold 22. It is contemplated that in certain aspects the knob 204 (FIGS. 1A-5 and 48) may bear most or all of the forces of stopping rotational travel of the bypass actuator 18.

Figure 26:
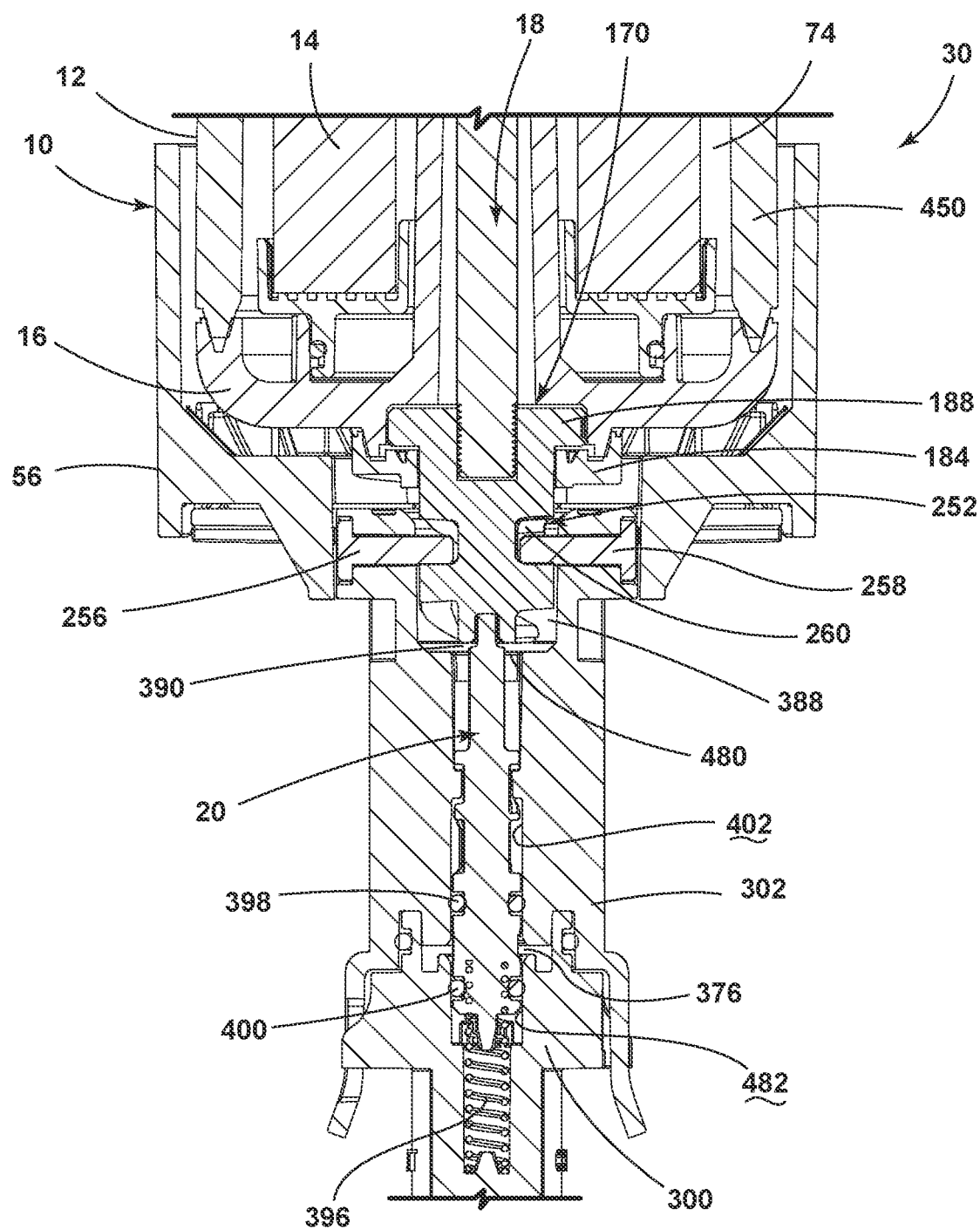
FIG. 26 is a cross-sectional view of the filter assembly of FIG. 23, taken along lines XXVI-XXVI, according to the present disclosure.

Referring still to FIG. 26, as well as FIGS. 27-30, rotational and axial movement of the fastener 170 drives rotational and axial movement of the bypass valve 20 within the bypass valve cavity 322 between the bypass position 374 and a filtering position 480. The fastener 170 overcomes the biasing force of the third biasing member 396 to adjust the bypass valve 20 to the filtering position 480. In the filtering position 480, due to the axial adjustment of the bypass valve 20, the bypass valve 20 blocks the bypass channel 376, forcing water through the filter unit 10. The first O-ring 398 remains engaged with the inner surface 402 of the housing 302, providing a seal within the bypass valve cavity 322. Due to the axial adjustment of the bypass valve 20, the second O-ring 400 abuts an inner surface 482 of the base 300, providing a further seal within the bypass valve cavity 322.

The fastener 170 moves the bypass valve 20 relative to a bypass rotational axis 484. The fastener 170 rotates the bypass valve 20 about the bypass rotational axis 484 and, concurrently, moves the bypass valve 20 along the bypass rotational axis 484. It is also contemplated that the fastener 170 may drive the rotational and axial movement of the bypass valve 20 independently. Accordingly, the fastener 170 drives both rotation of the bypass valve 20 and also axial movement of the bypass valve 20 in a simultaneous motion, a concurrent motion, a sequential motion, or a combination thereof. Moreover, it is contemplated that axial movement of the fastener 170 may impart axial and rotational motion to the bypass valve 20.

As illustrated in FIGS. 27-30, the end 284 of the bypass valve 20 defines a mating feature 488 for being selectively received by the interlock 280 of the fastener 170. In the illustrated example, the mating feature 488 defines a lemniscate, "FIG. 8," or hourglass shape that is selectively disposed within the interlock 280. The size and shape of the mating feature 488 provide the interference fit between the bypass valve 20 and the fastener 170.

The bypass valve 20 includes a ledge 490 positioned proximate to the first O-ring 398. Adjacent to the ledge 490 are two guide features 492, 494. The guide features 492, 494 generally slope from the ledge 490 toward the projections 394. The guide features 492, 494 spiral or extend in a similar orientation and direction (e.g., counter clockwise) around the bypass valve 20, such that the first guide feature 492 does not interfere with the second guide feature 494. The guide features 492, 494 are substantially similar and disposed on opposing sides of the bypass valve 20.

Each guide feature 492, 494 has a sloped surface 496 that extends from a bypass location 498 to a filtering location 500. The filtering location 500 is disposed vertically above the bypass location 498 (e.g., toward the end 284 of the bypass valve 20) and on an opposing side of the bypass valve 20 relative to the filtering location 500. Each guide feature 492, 494 extends approximately 180° around the bypass valve 20. Accordingly, the bypass location 498 of the first guide feature 492 is generally vertically aligned with the filtering location 500 of the second guide feature 494.

Proximate to the filtering location 500, each guide feature 492, 494 defines a stop wall 502. The stop wall 502 of the first guide feature 492 and the bypass location 498 of the second guide feature 494 feature define a retaining space 504. The stop wall 502 of the second guide feature 494 and the bypass location 498 of the first guide feature 492 define a retaining space 504 on the opposing side of the bypass valve 20. This stop wall 502 prevents inadvertent operation of the bypass valve 20 as well as improper installation of the filter unit 10.

The bypass location 498 may have several configurations. As illustrated in FIG. 28, each bypass location 498 may have a vertical wall 506 adjacent to the retaining space 504. After the vertical wall 506, each guide feature 492, 494 may continue to slope along the bypass valve 20. The vertical wall 506 may be advantageous for preventing rotation of the bypass valve 20 without sufficient axial movement.

Figure 29:
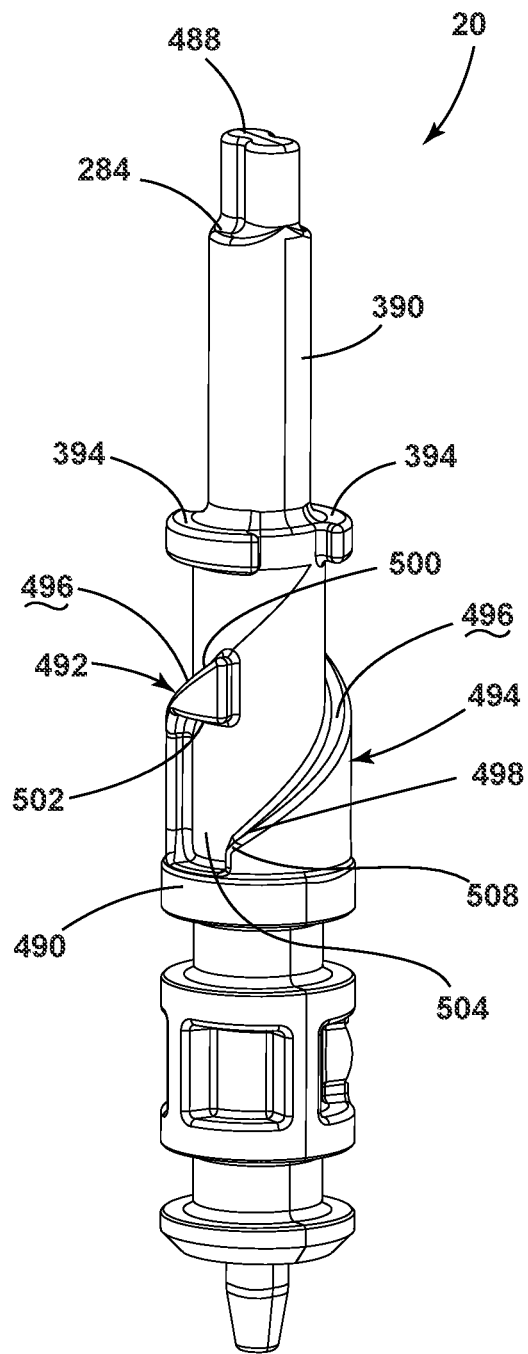
FIG. 29 is another side perspective view of a bypass valve, according to the present disclosure.
Figure 30:
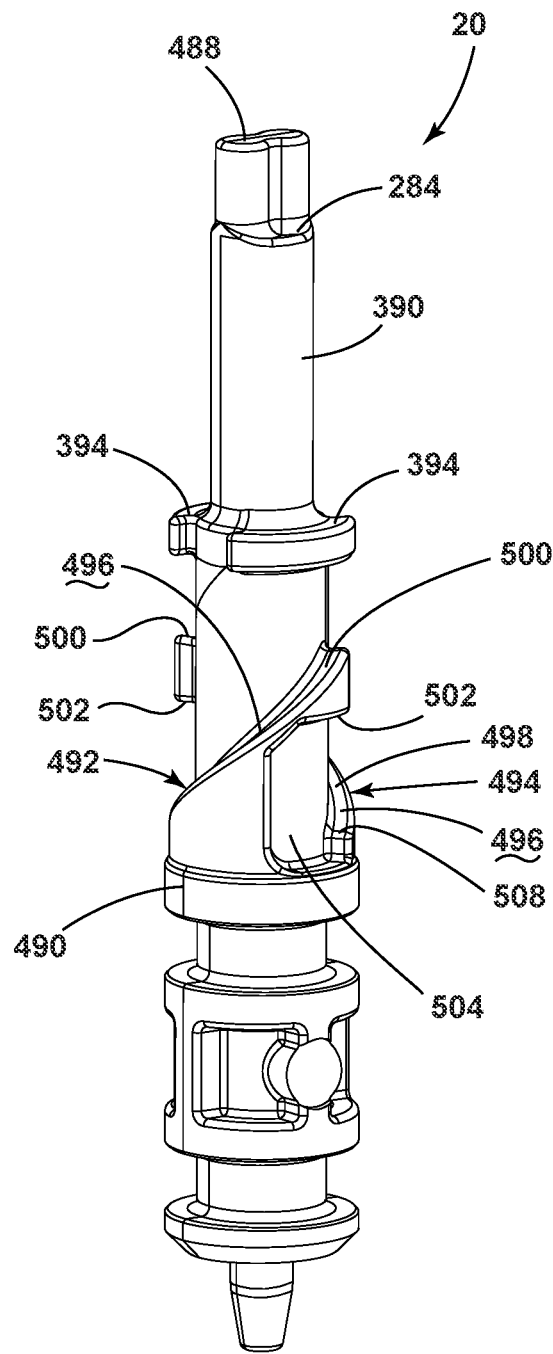
FIG. 30 is another side perspective view of a bypass valve, according to the present disclosure
Figure 31:
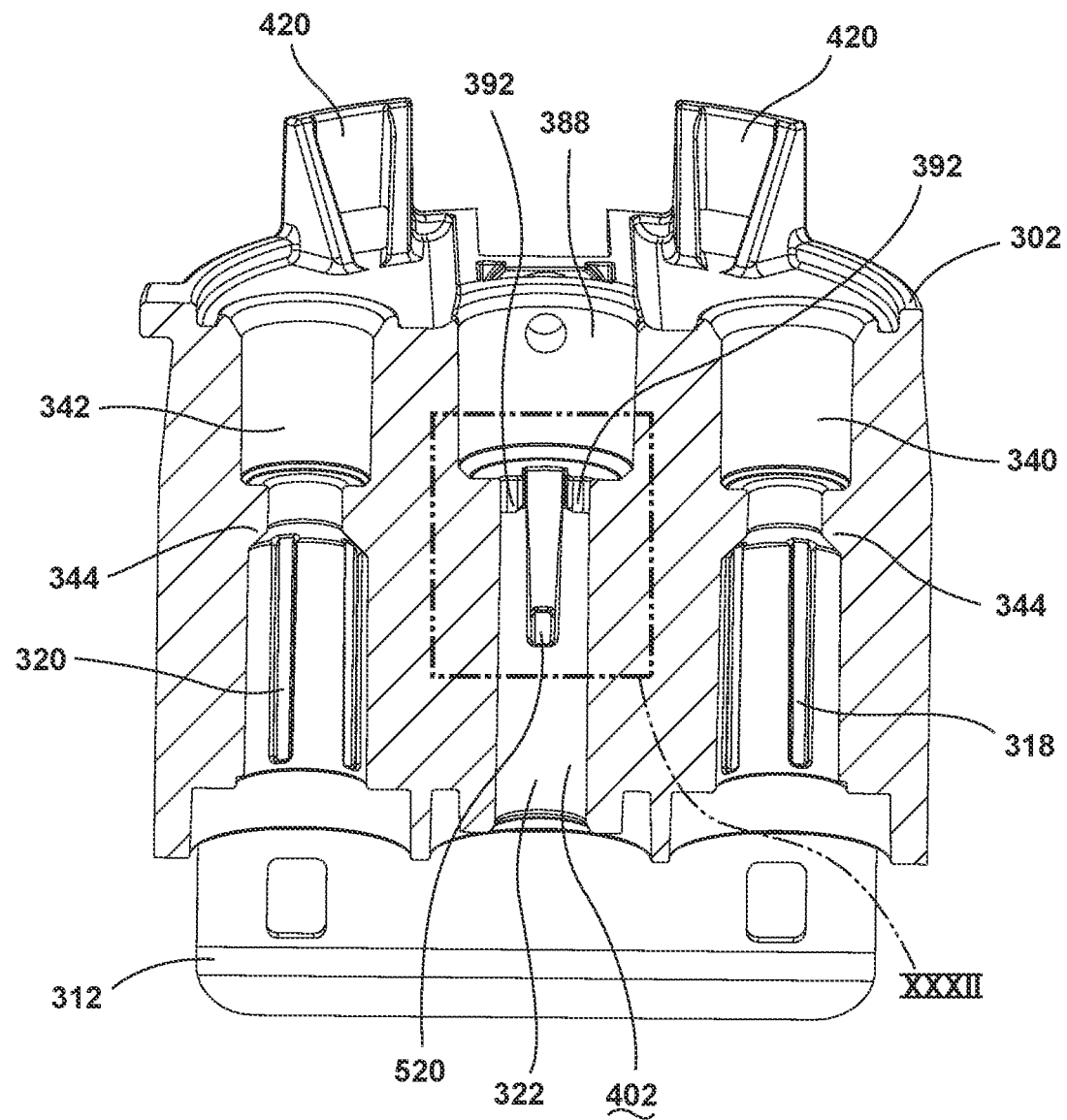
FIG. 31 is a partial cross-sectional view of a housing of a fluid manifold of FIG. 25, according to the present disclosure.
Figure 32:
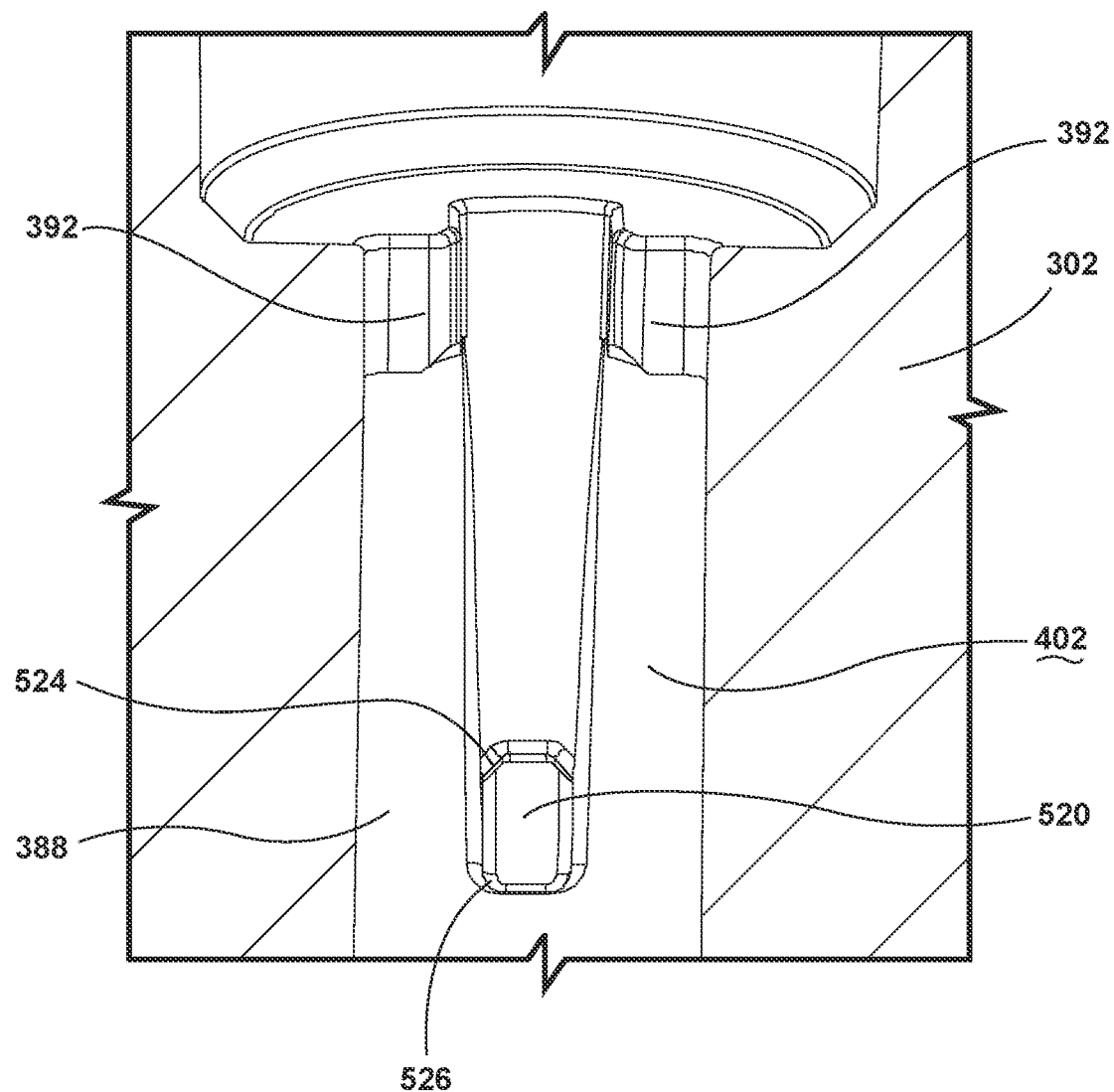
FIG. 32 is an enlarged view of a protrusion of the fluid manifold of FIG. 31, taken at area XXXII, according to the present disclosure.
Figure 45:
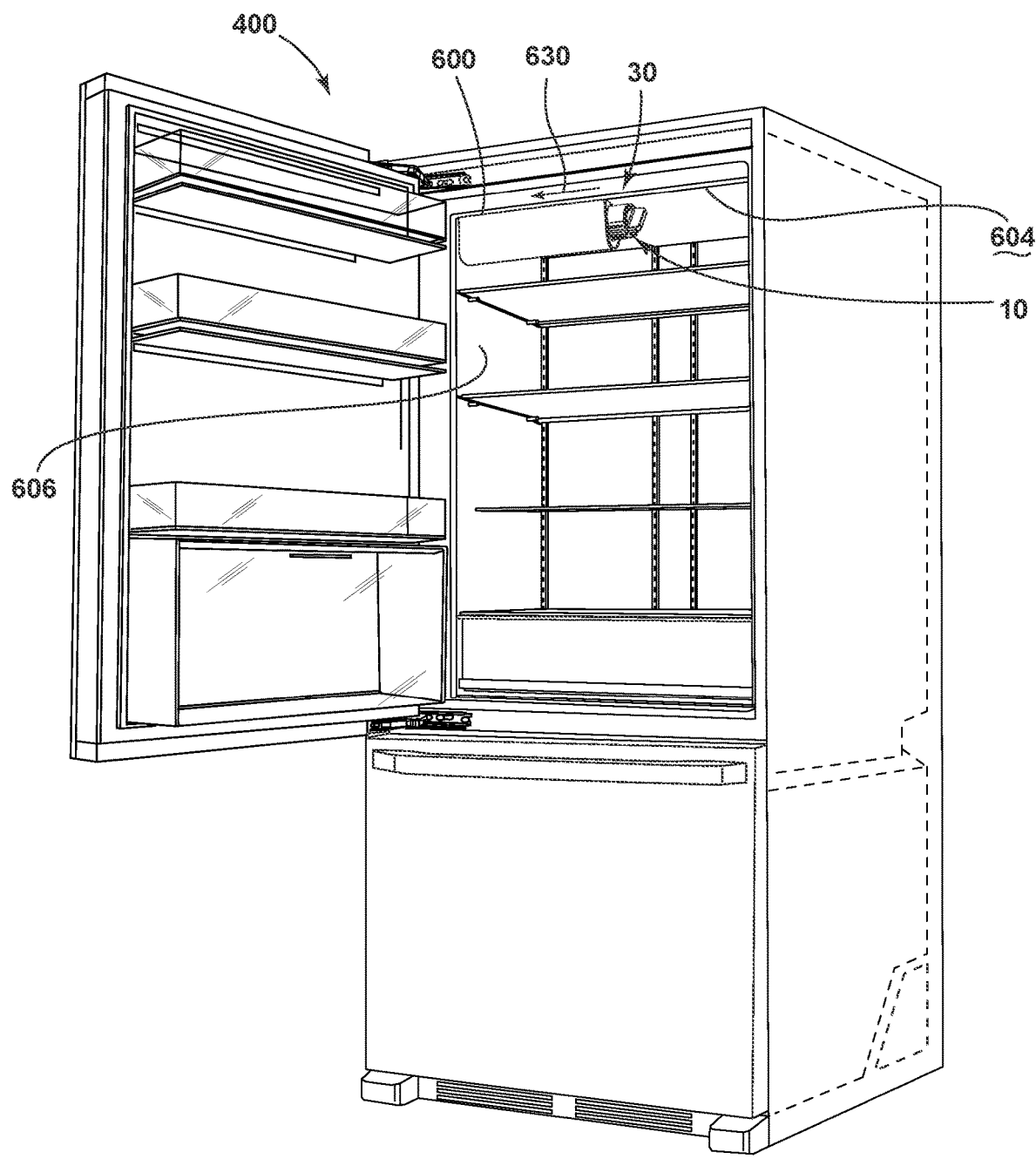
FIG. 45 is a front perspective view of an appliance having a filter assembly in an exemplary and non-limiting location, according to the present disclosure.

Alternatively, as illustrated in FIG. 29, the bypass location 498 of the guide features 492, 494 include a chamfered edge 508 that extends into the sloped surface 496. The chamfered edge 508 may be advantageous for promoting the sliding engagement of the bypass valve 20 with the fluid manifold 22. These features are incorporated to provide a consistent and repeatable installation and removal procedure for each filter unit 10 and all replacement filter units 10 that are used during the life of the appliance 40 (FIG. 45). The consistent and repeatable operation of the filter unit 10 results in a similarly consistent and repeatable operation that limits damage and wear of the fluid manifold 22.

Referring to FIGS. 31-34, the fluid manifold 22 defines protrusions 520, 522 that extend into the bypass valve cavity 322 to interact with the bypass valve 20 or aspects thereof as discussed herein. While only one protrusion 520 is illustrated, it is contemplated that the second protrusion 522 is substantially similar (see FIG. 34). The protrusions 520, 522 may be aligned with and extend from the same sides of the fluid manifold 22 as the retaining features 256, 258. The protrusions 520, 522 extend from opposing sides of the fluid manifold 22 and into the bypass valve cavity 322 toward one another. The protrusions 520, 522 have chamfered corners 524 on one side and rounded corners 526 on the opposing side for slidably engaging the bypass valve 20. Other configurations and positions of the protrusions 520, 522 are contemplated without departing from the teachings herein.

Figure 33:
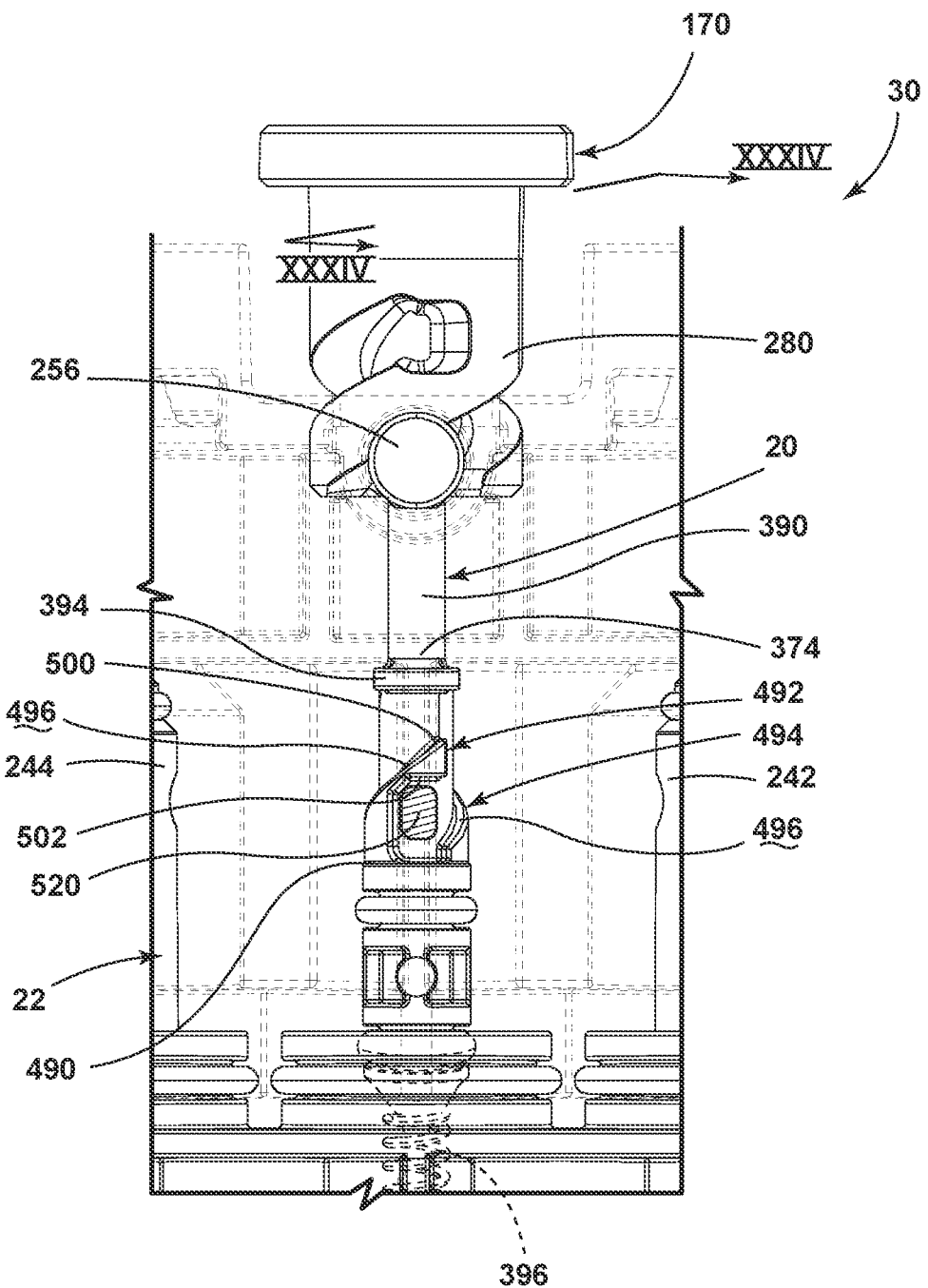
FIG. 33 is a partial side perspective view of a filter manifold that has a bypass including a guide feature that slidably engages a protrusion, according to the present disclosure.
Figure 34:
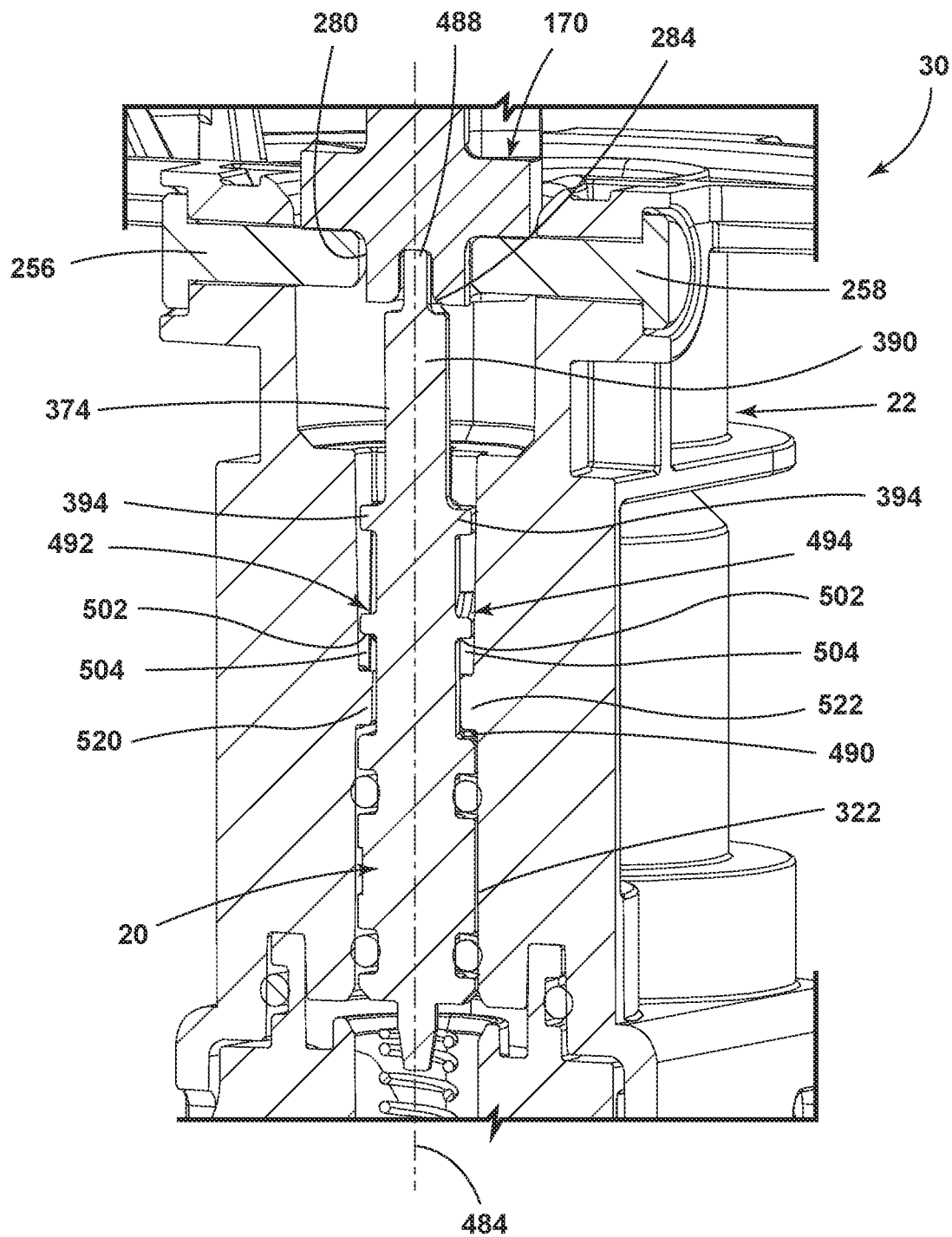
FIG. 34 is a cross-sectional perspective view of the bypass valve engaging a bypass actuator of FIG. 33, taken along lines XXXIV-XXXIV, according to the present disclosure.

Referring to FIGS. 33 and 34, when the bypass valve 20 is in the bypass position 374, the protrusions 520, 522 of the fluid manifold 22 are disposed within the retaining spaces 504 adjacent to the ledge 490 and proximate to the bypass location 498 of the guide features 492, 494. The protrusions 520, 522 are disposed vertically below the stop walls 502 of the guide features 492, 494. While only one side of the bypass valve 20 is illustrated, it is contemplated that the opposing side is substantially similar to the illustrated configuration.

As illustrated in FIG. 33, the protrusion 520 of the fluid manifold 22 is illustrated abutting the stop wall 502. If the bypass valve 20 is moved axially without rotational movement, the protrusion 520 of the fluid manifold 22 abuts the respective stop wall 502. Any further axial movement of the bypass valve 20 is prevented by the engagement of the protrusion 520 with the stop wall 502. The protrusion 522 is configured to engage the opposing stop wall 502 in a substantially similar manner. Generally, axial movement in a range of about 1 mm to about 2 mm is allowed until the protrusions 520, 522 engage the respective stop walls 502. These motion control features are used to ensure the consistent and repeatable motion of the filter unit 10 as the bypass valve 20 results in a repeatable insertion depth of the filter unit 10 and the bypass valve 20 to limit damage and wear to the fluid manifold 22.

Referring to FIGS. 35-38, with axial and rotational movement of the bypass valve 20, the stop walls 502 control the movement of the bypass valve 20. For example, the stop walls 502 may allow rotation in a first direction and minimize or prevent rotation in an opposing direction. Further, the stop walls 502 may minimize movement in the axial direction without rotating the bypass valve 20. The stop walls 502 and/or the sloped grooves 260, 262 of the fastener 170 interacting with the retaining features 256, 258 may also control the amount of force and pressure that may be exerted on the bypass valve 20 during installation and removal of the filter unit 10. It is also contemplated that the bypass valve 20 may not contact the stop walls 502 during rotation of the bypass valve 20. In such examples, the O-rings 398, 400 generally suspend the bypass valve 20 in the valve cavity 322. Each of the O-rings described herein may be a sealing member, gasket O-ring, or other components for creating or forming a seal between two components without departing from the teachings herein.

Figure 35:
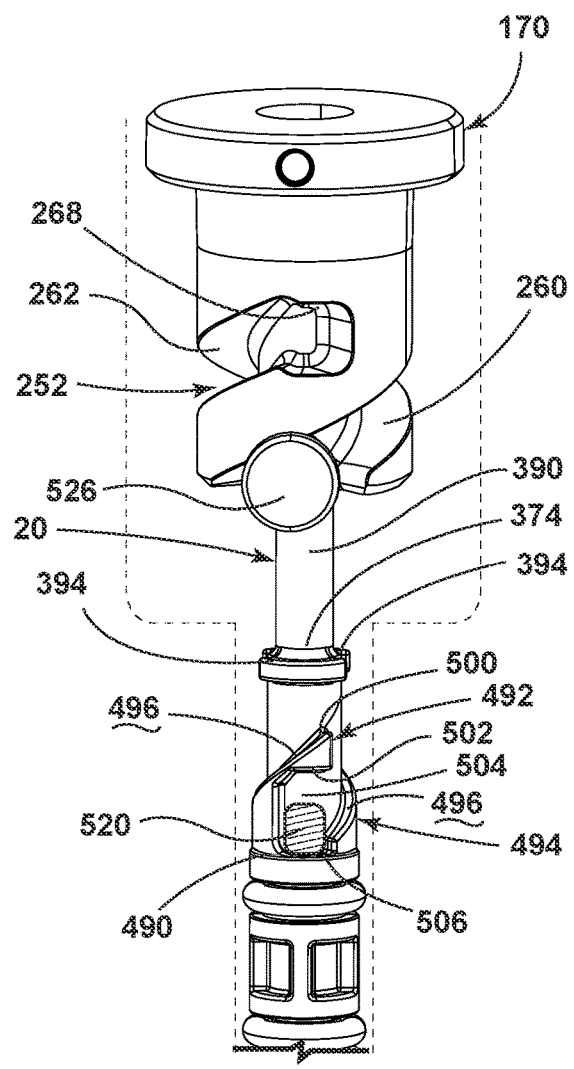
FIG. 35 is a schematic view of a bypass valve engaging a protrusion of a fluid manifold and a fastener of a bypass actuator engaging a retaining feature of the fluid manifold, with the bypass valve in a bypass position, according to the present disclosure.
Figure 36:
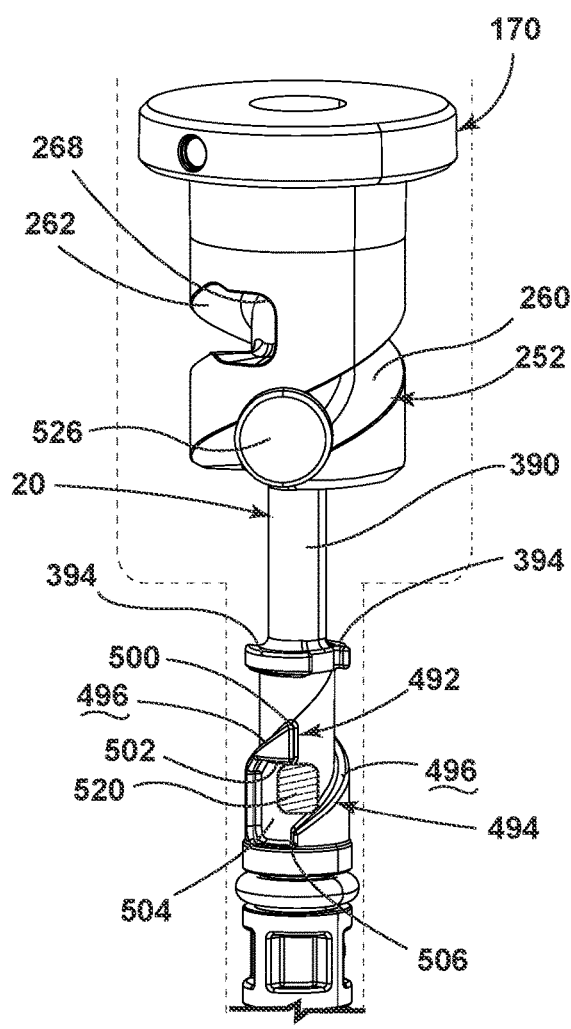
FIG. 36 is a schematic view of a bypass valve engaging a protrusion of a fluid manifold and a fastener of a bypass actuator engaging a retaining feature of the fluid manifold, with the bypass valve between a bypass position and a filtering position, according to the present disclosure.
Figure 37:
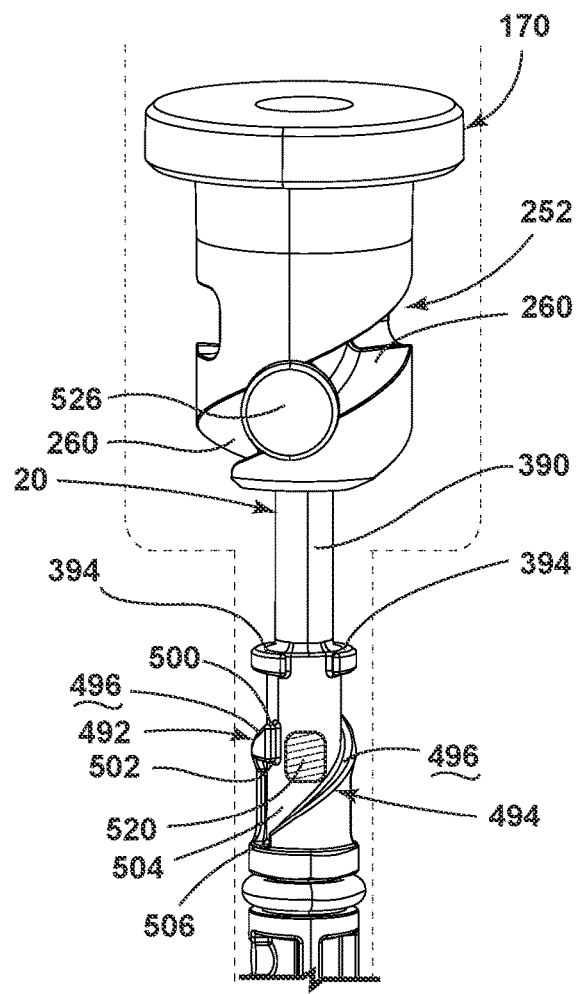
FIG. 37 is a schematic view of a bypass valve engaging a protrusion of a fluid manifold and a fastener of a bypass actuator engaging a retaining feature of the fluid manifold, with the bypass valve between a bypass position and a filtering position, according to the present disclosure.

When the bypass valve 20 is in the bypass position 374, as illustrated in FIG. 35, the protrusions 520, 522 are disposed within the respective retaining spaces 504 proximate to the ledge 490. As bypass valve 20 rotates, the guide features 492, 494 adjust so that the protrusions 520, 522 are guided out of the retaining space 504 and over the vertical walls 506 or the chamfered edges 508 of the guide features 492, 494. The protrusions 520, 522 move over the sloped surface 496 as the bypass valve 20 is moved axially and rotated. The protrusions 520, 522 may be spaced from the sloped surface 496 during rotation of the bypass valve 20, or alternatively, the sloped surface 496 may slidably engage the protrusions 520, 522 as the bypass valve 20 rotates. The bypass valve 20 continues to move further into the bypass valve cavity 322 due to the actuation by the fastener 170. In moving into the bypass valve cavity 322, the bypass valve 20 continues to rotate until the protrusions 520, 522 are disposed at the filtering location 500, which coincides with when the bypass valve 20 is in the filtering position 480.

Figure 38:
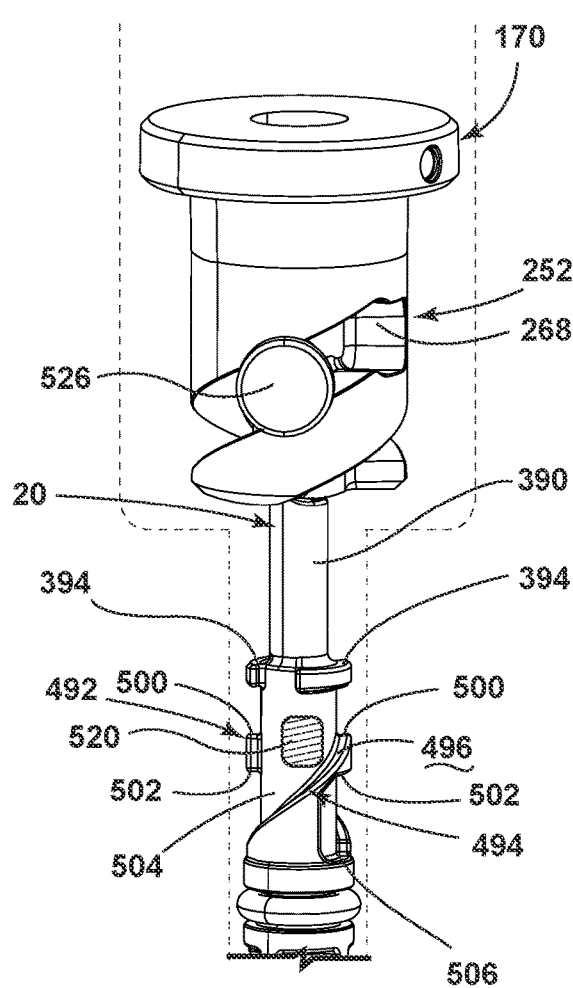
FIG. 38 is a schematic view of a bypass valve engaging a protrusion of a fluid manifold and a fastener of a bypass actuator engaging a retaining feature of the fluid manifold, with the bypass valve between a bypass position and a filtering position, according to the present disclosure.
Figure 39:
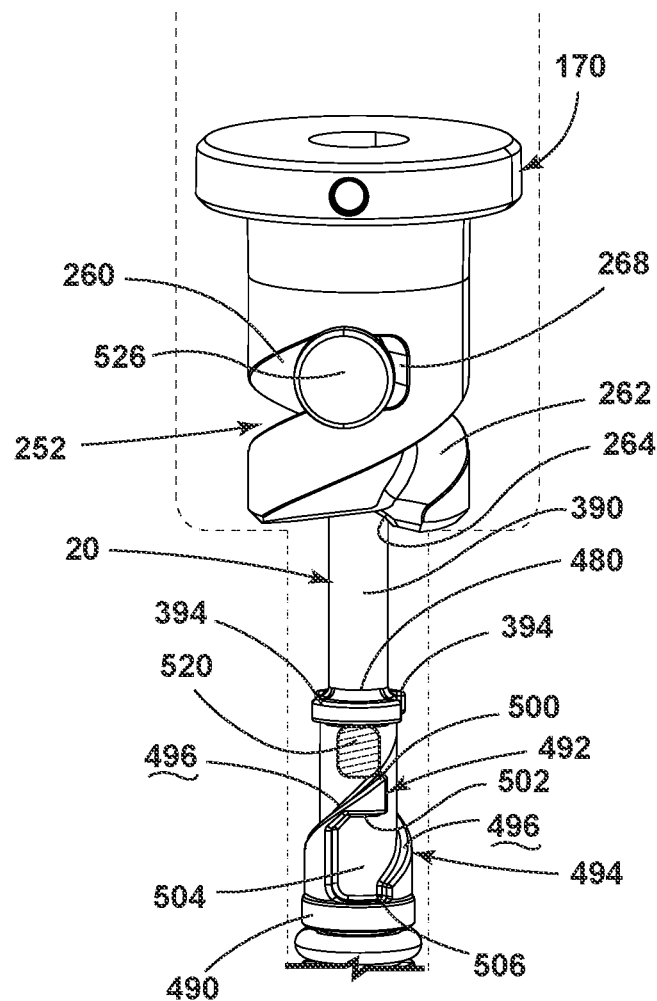
FIG. 39 is a schematic view of a bypass valve engaging a protrusion of a fluid manifold and a fastener of a bypass actuator engaging a retaining feature of the fluid manifold, with the bypass valve in a filtering position and the retaining feature within a detent of the fastener, according to the present disclosure.

When the protrusions 520, 522 are at the filtering location 500 of the guide features 492, 494, as illustrated in FIG. 38, the protrusions 520, 522 are disposed vertically above the retaining spaces 504 from the opposing side of the bypass valve 20. Additionally, when the protrusions 520, 522 are at the filtering locations 500, the bypass valve 20 is fully in the filtering position 480, the filter unit 10 is in the installed state 454, and the filter unit 10 and the bypass valve 20 are at the proper insertion depth relative to the housing 302 of the fluid manifold 22. The bypass valve 20 generally rotates up to about 180°. In various examples, the bypass valve 20 generally rotates between about 500 and about 60° between the bypass position 374 and the filtering position 480. In certain aspects, the bypass valve 20 rotates about 55° between the bypass position 374 and the filtering position 480.

Figure 40:
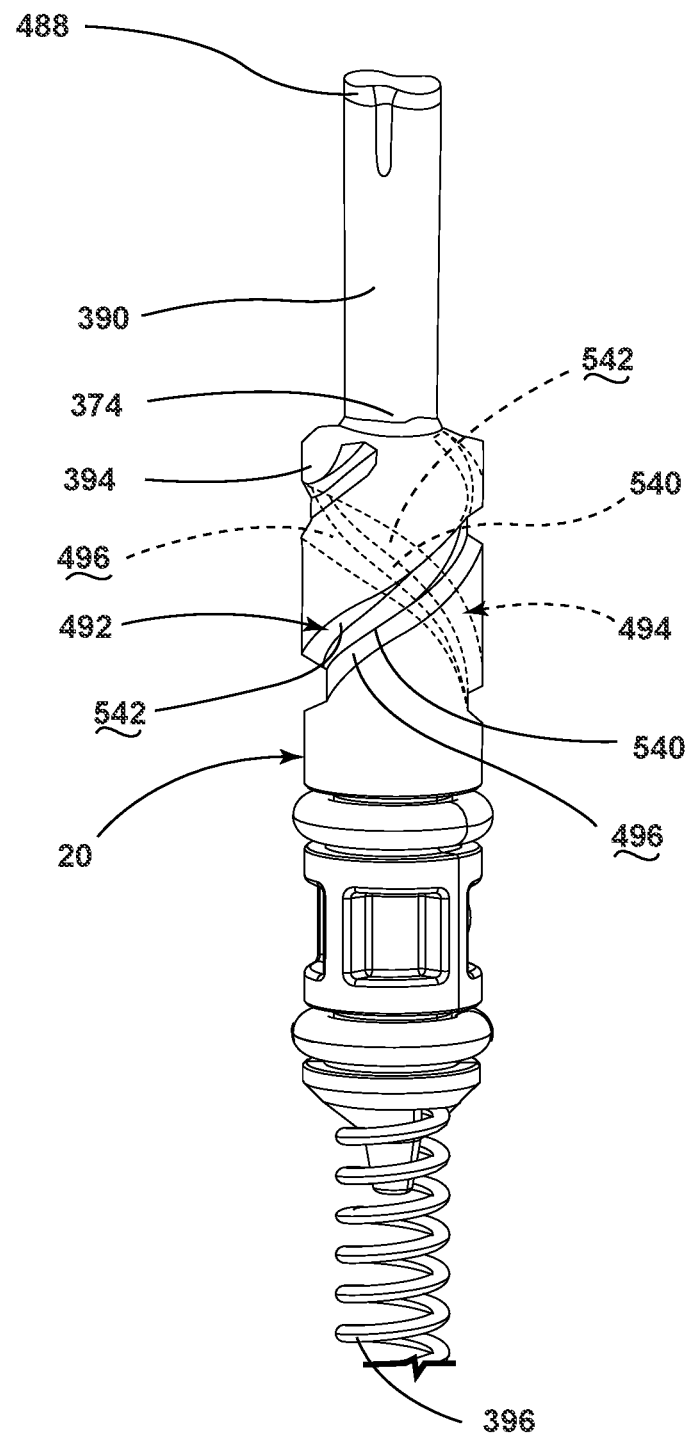
FIG. 40 is a side perspective view of a bypass valve with sloped channels, according to the present disclosure.
Figure 41:
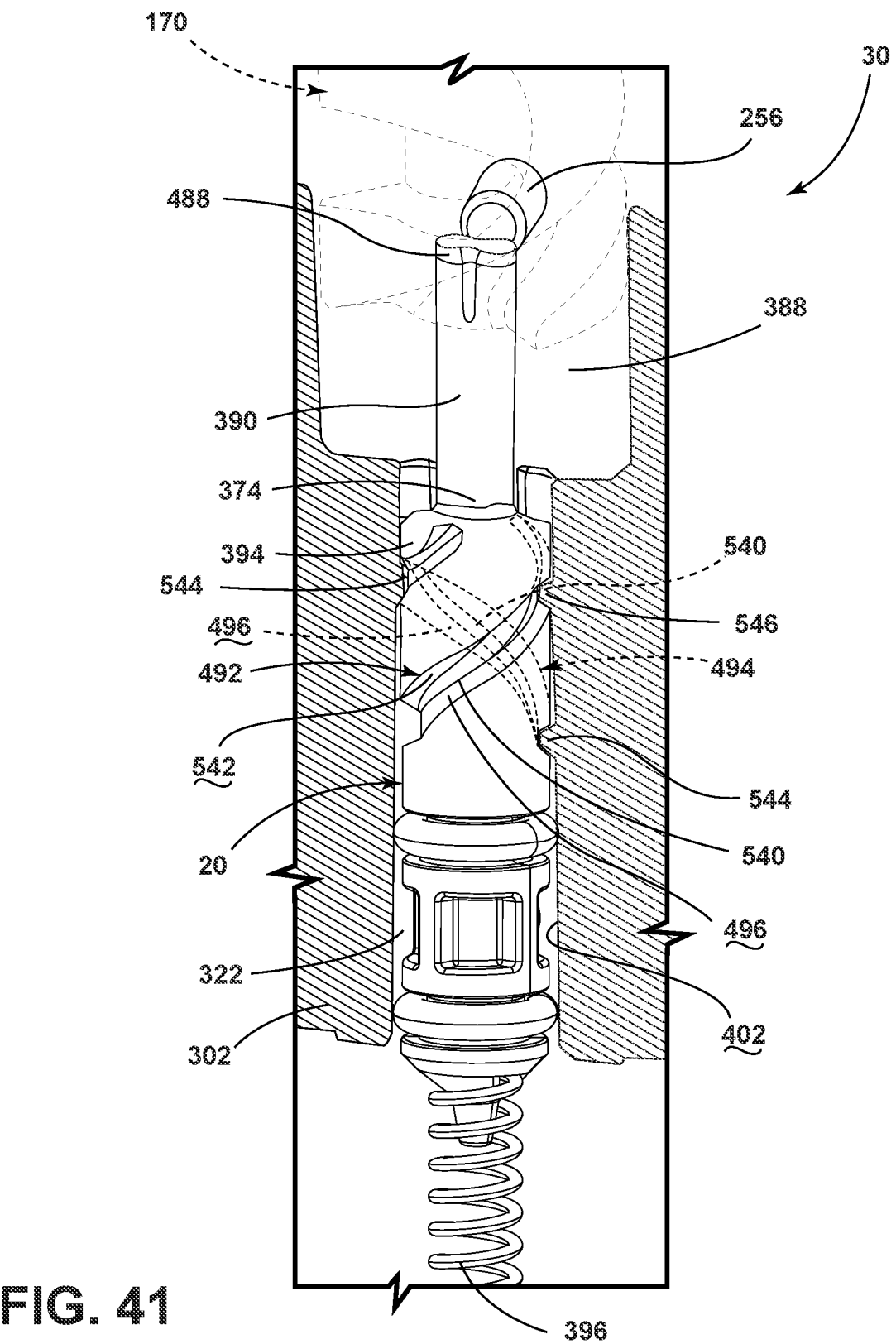
FIG. 41 is a side perspective view of a bypass valve engaging elongated protrusions of a fluid manifold and a fastener of a bypass actuator, with the bypass valve in a bypass position, according to the present disclosure.

Referring to FIGS. 40 and 41, an additional or alternative configuration of the engagement between the bypass valve 20 and the fluid manifold 22 is illustrated. Each guide feature 492, 494 includes a continuous sloped surface 496 extending from the bypass location 498 to the filtering location 500, without including the retaining spaces 504 and the stop walls 502 as described herein. The guide features 492, 494 are each configured as channels 540 with the sloped surface 496 and a retaining surface 542 spaced from the sloped surface 496. The retaining surface 542 extends parallel to the sloped surface 496 and operates to guide and retain elongated protrusions 544, 546 of the fluid manifold 22.

The channels 540 of the bypass valve 20 extend along the bypass valve 20. Generally, the channels 540 spiral or extend around the bypass valve 20 to allow for the axial and rotational movement of the bypass valve 20 within the bypass valve cavity 322. In the illustrated example, the guide features 492, 494 define helical channels 540 that generally form a double helix on the bypass valve 20

The fluid manifold 22 defines elongated protrusions 544, 546 that extend into the bypass valve cavity 322. The elongated protrusions 544, 546 also extend or spiral along the inner surface 402 of the housing 302 that defines the bypass valve cavity 322. The sloped and overall configuration of the elongated protrusions 544, 546 correspond with the slope and overall configuration of the channels 540. The channels 540 are configured to slide over the elongated protrusions 544, 546 as the bypass valve 20 moves. The elongated protrusions 544, 546 may each be configured as multiple spaced protrusions to lessen friction as the bypass valve 20 moves relative to the elongated protrusions 544, 546.

Figure 42:
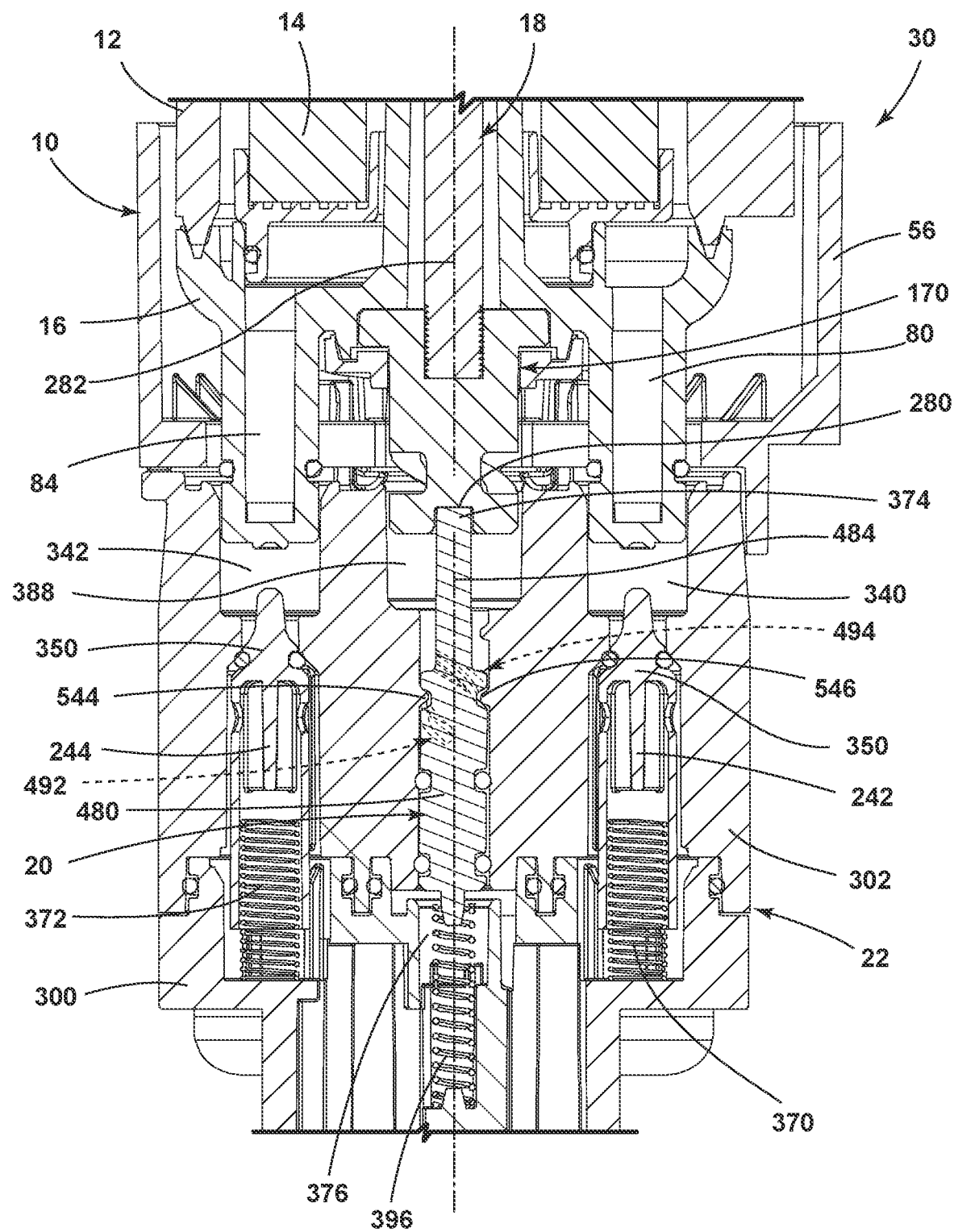
FIG. 42 is a cross-sectional view of a bypass valve engaging elongated protrusions of a fluid manifold and a fastener of a bypass actuator, with the bypass valve in a bypass position, according to the present disclosure.
Figure 43:
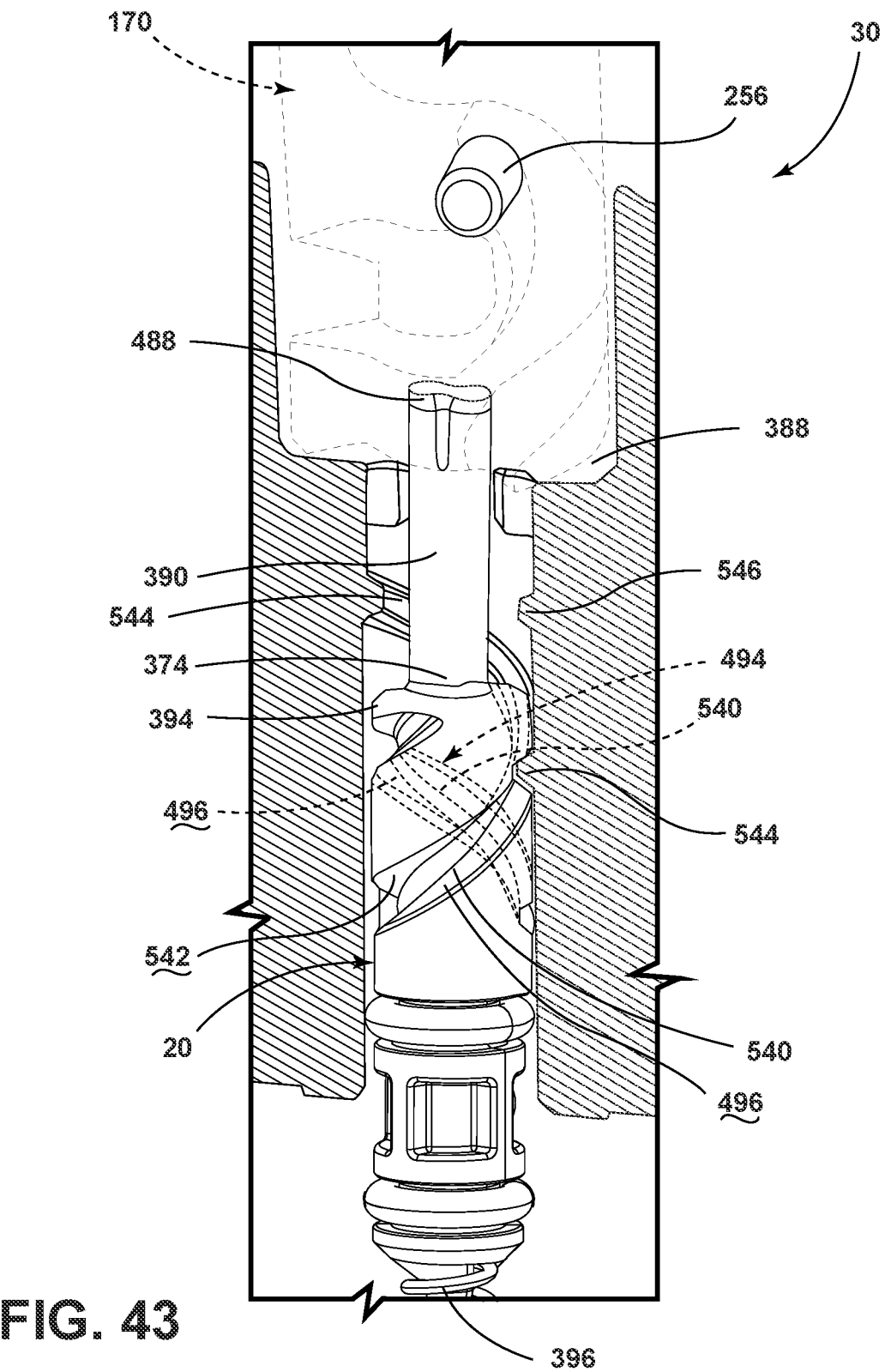
FIG. 43 is a cross-sectional view of a fluid manifold with a filter unit in an engaged state and a bypass valve in a bypass position, according to the present disclosure.
Figure 44:
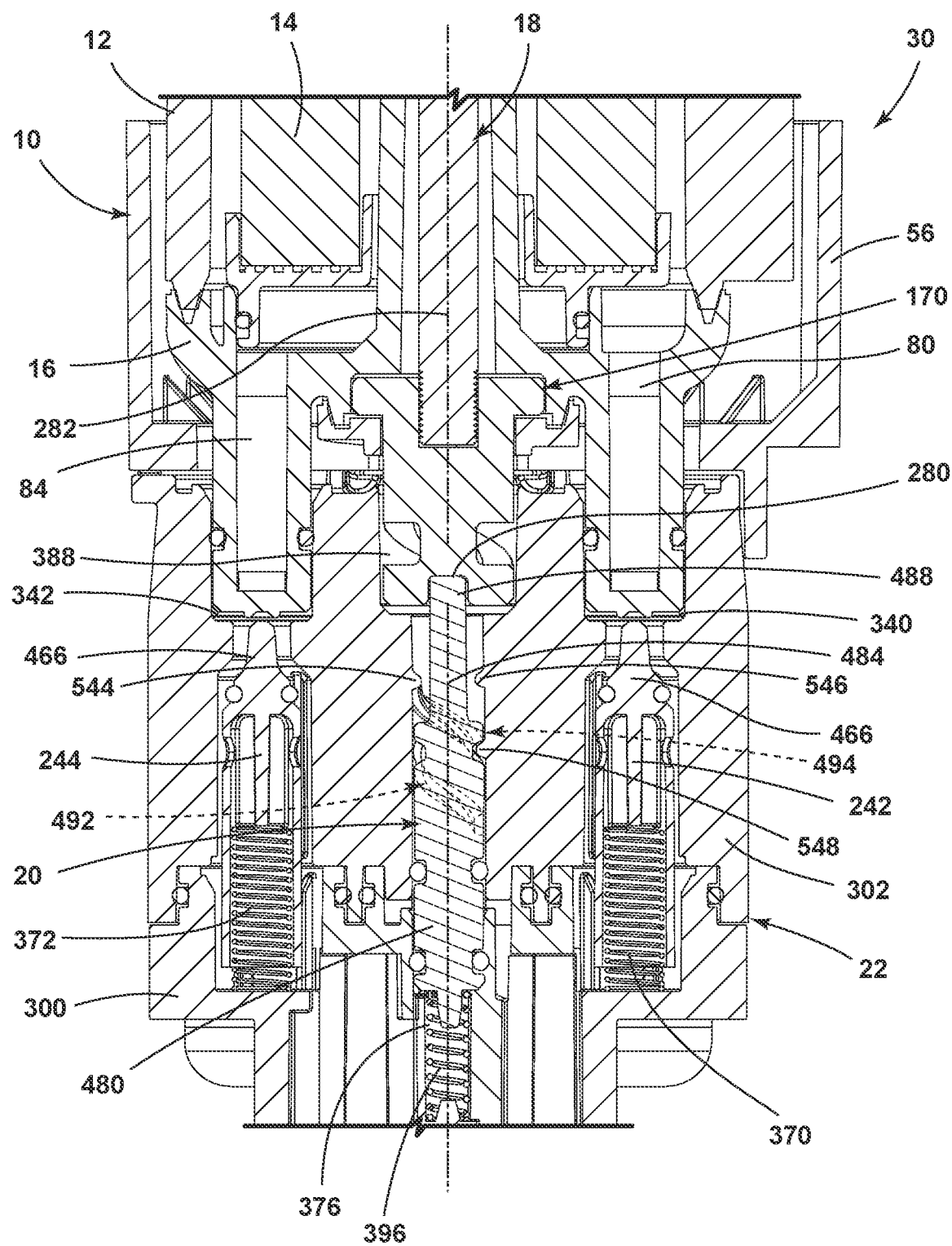
FIG. 44 is a cross-sectional view of a fluid manifold with a filter unit in an installed state and a bypass valve in a filtering position, according to the present disclosure.

Referring to FIGS. 41-44, the bypass valve 20 is illustrated moving from the bypass position 374, as illustrated in FIGS. 41 and 42, to the filtering position 480, as illustrated in FIGS. 43 and 44. The elongated protrusions 544, 546 remain at least partially within the channels 540 when the bypass valve 20 is in the bypass position 374, in the filtering position 480, and rotating between the bypass and filtering positions 374, 480. The engagement between the elongated protrusions 544, 546 and the guide features 492, 494 guides the axial and rotational movement of the bypass valve 20. A pitch of each channel 540 is generally about 45°, corresponding with the pitch of the fastener 170.

Each elongated protrusion 544, 546 is disposed substantially within the respective channel 540 when the bypass valve 20 is in the bypass position 374. As the bypass valve 20 is adjusted, the channels 540 are adjusted relative to the elongated protrusions 544, 546. The elongated protrusions 544, 546 operate as rails, guiding the rotation of the bypass valve 20. As illustrated in FIG. 43, when the bypass valve 20 is in the filtering position 480, an end 548 of the elongated protrusions 544, 546 remain disposed within the channels 540, while the remainder of the elongated protrusions 544, 546 are exposed within the bypass valve cavity 322. The sloped guide features 492, 494 and elongated protrusions 544, 546 guide the simultaneous axial and rotational movement of the bypass valve 20. If either one of the axial movement or the rotational movement outweighs the other, the movement of the bypass valve 20 may be hindered.

Referring to FIGS. 1A-44, the filter unit 10 is moved along the longitudinal axis 52 in a first direction 556 toward the fluid manifold 22. The filter unit 10 is moved in a direction parallel with the bypass rotational axis 484. The filter unit 10 moves to the engaged state 450 where the first and second projections 80, 84 are disposed within the inlet and outlet ports 340, 342 of the fluid manifold 22, respectively. The fastener 170 is moved into the actuator port 388 and the interlock 280 engages the end 284 of the bypass valve 20. The fastener 170 is adjusted to align the retaining features 256, 258 with the openings 264 of the interface 252.

During operation from the engaged state 450 to the installed state 454, the bypass actuator 18 is configured to rotationally and axially operate the bypass valve 20 and also axially operate the actuating assembly 50. Generally, the actuating assembly 50 is axially adjusted in a range of about 5 mm to about 10 mm along the longitudinal axis 52 in the first direction 556 during operation from the engaged state 450 to the installed state 454. The user rotates the knob 204 in the first rotational direction 214, which consequently rotates the fastener 170 in a same direction.

In certain aspects, the filter unit 10 includes a visual feedback that the fastener 170 is fully rotated and the filter unit 10 is in the installed state 454. In these aspects, the body portion 12 includes a first indicator 570 on the lobe 54 and the knob 204 includes a second indicator 572, as illustrated in FIGS. 1A and 1B. When the knob 204 is rotated to move the second indicator 572 adjacent to the first indicator 570, the alignment between the indicators 570, 572 provides the visual feedback that the filter unit 10 is fully installed. In FIGS. 1A and 1B, the indicator 572 on the knob 204 is not disposed adjacent to the indicator 570 on the lobe 54, indicating that the filter unit 10 is not in the installed state 454.

As the fastener 170 rotates, the retaining features 256, 258 slidably engage the interface 252. The slope or pitch of the sloped grooves 260, 262 of the interface 252 pulls the fastener 170, and the filter unit 10, axially toward the fluid manifold 22. With the axial movement of the filter unit 10, the engaging portion 16 is moved to engage the inlet valve 242 and the outlet valve 244. Upon engagement, the inlet and outlet valves 242, 244 are moved to the opened positions 466 to allow water to flow through the filter unit 10.

The sloped grooves 260, 262 adjust relative to the retaining features 256, 258 until the retaining features 256, 258 engage the detents 268 disposed proximate to the proximal end 190 of the fastener 170. The detents 268 operate to retain the retaining features 256, 258 in the selected position along the sloped grooves 260, 262. The engagement between the retaining features 256, 258 and the detents 268 also operates to secure the filter unit 10 in the installed state 454. Additionally, the retaining features 256, 258 moving into the respective detents 268 generally provides a tactile and/or audible feedback that the filter unit 10 is fully installed.

Referring still to FIGS. 1A-44, as the fastener 170 is rotated, the fastener 170 drives the axial and rotational movement of the bypass valve 20 to move the bypass valve 20 from the bypass position 374 to the filtering position 480. Accordingly, the fastener 170 selectively secures the filter unit 10 to the fluid manifold 22 while driving the rotational and axial movement of the bypass valve 20. The rotational and axial movement may have a direct or proportional relationship, which is generally guided by the slope of the guide features 492, 494. For example, the rotational and axial movement may have a 1:1 relationship. In such examples, the 1:1 relationship is caused by the guide features 492, 494 having the sloped surfaces 496 extending approximately at a 45° slope. The axial rate of movement is directly related to or directly proportional to the rotational rate of movement of the bypass valve 20, which is generally driven by direct or proportional axial and rotational movement of the bypass actuator 18.

In certain aspects, during movement of the bypass valve 20, the protrusions 520, 522 of the fluid manifold 22 are adjusted out of the retaining spaces 504 and along the sloped surfaces 496 of the guide features 492, 494 of the bypass valve 20 from the bypass location 498 to the filtering location 500. In additional aspects, the bypass valve 20 adjusts the channels 540 relative to the elongated protrusions 544, 546.

Typically, the rotational movement of the bypass valve 20 occurs at a substantially same rate as the axial movement, which generally corresponds to a slope angle of 45° relative to the rotational axis 282 of the fastener 170. The sloped surfaces 496 of the guide features 492, 494 of the bypass valve 20 may have a corresponding slope of about 45° relative to the bypass rotational axis 484 of the bypass valve 20. If the axial movement is faster than the rotational movement, the protrusions 520, 522 abut the stop walls 502 or the retaining surfaces 542, thereby preventing further axial movement. If the rotational movement is faster than the axial movement, the protrusions 520, 522 will abut the sloped surface 496 of the guide features 492, 494 and prevent further rotation. The rate the fastener 170 rotationally and axially moves relative to the retaining features 256, 258 generally matches the rate the bypass valve 20 rotationally and axially moves relative to the protrusions 520, 522 or the elongated protrusions 544, 546. This allows for generally simultaneous axial and rotational movement of the fastener 170 and the bypass valve 20.

The bypass valve 20 is moved or adjusted until the bypass valve 20 is fully in the filtering position 480, which coincides with when the filter unit 10 is in the fully installed state 454. Generally, the bypass valve 20 is axially adjusted in a range of about 5 mm to about 10 mm along the bypass rotational axis 484 during operation from the bypass position 374 to the filtering position 480. While a 45° slope can be used, other slopes can be included within the bypass valve 20 as well as a combination of slopes that can be used to manipulate the bypass valve 20 between the bypass position 374 and the filtering position 480.

When in the installed state 454, water flows or travels through the filter unit 10 rather than the bypass channel 376. Water travels through the opened inlet valve 242 of the fluid manifold 22 and through the filter inlet 82 into the filter unit 10. The water then travels through the water filter 14 and through the filter outlet 86 to the opened outlet valve 244. The detents 268 of the interface 252 operate to retain the filter unit 10 in the installed state 454 relative to the fluid manifold 22. Additionally, the detents 268 limit movement of the filter unit 10 in a second direction 558, away from the base 300 of the fluid manifold 22.

Referring still to FIGS. 1A-44, to disengage the filter unit 10 from the fluid manifold 22, the knob 204 is rotated in the second rotational direction 216, which causes rotation of the fastener 170 in the same direction. The retaining features 256, 258 of the fluid manifold 22 are moved out of engagement with the detents 268 and along the interface 252 toward the distal end 250 of the fastener 170. As the retaining features 256, 258 move along the interface 252 of the fastener 170, the filter unit 10 is adjusted axially away from the fluid manifold 22. The filter unit 10 is moved along the longitudinal axis 52 in the second direction 558.

As the filter unit 10 is moved in the second direction 558, away from the fluid manifold 22, the biasing forces of the first and second biasing members 370, 372 adjust the inlet and outlet valves 242, 244 to the closed positions 350. Additionally, the biasing force of the third biasing member 396 adjusts the bypass valve 20 toward the bypass position 374. The guide features 492, 494 of the fluid manifold 22 travel along the sloped surfaces 496 of the guide features 492, 494 of the bypass valve 20. The bypass valve 20 is then in the bypass position 374, allowing water to travel through the bypass channel 376. The filter unit 10 may then be moved out of the engaged state 450 and separated from the fluid manifold 22.

With reference to FIGS. 45-48, the filter assembly 30 may be installed in the appliance 40, such a refrigerator as illustrated in FIG. 45. A filter housing 600 may be coupled to an interior 602 of the appliance 40, which houses the fluid manifold 22 and receives the filter unit 10. In the illustrated example of FIG. 45, the filter housing 600 is coupled to a top surface 604 of an inner liner 606 within a refrigeration compartment of the appliance 40. The tubing 36, 38 extends from the appliance 40 and into the filter housing 600 to provide unfiltered water to the filter assembly 30 and guide filtered water away from the filter assembly 30. The filter housing 600 may be coupled in any practicable location within the appliance 40. Additionally, the filter assembly 30 may be installed in any household or commercial appliance 40, unit, or structure that utilizes or dispenses filtered water. Additional features may also be utilized to couple aspects of the filter assembly 30 to the appliance 40.

In the illustrated configuration, the filter housing 600 includes a solid portion 610 and an open portion 612. The solid portion 610 may be oriented to obscure a majority of the filter assembly 30 from view, while the open portion 612 abuts the appliance 40.

The fluid manifold 22 is positioned within the interior 602 of the filter housing 600. The tubing 36, 38 extends through an open end 620 of the filter housing 600 to couple with the fluid manifold 22. Additionally, the filter housing 600 may include an insertion sleeve 622 therein. The insertion sleeve 622 may be a separate component coupled with the filter housing 600 or integrally formed with the filter housing 600. The insertion sleeve 622 couples to the fluid manifold 22. The insertion sleeve 622 extends from an insertion end 624 of the filter housing 600 to the fluid manifold 22 to provide a receiving space 626 to receive and house the filter unit 10. The insertion sleeve 622 may couple with the guide member 56 (FIGS. 1A and 1B) or, alternatively, be utilized in lieu of the guide member 56.

Referring still to FIGS. 45-48, the filter unit 10 is adapted to be inserted along an insertion path 630 into the filter housing 600 to engage the fluid manifold 22. The insertion sleeve 622 generally defines a shape that corresponds with the shape of the filter unit 10 to assist the user in aligning the filter unit 10 with the fluid manifold 22. In the illustrated example, a perimeter of the insertion sleeve 622 defines the teardrop shape similar to the cross-sectional shape of the filter unit 10. The lobe 54 of the filter unit 10 provides an alignment for inserting the filter unit 10 into the filter housing 600.

Figure 47:
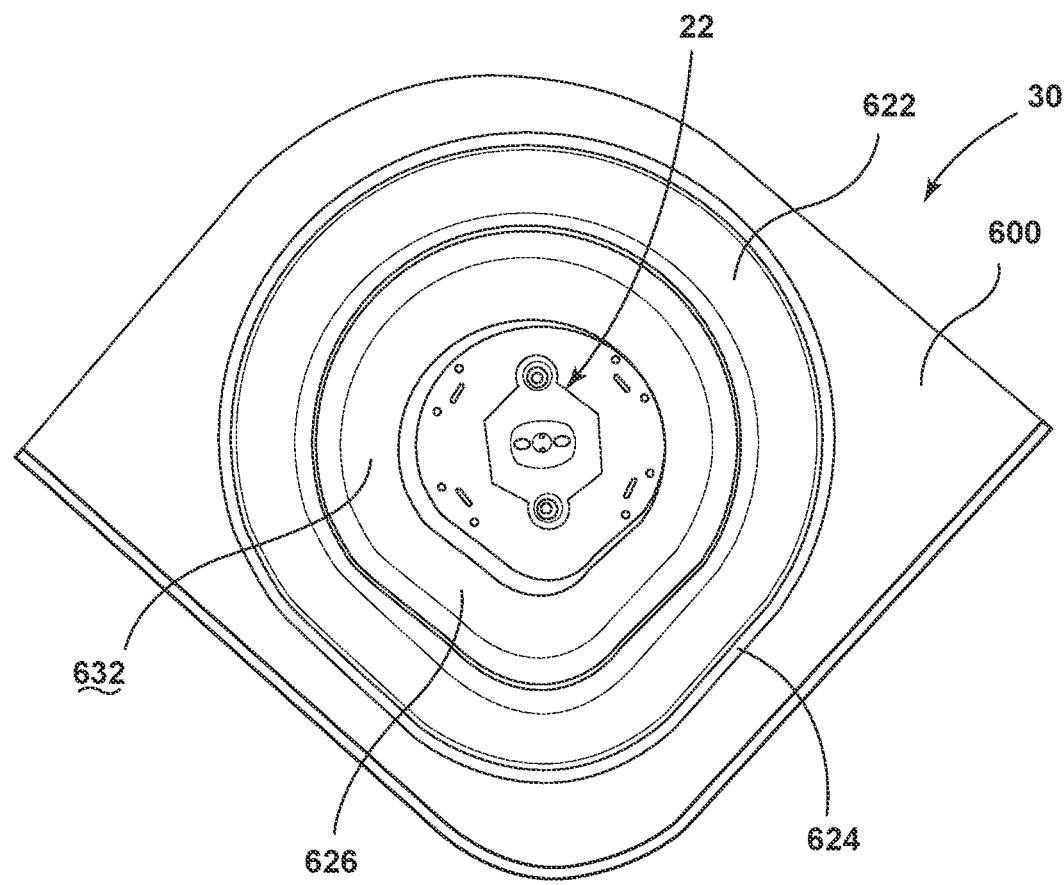
FIG. 47 is a perspective view of a housing for receiving a filter unit, according to the present disclosure.
Figure 48:
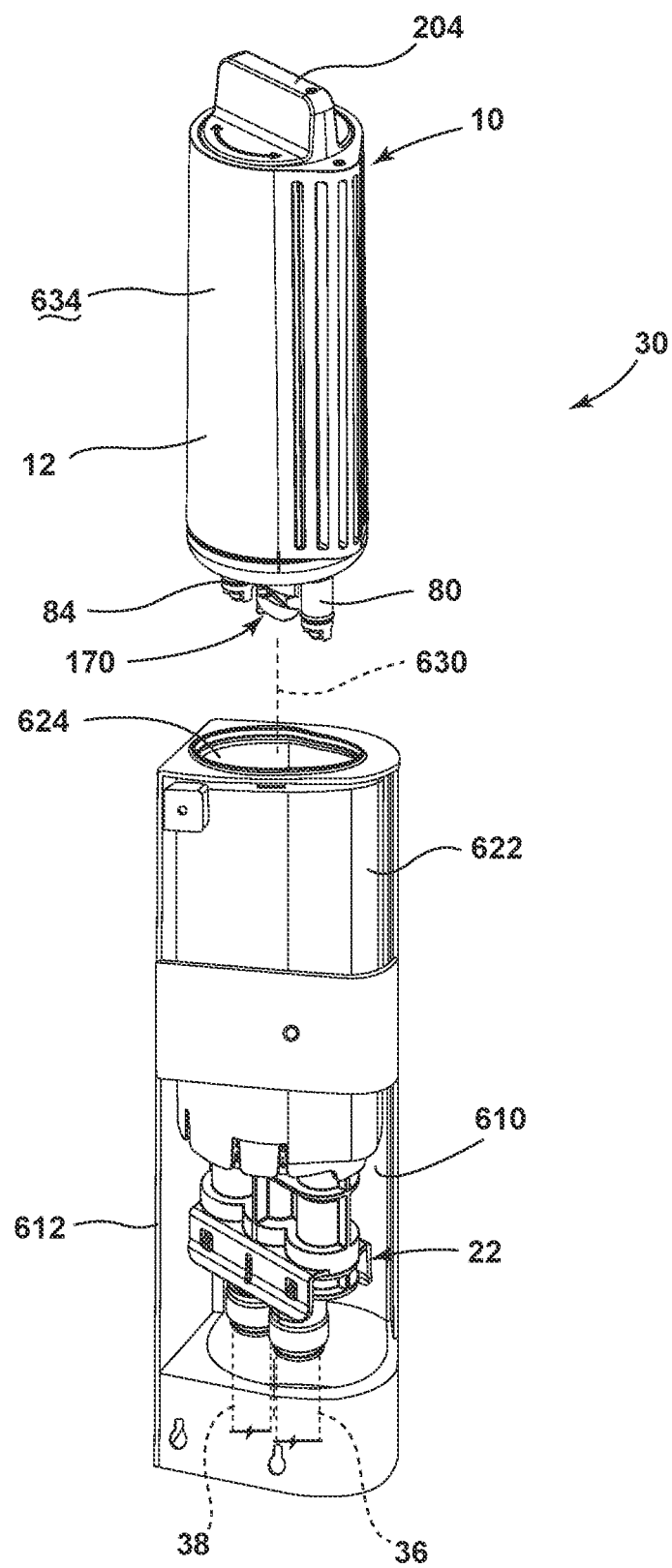
FIG. 48 is a side perspective view of a filter unit to be inserted into a housing to engage a fluid manifold, according to the present disclosure.

As illustrated in FIG. 47, an interior surface 632 of the insertion sleeve 622 is generally smooth allowing for smooth insertion of the filter unit 10 into the insertion sleeve 622 of the filter housing 600. The interior surface 632 may abut an outer surface 634 of the filter unit 10, but may not assist in retaining the filter unit 10 in the insertion sleeve 622. The engagement between the filter unit 10 and the fluid manifold 22 retains the filter unit 10 within the filter housing 600, as described further herein.

Figure 49:
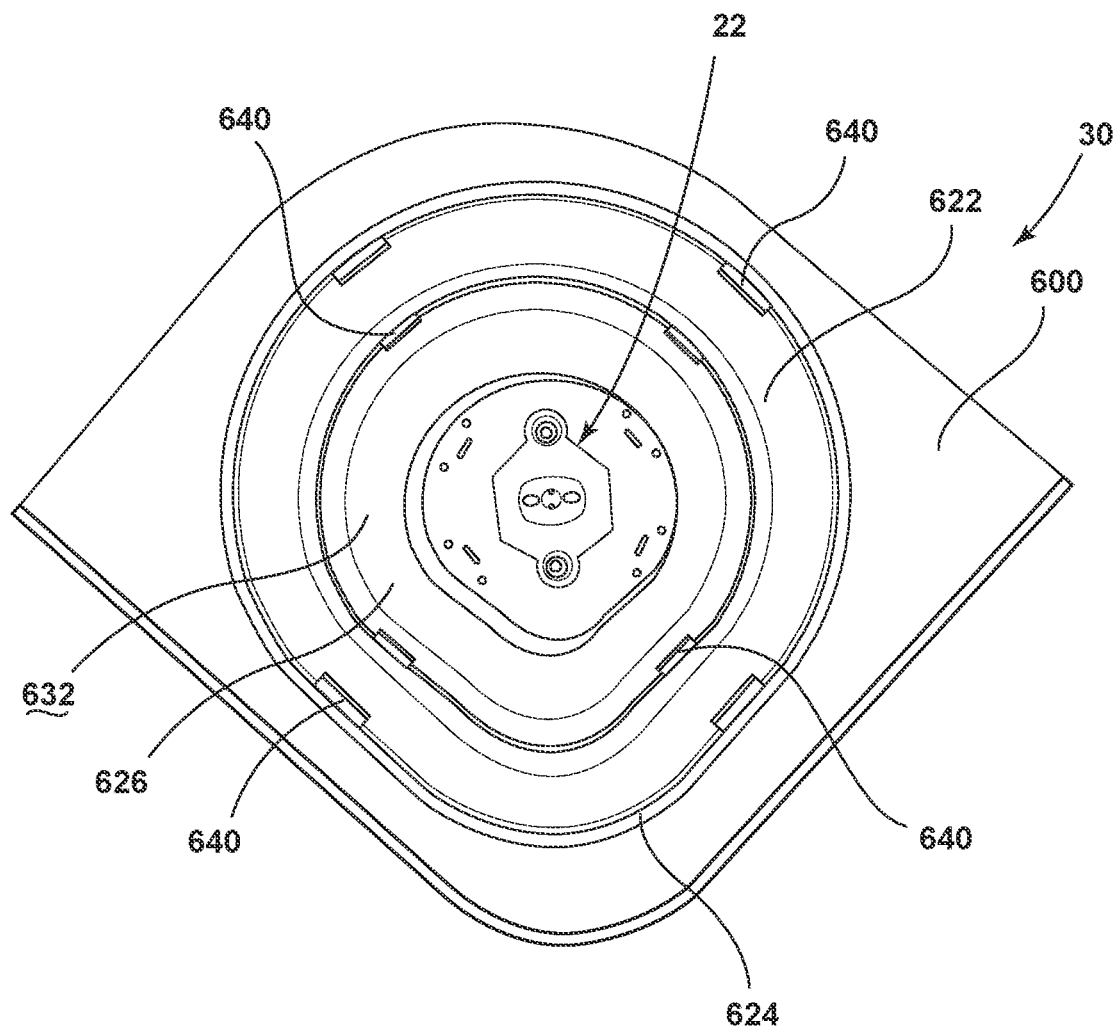
FIG. 49 is a perspective view of a housing having projections extending from an inner surface thereof to engage a filter unit, according to the present disclosure.

Referring to FIG. 49, an additional or alternative configuration of the insertion sleeve 622 is illustrated. In this configuration, the insertion sleeve 622 includes projections 640 extending from the interior surface 632 into an insertion channel. The projections 640 may assist in securing the filter unit 10 into the filter housing 600. The projections 640 may provide a frictional engagement, an interference fit, or another engagement that assists in holding the filter unit 10 in the insertion sleeve 622. In certain aspects, the projections 640 may be actuated to extend into the channel defined by the insertion sleeve 622. The actuation may be caused by the insertion of the filter unit 10 or an additional feature on the filter housing 600. The actuated projections 640 may be advantageous for securing the filter unit 10 in the filter housing 600 without causing friction when inserting or removing the filter unit 10. The projections 640 may telescope out from the interior surface 632, may be spring-loaded, may be rotated into the insertion channel, or otherwise adjust into the insertion channel to engage the outer surface 634 of the filter unit 10.

Alternatively, the projections 640 may be part of the filter unit 10. The projections 640 may be actuated to adjust away from the outer surface 634 of the filter unit 10 to engage the interior surface 632 of the filter housing 600. In such examples, the rotation of the knob 204 may cause the projections 640 to telescope, rotate, or otherwise actuate toward the interior surface 632. The filter housing 600, the fluid manifold 22, and/or the filter unit 10 may include additional or alternative latching features to secure the filter unit 10 to the fluid manifold 22. For example, the filter unit 10 may include a latch that engages the base 300, the housing 302, and/or the guide member 56 of the fluid manifold 22 (FIGS. 1A and 1B).

Figure 23:
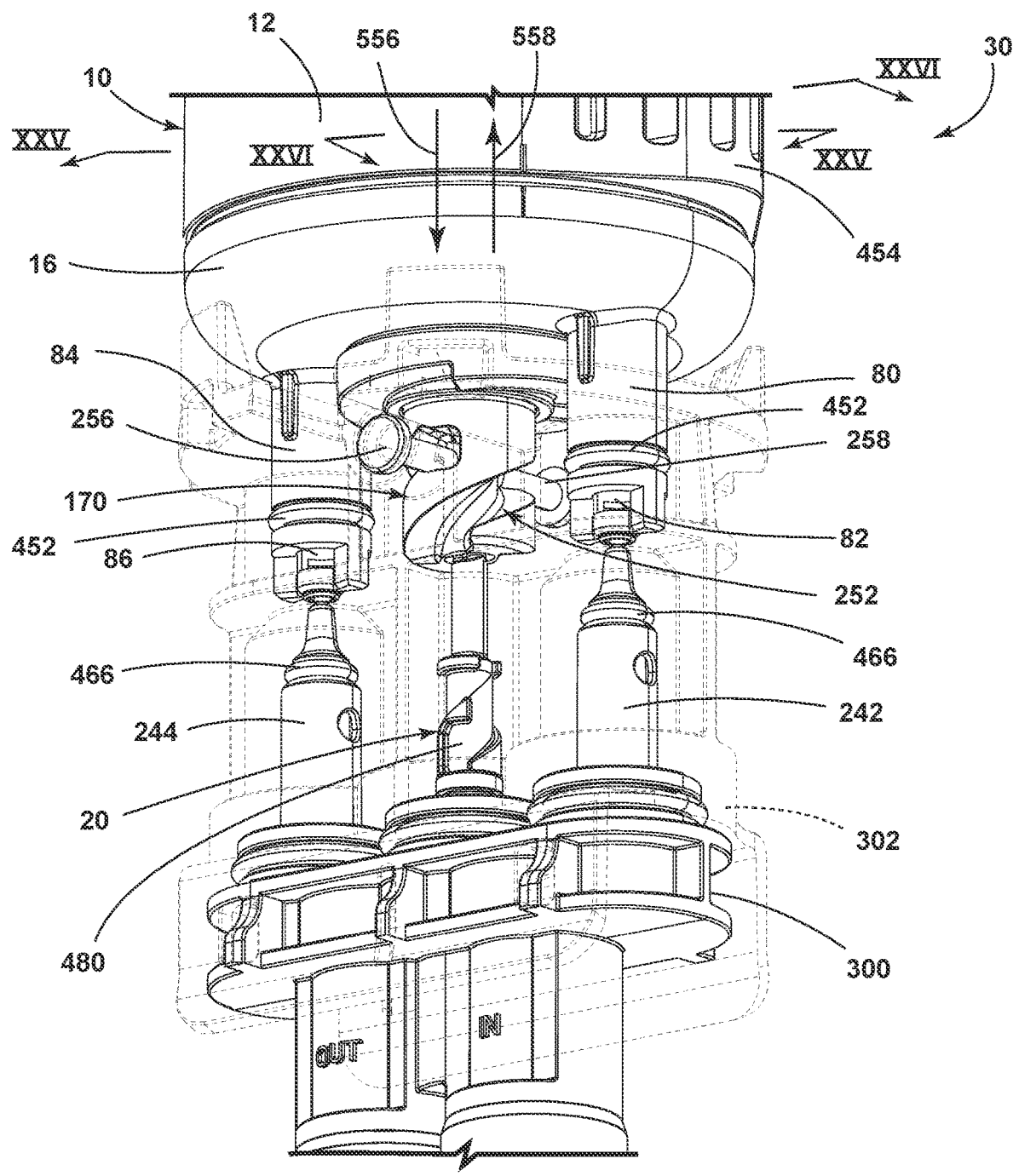
FIG. 23 is a partial side perspective view of a filter assembly with a filter unit in an installed state relative to a fluid manifold, according to the present disclosure.
Figure 24:
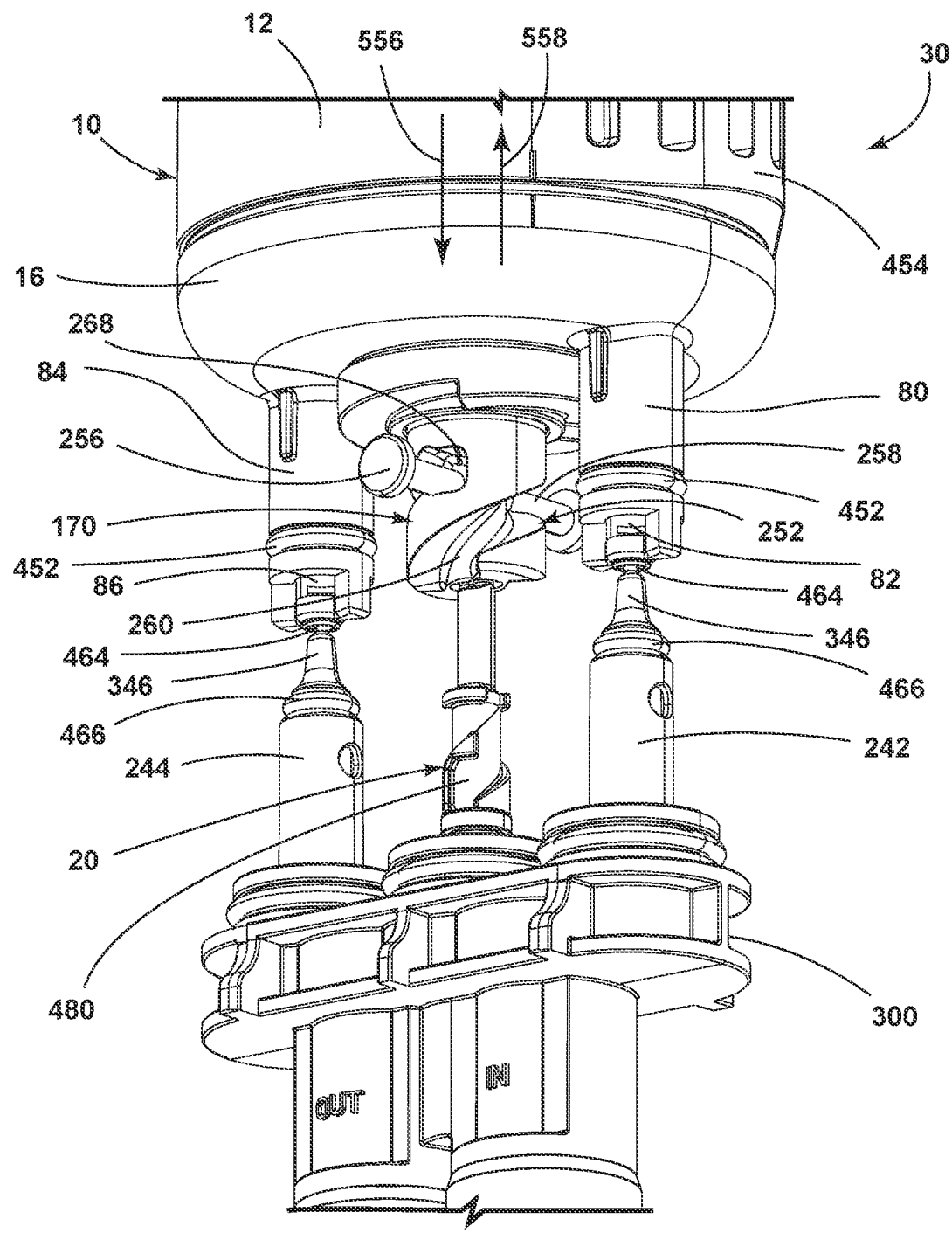
FIG. 24 is a partial side perspective view of a filter assembly with a filter unit in an installed state relative to a fluid manifold with a housing of the fluid manifold removed, according to the present disclosure.
Figure 25:
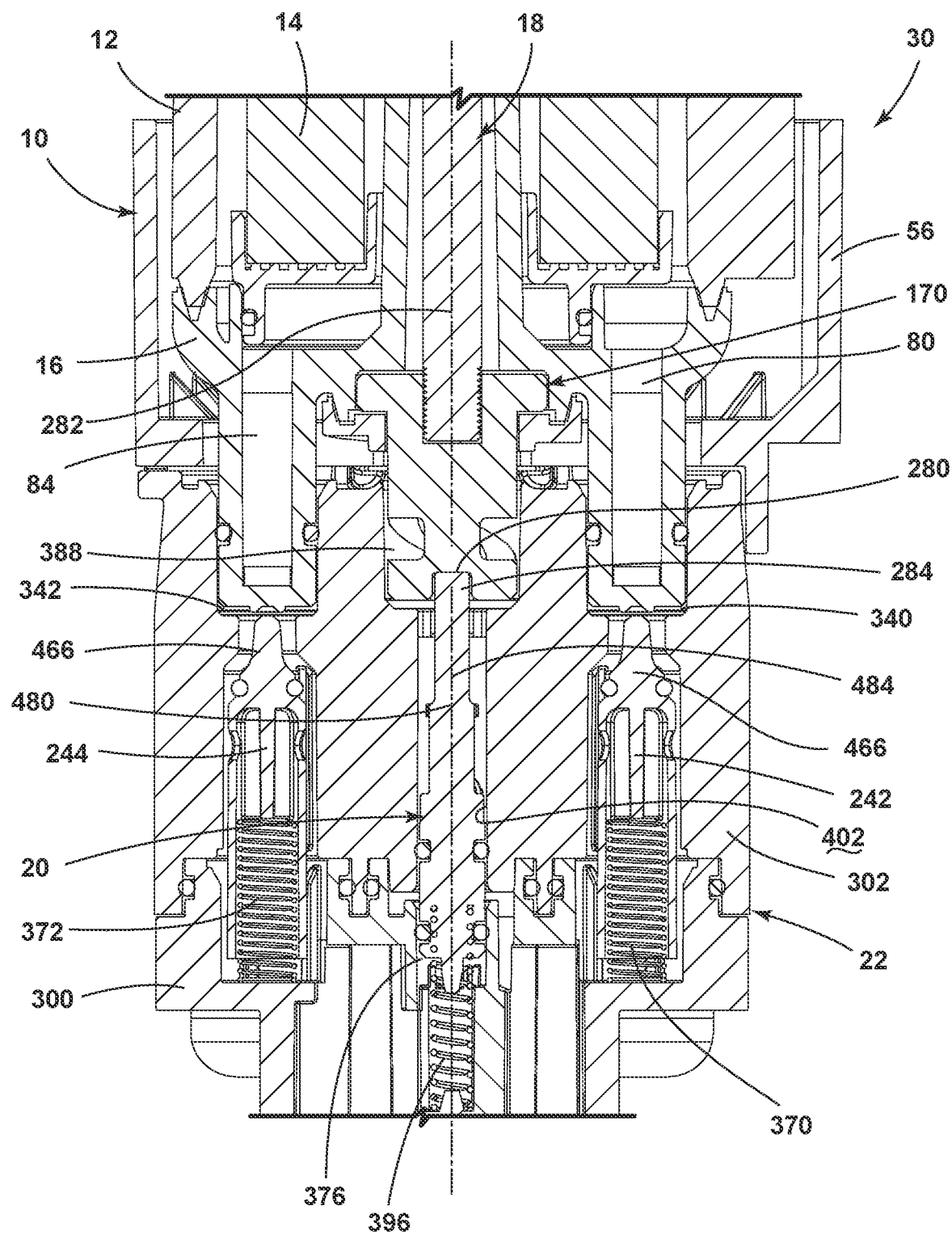
FIG. 25 is a cross-sectional view of the filter assembly of FIG. 23, taken along lines XXV-XXV, according to the present disclosure.
Figure 50:
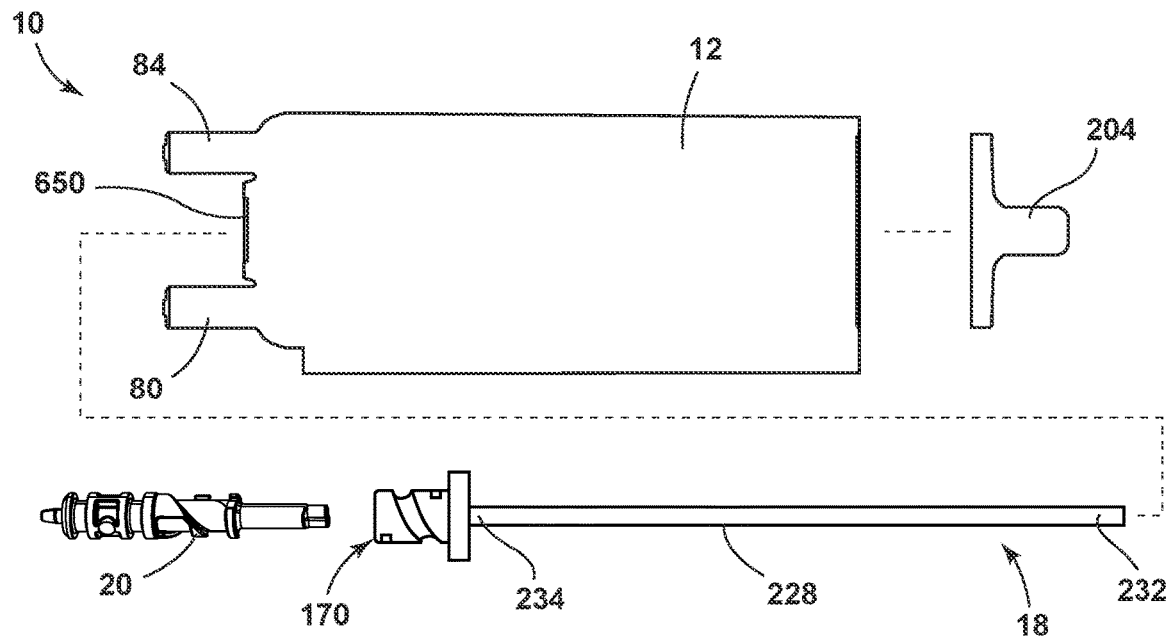
FIG. 50 is an exploded side elevational view of a multi-component filter unit, according to the present disclosure.

Referring to FIGS. 46 and 50, in an additional or alternative configuration, the filter unit 10 is at least two separate components that may be installed separately with the fluid manifold 22. For example, the bypass actuator 18 may be separate from the body portion 12 of the filter unit 10. The bypass actuator 18 may be inserted into the fluid manifold 22 to engage the bypass valve 20. The knob 204 may be selectively coupled to the first end 232 of the shaft 228 of the bypass actuator 18 to assist in inserting the bypass actuator 18 through the filter housing 600 to engage the fluid manifold 22. The bypass actuator 18 may be rotated and axially adjusted to move the bypass valve 20 to the filtering position 480 (FIG. 23). The bypass valve 20 may be adjusted without the inlet and outlet valves 242, 244 (FIG. 13) being adjusted to the opened positions 466. Accordingly, the water may not flow through the bypass channel 376 or out of the fluid manifold 22.

The body portion 12 of the filter unit 10 may then be inserted into the filter housing 600 around the bypass actuator 18. The body portion 12 defines a receiving aperture 650 and the sleeve 156 (FIG. 3) extending therethrough, which receive the shaft 228 of the bypass actuator 18 as the body portion 12 is inserted around the bypass actuator 18. The knob 204 may then engage the first end 232 of the bypass actuator 18 to retain the filter unit 10 to the bypass actuator 18. As the body portion 12 is inserted axially into the fluid manifold 22, the projections 80, 84 engage the inlet and outlet valves 242, 244 (FIG. 13), allowing the water to flow out of the fluid manifold 22 and into the filter unit 10.

Using this multi-component configuration, the filter unit 10 provides a two-position actuation and activation of the filter assembly 30. The first position is conducted by the bypass actuator 18, which adjusts the bypass valve 20 from the bypass position 374 to the filtering position 480. The second position is conducted by the body portion 12 being inserted into the fluid manifold 22 around the bypass actuator 18 to engage the inlet and outlet valves 242, 244. Engaging the inlet and outlet valves 242, 244 allows water to flow through the filter unit 10.

Figure 51:
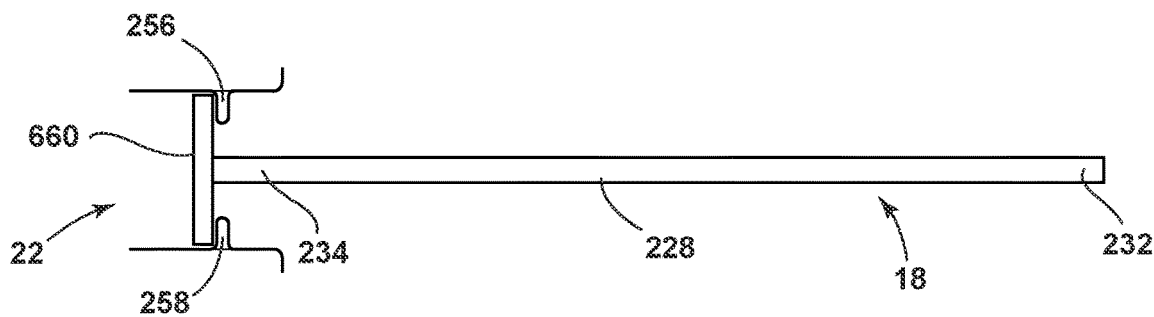
FIG. 51 is a schematic side elevational view of a bypass actuator having a helicopter retention feature, according to the present disclosure.

Referring to FIGS. 51-55, the bypass actuator 18 may have a variety of configurations to actuate the bypass valve 20, retain the filter unit 10 to the fluid manifold 22, or a combination thereof. For example, as illustrated in FIG. 51, the bypass actuator 18 includes the shaft 228 and a helicopter retention feature 660 coupled to the second end 234. The helicopter retention feature 660 is a narrow, elongated feature configured to be moved between the retaining features 256, 258 of the fluid manifold 22 when oriented in a select orientation. The helicopter retention feature 660 is inserted between the retaining features 256, 258 and then rotated to extend under the retaining features 256, 258, retaining the bypass actuator 18 to the fluid manifold 22. The helicopter retention feature 660 may have features on a surface thereof for engaging the bypass valve 20, or alternatively, may have a substantially flat or planar surface.

Figure 52:
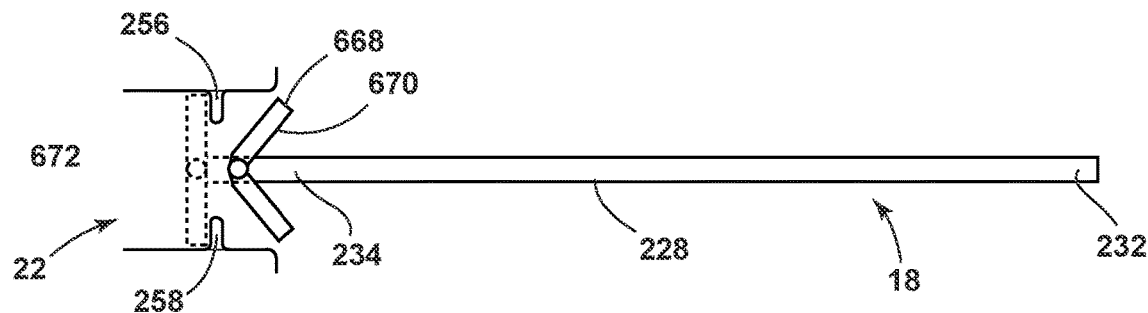
FIG. 52 is a schematic side elevational view of a bypass actuator having a spring-loaded retention feature, according to the present disclosure.

As illustrated in FIG. 52, the bypass actuator 18 may include the shaft 228 and a spring-loaded retention feature 668. The spring-loaded retention feature 668 is operable between a retracted position 670, shown in solid, and an extended position 672, shown in phantom. Typically, the spring-loaded retention feature 668 is biased toward the extended position 672. The spring-loaded retention feature 668 is configured to be in or rotate to the retracted position 670 as the spring-loaded retention feature 668 is moved past the retaining features 256, 258. Once past the retaining features 256, 258, the spring-loaded retention feature 668 is configured to extend and/or rotate to the extended position 672 to be disposed under the retaining features 256, 258 to retain the bypass actuator 18 to the fluid manifold 22. The spring-loaded retention feature 668 may have features on a surface thereof for engaging the bypass valve 20, or alternatively, may have a substantially flat or planar surface.

Figure 53:
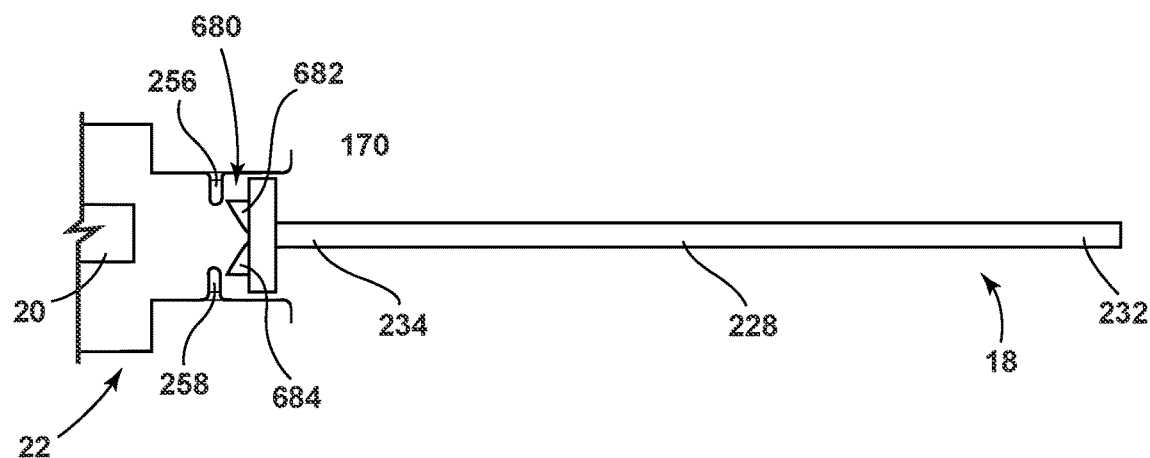
FIG. 53 is a schematic side elevational view of a bypass actuator with a driving feature, according to the present disclosure.

Referring to FIG. 53, in another non-limiting example, the bypass actuator 18 may be configured to axially and rotationally move the bypass valve 20 with axial movement from the bypass actuator 18. In such examples, the bypass actuator 18 includes the shaft 228 and a driving feature 680 having angled protrusions 682, 684. The angled protrusions 682, 684 are configured to extend at angles in opposing directions relative to one another or have surfaces extending at angles in opposing directions relative to one another.

In certain aspects, the angled protrusions 682, 684 may be mirror images of one another. The angled protrusions 682, 684 are configured to engage the end 284 (e.g., the mating feature 488) of the bypass valve 20. The angled protrusions 682, 684 apply force to the end 284 of the bypass valve 20 in opposing directions. For example, the first angled protrusion 682 applies a force at a first angle on the end 284 of the bypass valve 20 and the second angled protrusion 684 applies a force at a second, opposing angle on the end 284 of the bypass valve 20. The opposing force provided by the angled protrusions 682, 684 as the bypass valve 20 is axially adjusted causes the rotation of the bypass valve 20.

Figure 54:
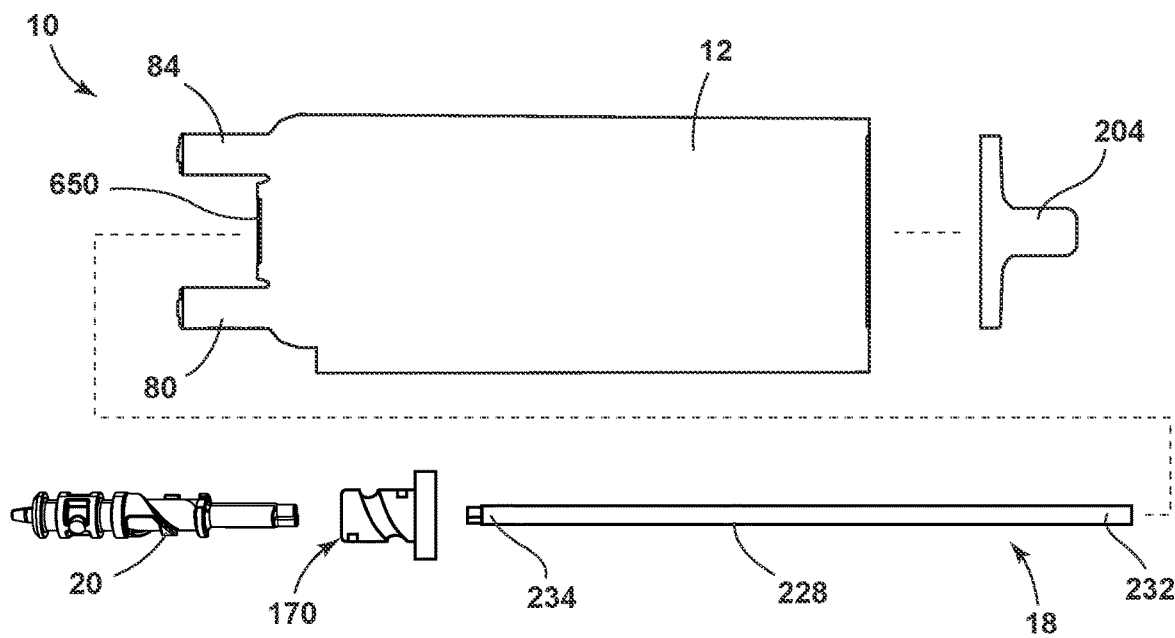
FIG. 54 is a schematic side elevational view of a bypass actuator having spring-loaded projections to engage a bypass valve, according to the present disclosure.

Referring to FIG. 54, the bypass actuator 18 may be two separate components, which may also be separate from the body portion 12. The fastener 170 may be moved to engage the bypass valve 20. The shaft 228, or another tool, may be inserted through the filter housing 600 to rotate the fastener 170 and adjust the bypass valve 20 to the filtering position 480. The shaft 228 may be retained in the filter housing 600 and the body portion 12 may be inserted into the filter housing 600 around the shaft 228. Alternatively, the tool may be removed from the filter housing 600 and the body portion 12 may then be inserted into the filter housing 600 without the shaft 228 extending therethrough. In this way, the body portion 12 may define the receiving aperture 650 for receiving the shaft 228 or may have a solid surface between the projections 80, 84. The adjustment of the bypass valve 20 may be accomplished prior to the adjustment of the inlet and outlet valves 242, 244.

Figure 55:
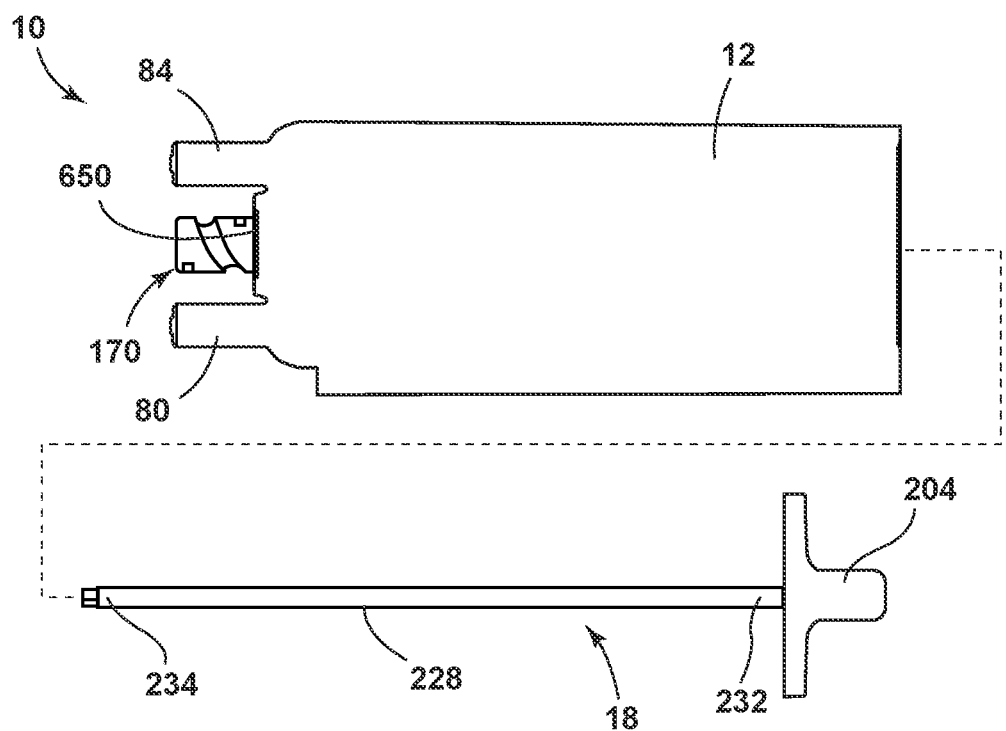
FIG. 55 is a schematic side elevational view of a filter unit with a removable portion of a bypass actuator, according to the present disclosure.
Figure 62:
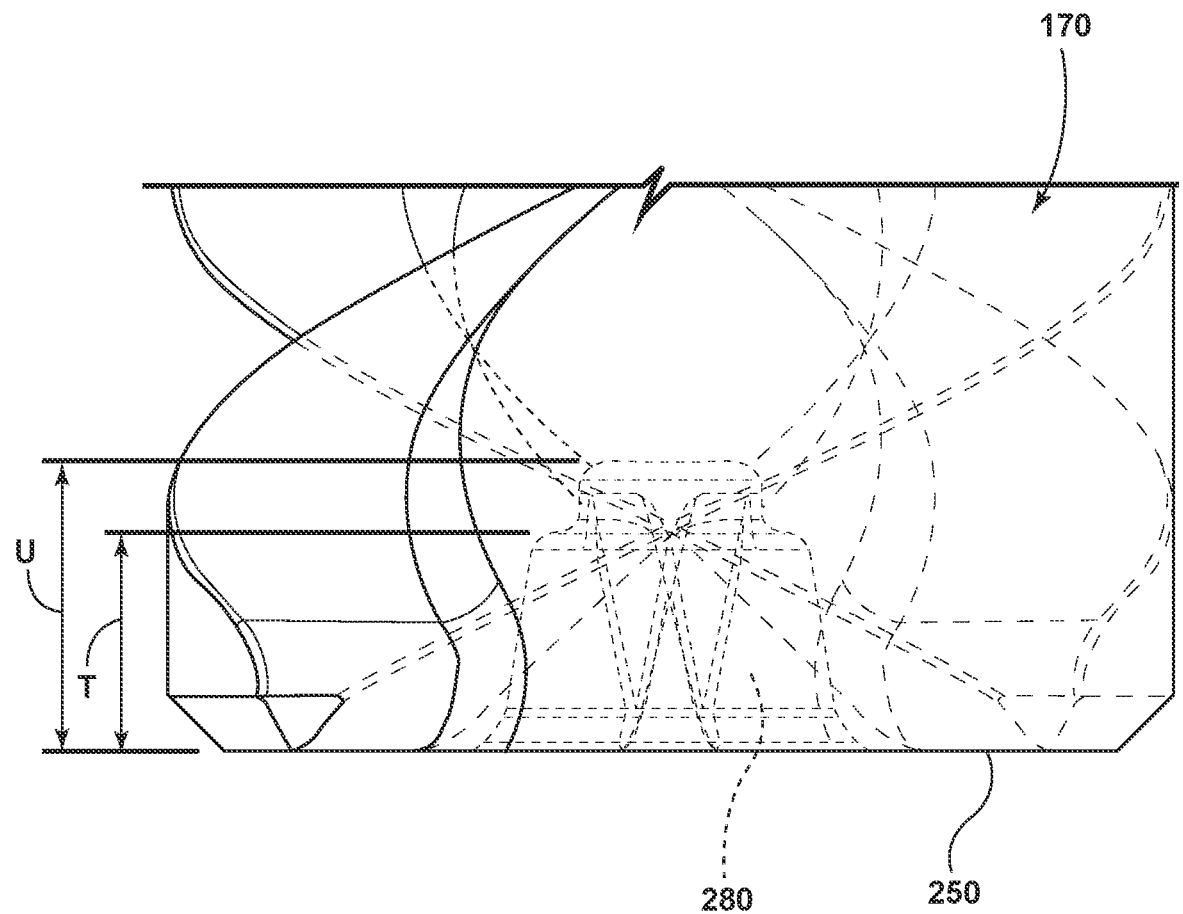
FIG. 62 is a partial side elevational view of a fastener for a filter unit bypass actuator, illustrating various dimensions of an interlock, according to the present disclosure.

Referring to FIG. 55, in various examples, certain aspects of the filter unit 10 may be removable and/or reusable. For example, as illustrated in FIG. 62, the filter unit 10 may include the body portion 12 housing the water filter 14 with the fastener 170 coupled to the body portion 12. The water filter 14 may be configured as an insert that can be replaced in the body portion 12. Additionally or alternatively, the body portion 12 with the water filter 14 and the fastener 170 may be a single unit. This may be interchanged to provide a new water filter 14 to the filter assembly 30. In such examples, the knob 204 and the shaft 228 of the bypass actuator 18 may be a separate unit that can be reused with the interchanging filter units 10. The shaft 228 may be inserted in the body portion 12 to engage the proximal end 190 of the fastener 170 to actuate the bypass valve 20.

With reference to FIGS. 1A-55, the filter assembly 30 utilizes axial and rotational movement of the bypass valve 20, which may be driven by axial movement of the bypass actuator 18, rotational movement of the bypass actuator 18, or a combination thereof. Additionally, actuation of the bypass valve 20 may be in combination with or separate from actuation of the inlet and outlet valves 242, 244. Further, actuation of the bypass valve 20 may be in combination with or separate from retention of the filter unit 10 to the fluid manifold 22.

With reference to FIGS. 56-63, various dimensions of features and relationships between features may be advantageous for actuating the inlet and outlet valves 242, 244, actuating the bypass valve 20, and retaining the filter unit 10 to the fluid manifold 22. Various measurements are described herein, which are merely exemplary, and are not limiting. Any practicable dimensions and/or relationships may be utilized without departing from the teachings herein.

As previously noted, the filter unit 10 can be positioned in the engaged state 450. When in the engaged state 450, the first projection 80, which defines the filter inlet 82, is disposed within the inlet port 340, the second projection 84, which defines the filter outlet 86, is disposed in the outlet port 342, and the fastener 170 is engaged with the bypass valve 20. The bypass valve 20 remains in the bypass position 374 in the engaged state 450, and the water flows through the bypass channel 376 and not the filter unit 10. The engaged state 450 may have a first engaged position 700, where the bypass valve 20 is engaged and in the bypass position 374, and a second engaged position 702, where the inlet and outlet valves 242, 244 are engaged and in the closed positions 350.

Figure 56:
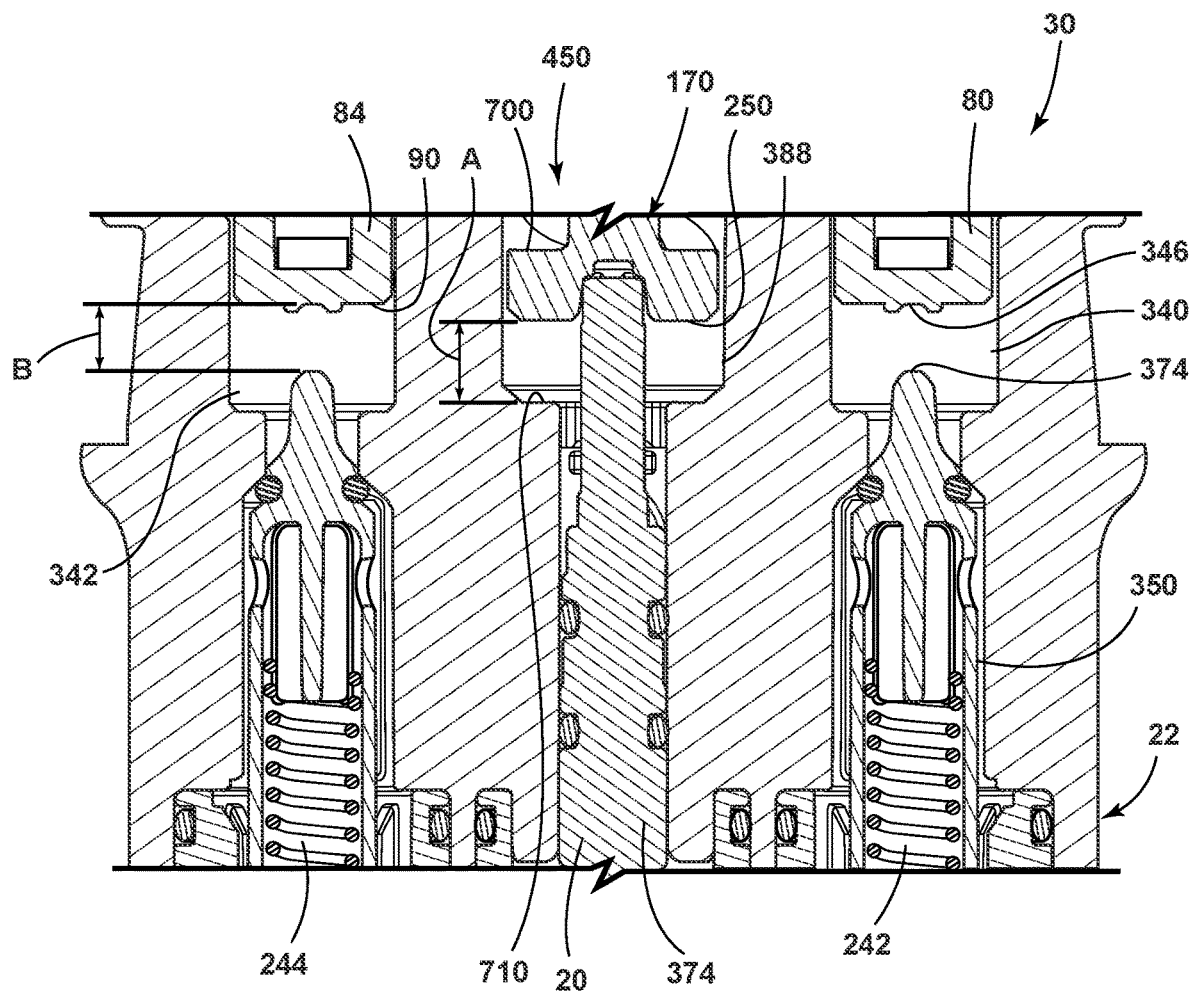
FIG. 56 is a partial cross-sectional view of a filter unit in a first engaging position relative to a fluid manifold and illustrating various dimensions, according to the present disclosure.

Referring to FIG. 56, the filter unit 10 is illustrated in the first engaged position 700 with the fastener 170 initially engaging the bypass valve 20. It is contemplated that this initial engagement with the bypass valve 20 may be prior to any axial movement or rotation of the bypass valve 20. The distal end 250 of the fastener 170 is spaced a distance A from a bottom 710 of the actuator port 388. The distance A may be a range between about 5 mm and about 12 mm. In certain aspects, the distance A is about 8.3 mm.

Further, when the fastener 170 initially engages the bypass valve 20 in the first engaged position 700, the first and second projections 80, 84 are spaced from the inlet and outlet valves 242, 244, respectively. The inlet and outlet valves 242, 244 remain in the closed positions 350. The distal ends 88, 90 of the first and second projections 80, 84 are spaced a distance B from the recesses 464 to the tips 346 of the inlet and outlet valves 242, 244, respectively. The distance B may be a range between about 3 mm and about 10 mm. In certain aspects, the distance B is about 5.8 mm.

Figure 57:
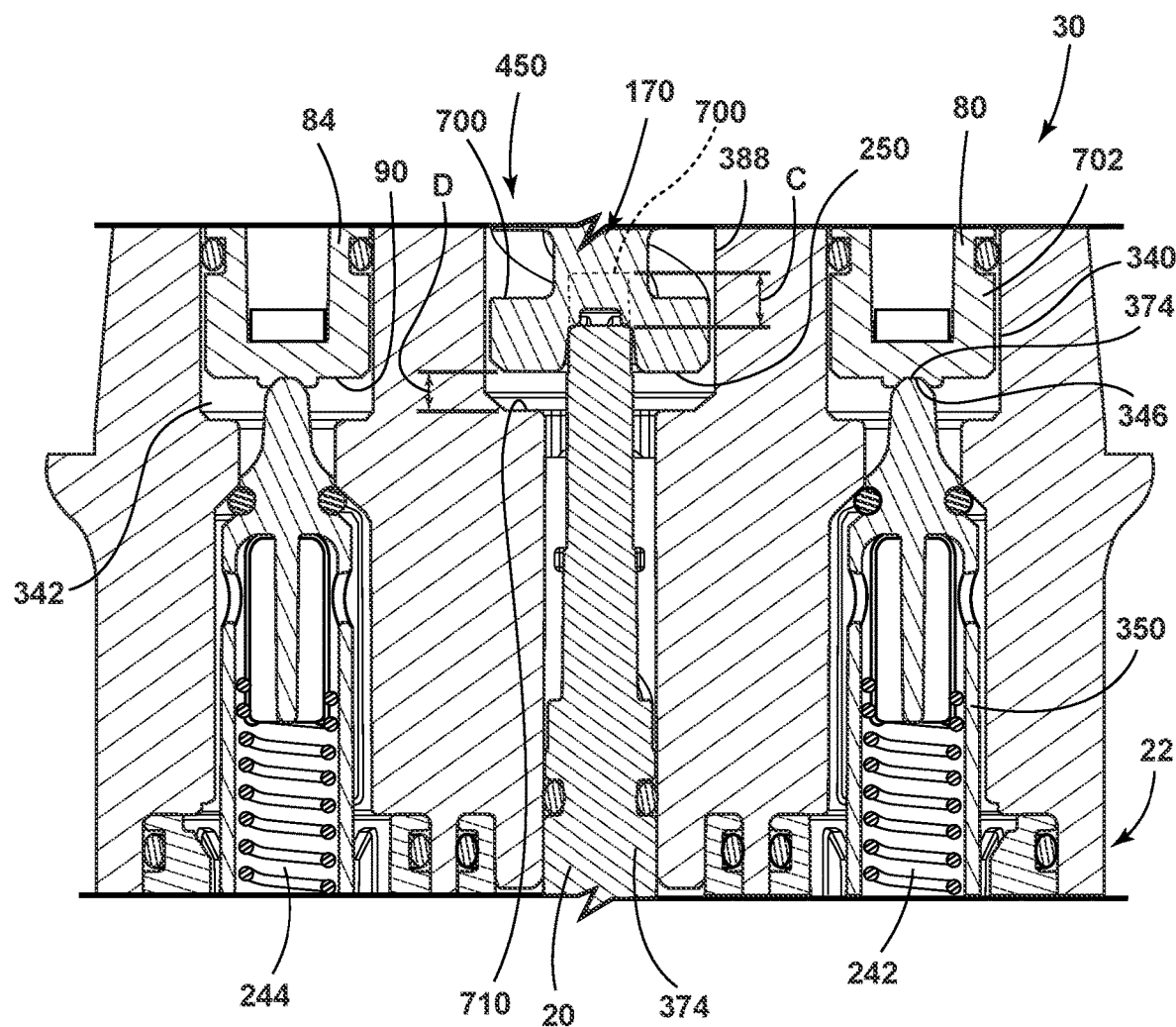
FIG. 57 is a partial cross-sectional view of a filter unit in a second engaging position relative to a fluid manifold and illustrating various dimensions, according to the present disclosure.

Referring to FIG. 57, the filter assembly 30 is illustrated in the second engaged position 702 where the first and second projections 80, 84 abut the inlet and outlet valves 242, 244 while the inlet and outlet valves 242, 244 are still in the closed positions 350. The filter unit 10 is moved further into the fluid manifold 22 relative to the first engaged position 700 (see FIG. 63). The bypass valve 20 is axially adjusted a distance C between the first engaged position 700 (illustrated in phantom) and the second engaged position 702 (illustrated in solid). The distance C may be between about 3 mm and about 10 mm. In a non-limiting example, the distance C may be about 5.8 mm.

Additionally, the fastener 170 is adjusted further into the actuator port 388 to the second engaged position 702. The distal end 250 of the fastener 170 is spaced a distance D from the bottom 710 of the actuator port 388 when the fastener 170 is in the second engaged position 702. The distance D may be between about 1 mm and about 5 mm. In certain aspects, the distance D may be about 2.4 mm.

Figure 58:
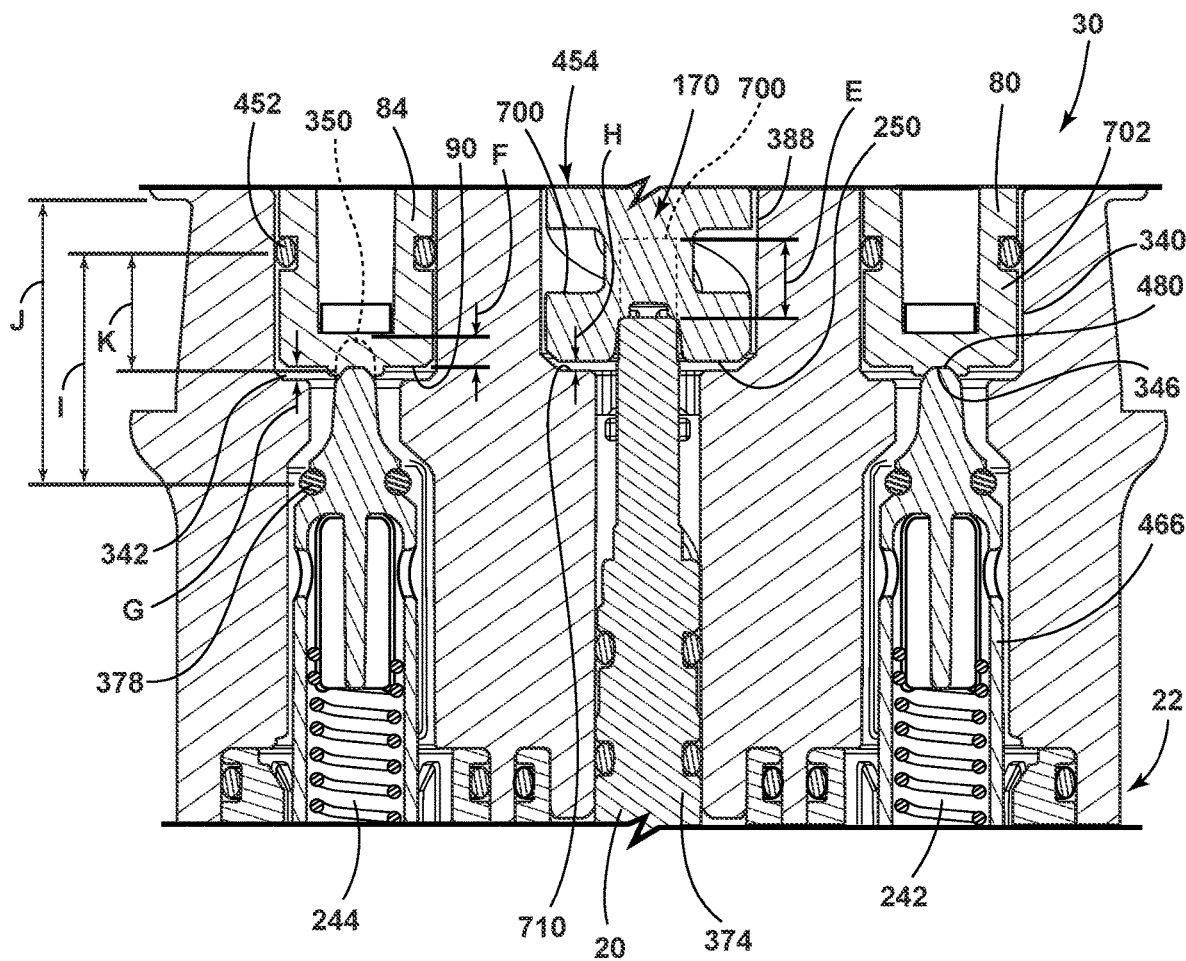
FIG. 58 is a partial cross-sectional view of a filter unit in an installed position relative to a fluid manifold, illustrating various dimensions, according to the present disclosure.

Referring to FIG. 58, the filter assembly 30 is illustrated in the installed state 454 where the inlet and outlet valves 242, 244 are in the opened positions 466 and the bypass valve 20 is in the filtering position 480. From the first engaged position 700 (illustrated in phantom) to the installed state 454 (illustrated in solid), the bypass valve 20 is configured to axially move a distance E. The distance E may be between about 4 mm and about 12 mm. In certain aspects, the distance E may be about 7.5 mm.

Additionally, the inlet and outlet valves 242, 244 are adjusted a distance F from the closed positions 350 (illustrated in phantom) to the opened positions 466 (illustrated in solid). The distance F may be between about 0.5 and about 5 mm. In a non-limiting example, the distance F is about 1.6 mm.

The tips 346 of the inlet and outlet valves 242, 244 sit within the recesses 464 of the first and second projections 80, 84, respectively. In the installed state 454, the tips 346 are disposed a distance G from a bottom 712 of the inlet and outlet ports 340, 342, respectively. The distance G may be in a range between about 0.5 mm and about 5 mm. In certain aspects, the distance G is about 1.2 mm.

Moreover, when in the installed state 454, the distal end 250 of the fastener 170 is spaced a distance H from the bottom 710 of the actuator port 388. The distance H may be between about 0.1 mm and about 3 mm. In a non-limiting example, the distance H may be about 0.8 mm.

Additionally, when in the installed state 454, the O-rings 452 on the first and second projections 80, 84 are spaced a distance I from the O-rings 378 on the respective inlet and outlet valves 242, 244. The distance I may be between about 10 mm and about 20 mm. In non-limiting examples, the distance I may be about 15.8 mm. Further, the O-rings 378 on the inlet and outlet valves 242, 244 are spaced a distance J from an opening 714 of the inlet and outlet ports 340, 342, respectively. The distance J may be between about 15 mm and about 25 mm. In certain aspects, the distance J is about 19.4 mm.

Additionally, the O-rings 452 on the projections 80, 84 are spaced a distance K from the tips 346 of the inlet and outlet valves 242, 244, respectively, when the filter unit 10 is in the installed state 454. The distance K may be in a range between about 5 mm and about 12 mm. In certain aspects, the distance K is about 7.9 mm.

Figure 59:
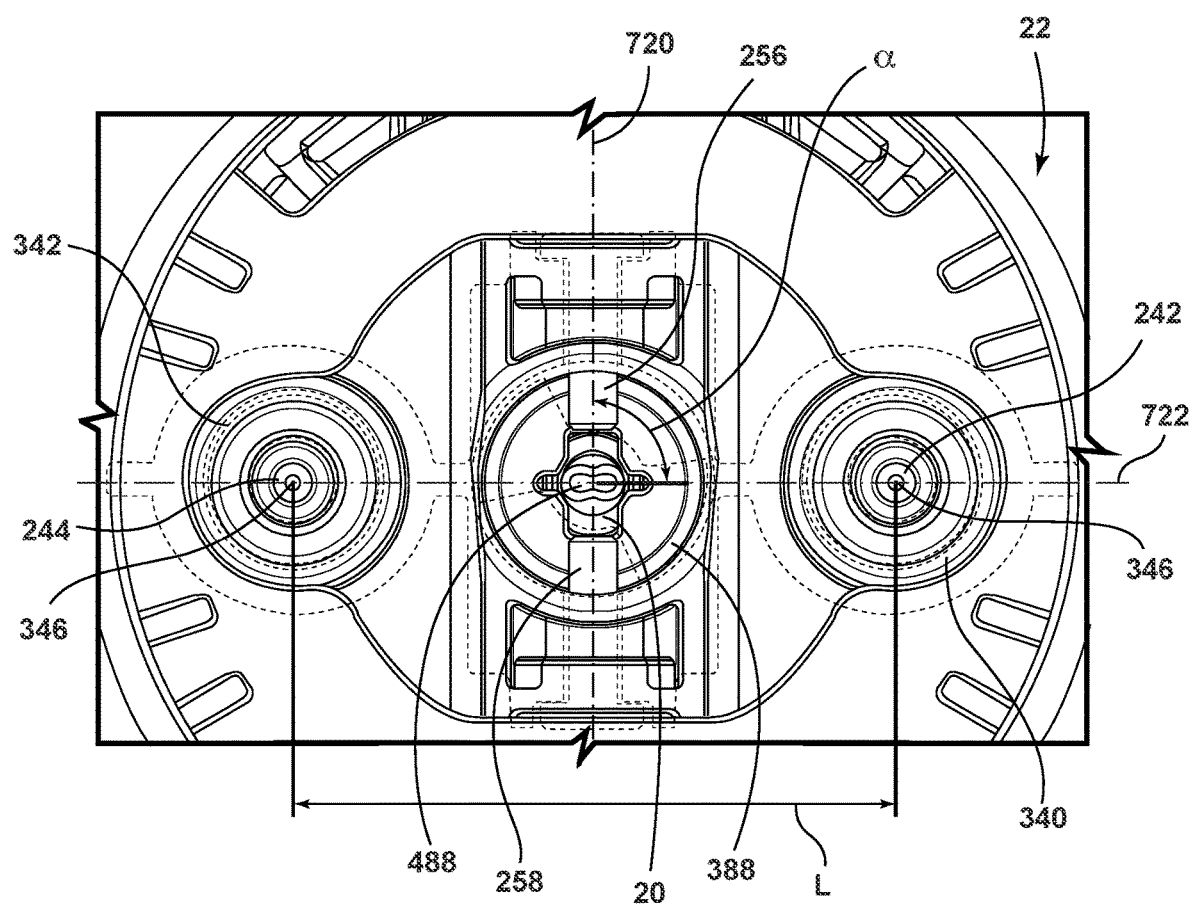
FIG. 59 is a partial top plan of a fluid manifold illustrating various dimensions, according to the present disclosure.

Referring to FIG. 59, a top plan view of the fluid manifold 22 is illustrated. The tips 346 of the inlet and outlet valves 242, 244 are spaced a distance L from one another. Generally, the distance L extends between a center point of each tip 346. The distance L may be between 30 mm and about 50 mm. In certain aspects, the distance L may be about 40 mm.

Additionally, a center axis 720 generally extends along a longitudinal extent of the retaining features 256, 258 and separates the inlet valve 242 from the outlet valve 244. Further, a line 722 extends between the tip 346 of the inlet valve 242 and the tip 346 of the outlet valve 244 and along a longitudinal extent of the mating feature 488 of the bypass valve 20. An angle α is defined between the center axis 720 and the line 722, such that the retaining features 256, 258 extend generally perpendicular to the line 722 extending between the inlet and outlet valves 242, 244 (e.g., the angle α is about 90°). Additionally, the retaining features 256, 258 generally extend perpendicularly relative to the longitudinal extent of the mating feature 488 in the bypass position 374.

Figure 60:
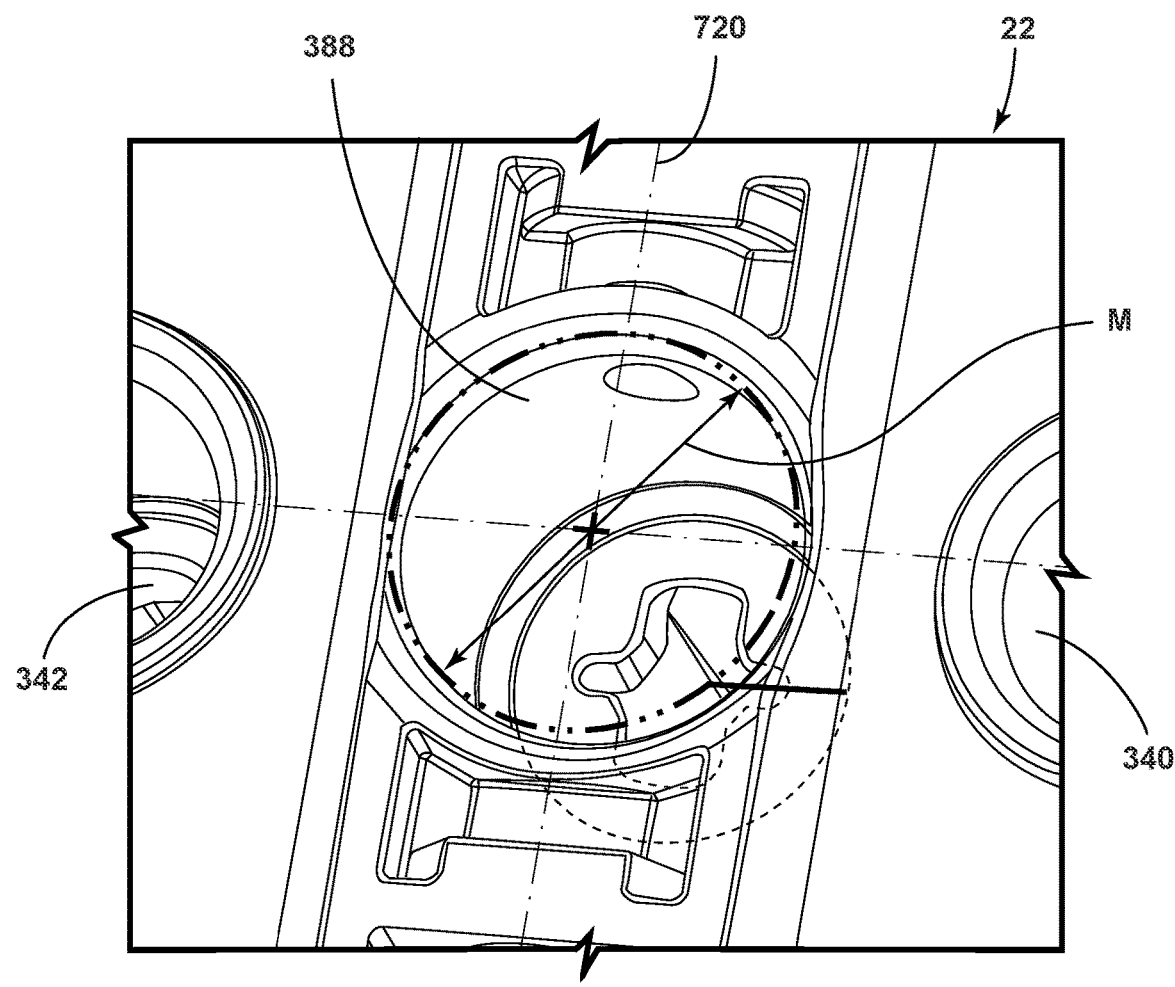
FIG. 60 is a partial perspective view of a fluid manifold having an actuator port and illustrating a dimension, according to the present disclosure.

Referring to FIG. 60, the actuator port 388 is illustrated. The actuator port 388 generally defines a circular cross-sectional shape having a diameter M. The diameter M may be between about 10 mm and about 20 mm. In certain aspects, the diameter M is about 15 mm. In other configurations of the fluid manifold 22, the measurement M may be a width of the actuator port 388, but may not be a diameter.

Figure 61:
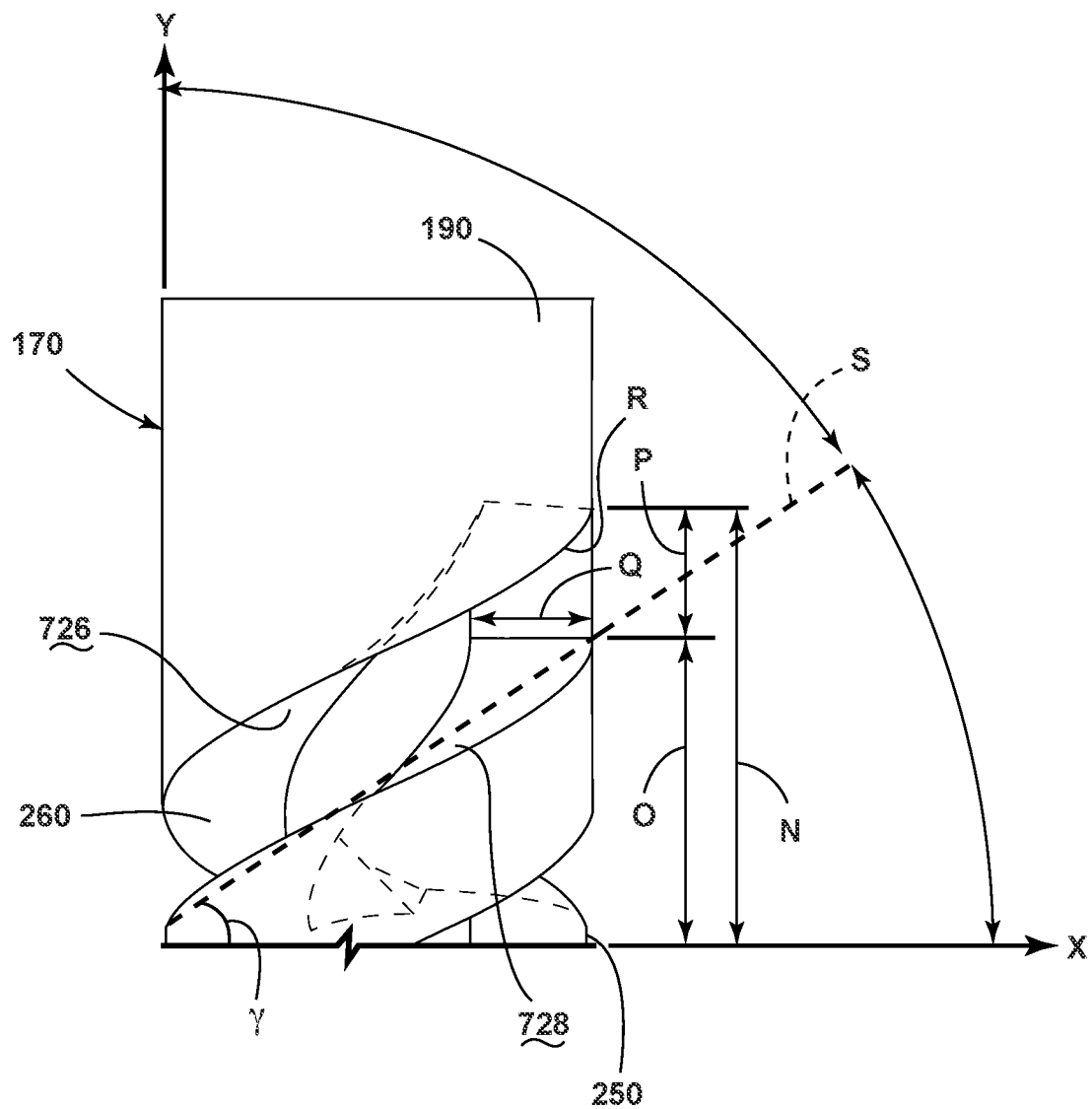
FIG. 61 is a side elevational view of a fastener for a filter unit bypass actuator, illustrating various dimensions, according to the present disclosure.

Referring to FIG. 61, one of the sloped grooves 260 of the fastener 170 is illustrated. It is contemplated that the second sloped groove 262 (FIG. 9) is substantially similar or identical to the sloped groove 260. The sloped groove 260 extends a distance N from the distal end 250 of the fastener 170. The distance N extends between the distal end 250 of the fastener 170 and an upper surface 726 of the sloped groove 260 closest to the proximal end 190 of the fastener 170 (e.g., generally adjacent to the detent 268). The distance N may be between about 8 mm and about 20 mm. In certain aspects, the distance N may be about 13.1 mm.

Additionally, a distance O extends between the distal end 250 of the fastener 170 and a lower surface 728 of the sloped groove 260 at the point closest to the proximal end 190 of the fastener 170 (e.g., generally adjacent to the detent 268). The distance O may be between about 5 mm and about 15 mm. The distance O may be about 9.4 mm.

A height P of the sloped grooves 260 or a distance P between the upper and lower surfaces 726, 728 may be in a range between 1 mm and about 7 mm. In certain aspects, the distance P is about 3.8 mm. A depth Q of the sloped groove 260 may be the distance between an outer surface 730 of the fastener 170 and an inner surface 732 of the sloped groove 260. The depth Q may be between about 1 mm and about 10 mm. The depth Q may be about 4.0 mm. The configuration of the fastener 170 allows for the fastener 170 to rotate about 180° from the engaged state 450 to the installed state 454.

The pitch R of the sloped groove 260 generally refers to spacing between the adjacent portions of the sloped groove 260. The pitch R may be in a range between about 15 mm and about 25 mm. In certain aspects, the pitch R is about 20 mm. Further, a slope S of the sloped groove 260 may be an angle γ defined by an x-axis and a y-axis. The slope S may be in a range between about 25° and about 50°. In certain aspects, the slope S may be about 34.0°.

Referring to FIG. 62, the interlock 280 of the fastener 170 is illustrated in phantom. The interlock 280 extends from the distal end 250 into an interior of the fastener 170. The interlock 280 generally extends a depth T into the fastener 170. The depth T may be between about 0.5 mm and about 5 mm. In certain aspects, the depth T is about 3.0 mm. In various examples, the interlock 280 has a central portion 740 that extends a greater distance U from the distal end 250. The distance U may be between about 0.5 mm and about 5 mm. The distance S may be about 3.5 mm. The central portion 740 may be advantageous for engaging with different configurations of the mating feature 488 of the bypass valve 20 (FIG. 27).

Figure 63:
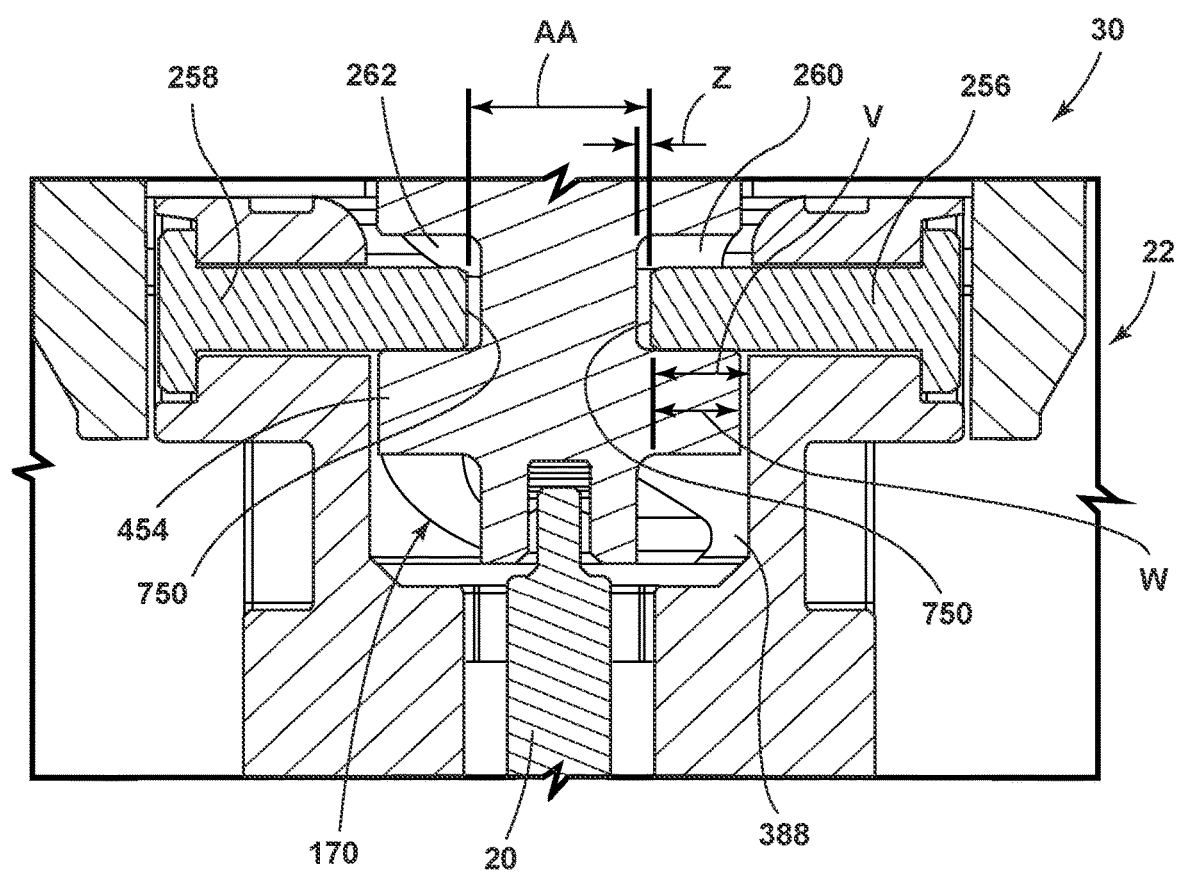
FIG. 63 is a partial cross-sectional view of a fastener of a filter unit engaging a fluid manifold, according to the present disclosure.

Referring to FIG. 63, the retaining features 256, 258 are illustrated engaging the fastener 170 when the fastener 170 is in the installed state 454. The retaining features 256, 258 extend a distance V into the actuator port 388. The distance V may be between about 1 mm and about 8 mm. The distance V may be about 3.9 mm. The retaining features 256, 258 extend a distance W into the fastener 170 (e.g., into the sloped grooves 260, 262, respectively). The distance W may be between about 1 mm and about 6 mm. In certain aspects, the distance W is about 3.5 mm. Ends 750 of the retaining features 256, 258 are spaced a distance Z from the inner surface 732 of the sloped grooves 260, 262, respectively. The distance Z may be between about 0.1 mm and about 3 mm. In a non-limiting example, the distance Z is about 0.5 mm. Further, the ends 750 are spaced a distance AA from one another. The distance AA may be between about 1 mm and about 15 mm. The distance AA may be about 7.0 mm.

These measurements described herein are exemplary to illustrate various relationships within the filter assembly 30. However, each of these measurements may be any practicable measurement for the filter unit 10 to be installed in the fluid manifold 22 and actuate the inlet and valves 242, 244 and the bypass valve 20.

Figure 64:
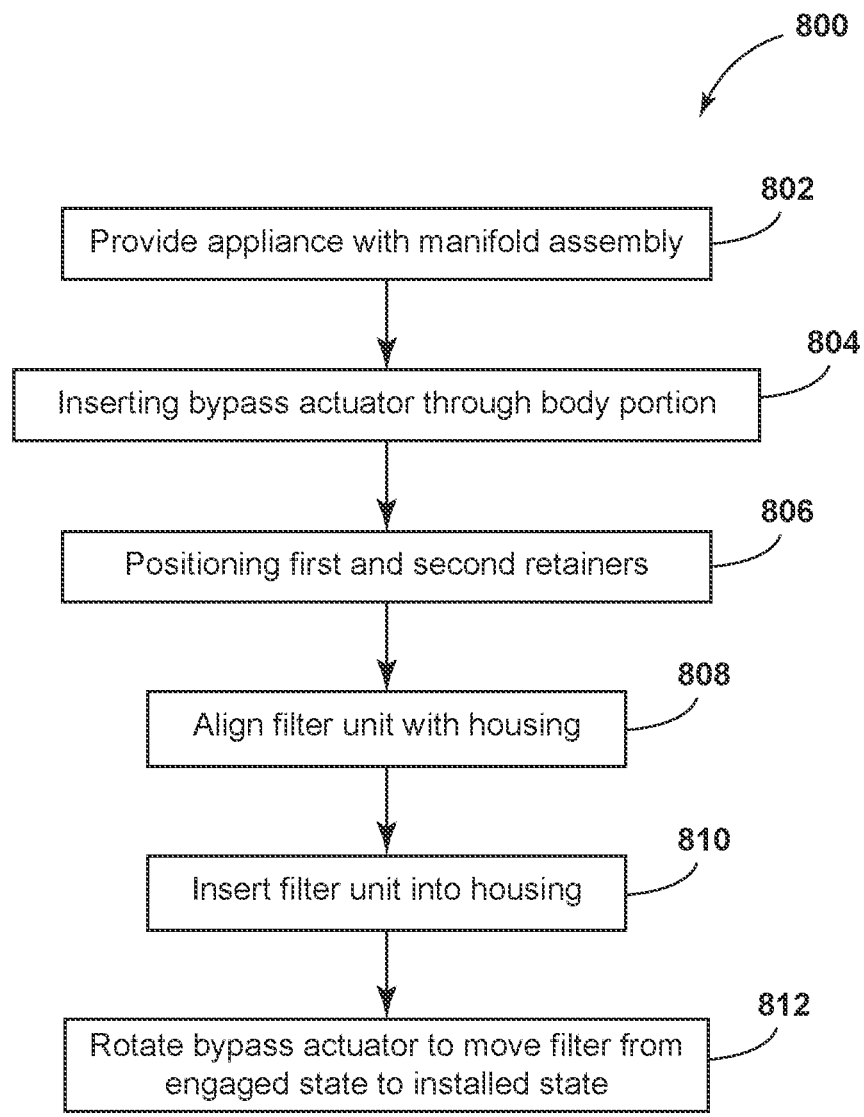
FIG. 64 is a flow diagram of a method of installing a filter unit, according to the present disclosure.

Referring to FIG. 64, and with further reference to FIGS. 1A-63, a method 800 of installing the filter unit 10 includes step 802 of providing the appliance 40 or structure with the fluid manifold 22. The fluid manifold 22 may be installed in the appliance 40 in any practicable manner that provides space for insertion of the filter unit 10. In step 802, the body portion 12 is provided and coupled with the engaging portion 16. The water filter 14 is inserted into the body portion 16. In step 804, the bypass actuator 18 is inserted through the water filter 14 and, consequently, through the body portion 12. In certain aspects, the bypass actuator 18 is also inserted through the engaging portion 16. Additionally or alternatively, in step 806, the first retainer 100 is disposed proximate to the first end 58 of the body portion 12. The second retainer 102 is disposed proximate the second end 60 of the body portion 12 and an edge or rim of the engaging portion 16 so the water filter 14 and a space housing the water filter 14 is sealed with respect to the engaging portion 16.

In step 808, the filter unit 10 is aligned with the filter housing 600. In certain aspects, the filter unit 10 includes the locating feature, which is exemplified herein as the lobe 54. The filter housing 600 and/or the insertion sleeve 622 defines a shape or configuration that aligns with the locating feature to indicate proper alignment of the filter unit 10 with the filter housing 600 and, consequently, the fluid manifold 22.

In step 810, the filter unit 10 is inserted into the filter housing 600 to be in the engaged state 450. The filter unit 10 is moved through the insertion sleeve 622 to abut the fluid manifold 22, without actuation of the valve assembly 24. Accordingly, the filter unit 10 is moved to the engaged state 450. Any latching features or the projections 640 on the insertion sleeve 622 or the filter unit 10 may be actuated or adjusted to assist in securing the filter unit 10.

In step 812, the bypass actuator 18 is rotated to move the filter unit 10 to the installed state 454. The bypass actuator 18 is rotated with respect to the water filter 14, the body portion 12, and the engaging portion 16 to axially engage the engaging portion 16 with the valve assembly 24 of the fluid manifold 22. During this movement, the fastener 170 engages the bypass valve 20 to move the bypass valve 20 from the bypass position 374 to the filtering position 480. Additionally, the first and second projections 80, 84 engage the inlet and outlet valves 242, 244 to move the inlet and outlet valves 242, 244 to the opened positions 466. In the installed state 454, the filter unit 10 allows fluid, such as water, to flow through the filter unit 10 (e.g., through the water filter 14) to be filtered and then flow out of the filter unit 10 into the tubing 38.

Figure 65:
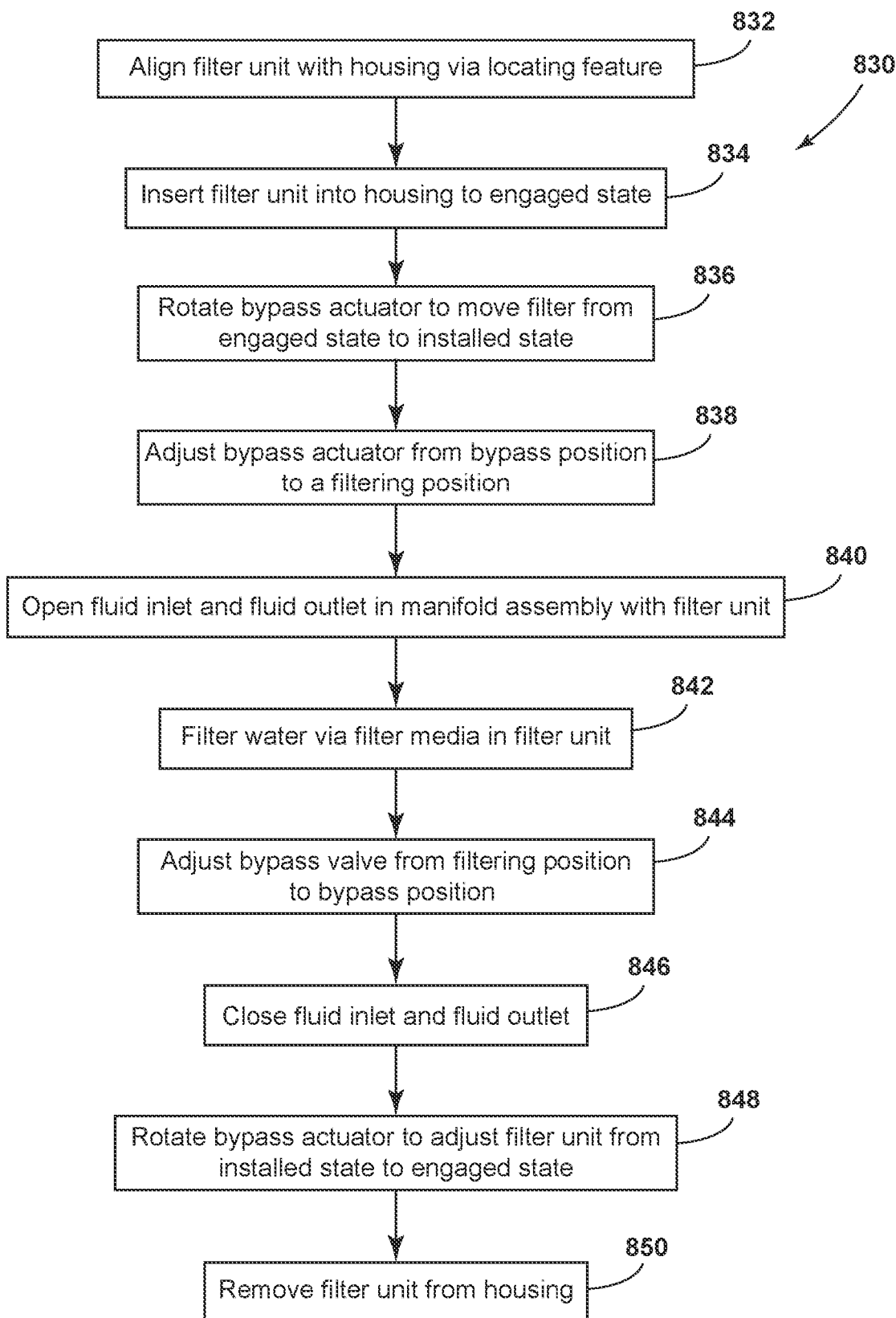
FIG. 65 is a flow diagram of a method of filtering water with a filter unit, according to the present disclosure.
Figure 66:
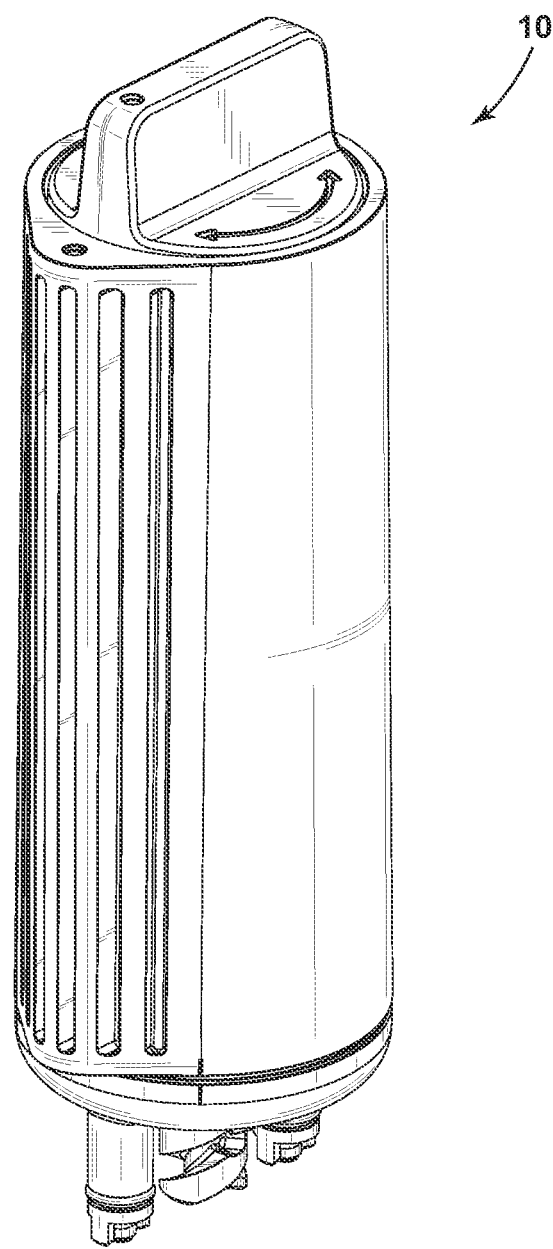
FIG. 66 is a side perspective view of a filter unit, according to the present disclosure.
Figure 67:
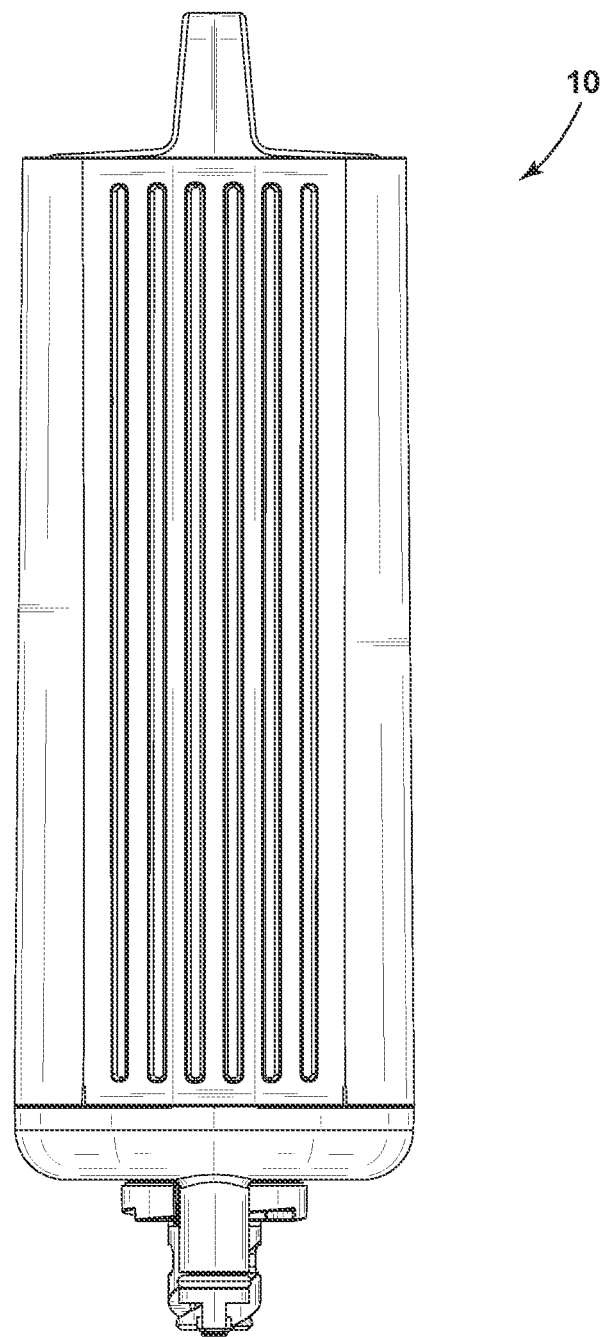
FIG. 67 is a side elevational view of a filter unit, according to the present disclosure.
Figure 68:
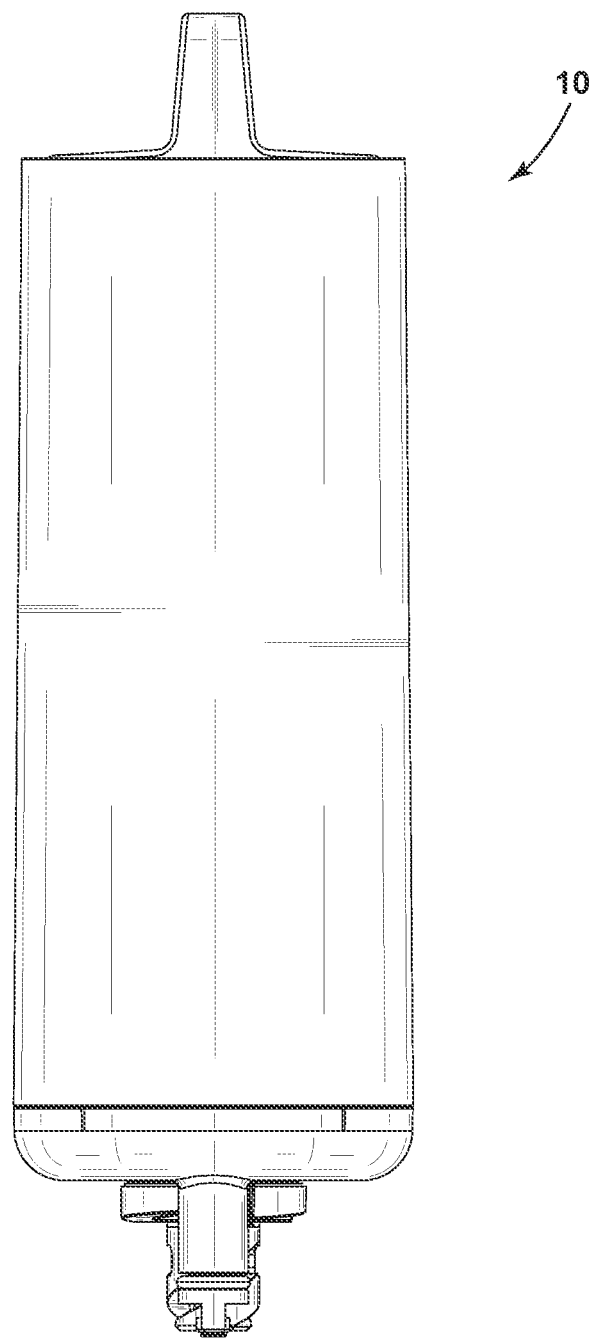
FIG. 68 is another side elevational view of a filter unit, according to the present disclosure.
Figure 69:
FIG. 69 is another side elevational view of a filter unit, according to the present disclosure.
Figure 70:
FIG. 70 is another side elevational view of a filter unit, according to the present disclosure.
Figure 71:
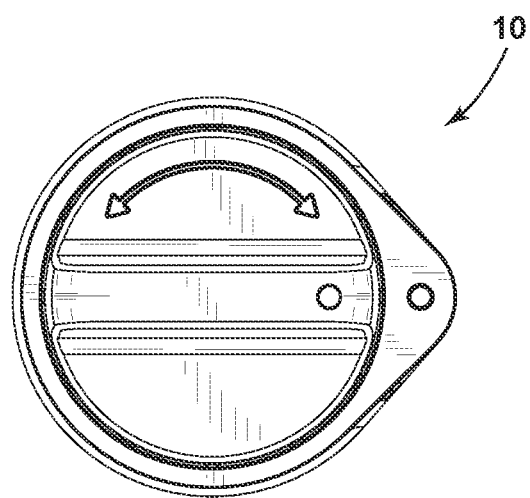
FIG. 71 is a first end plan view of a filter unit, according to the present disclosure.
Figure 72A:
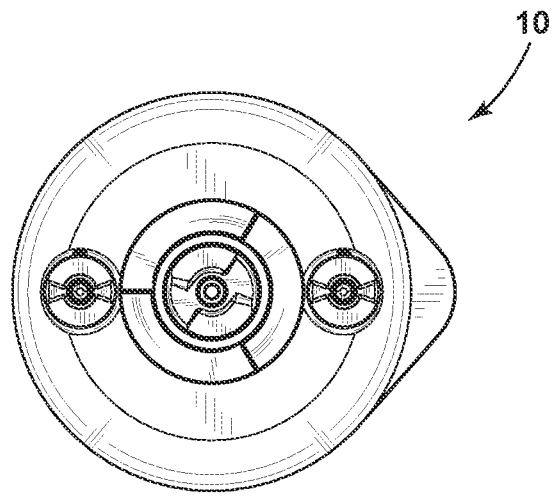
FIG. 72A is a second end plan view of a filter unit, according to the present disclosure.
Figure 72B:
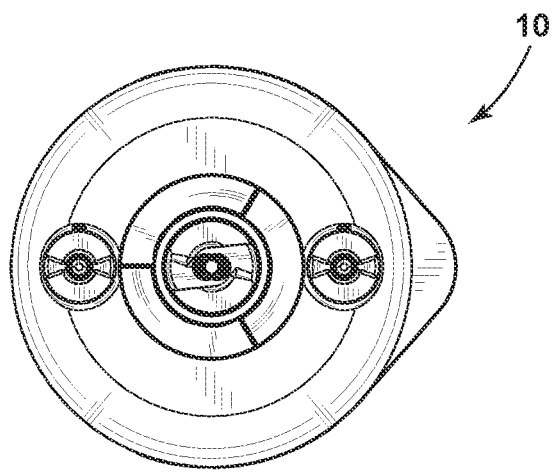
FIG. 72B is another second end plan view of a filter unit, according to the present disclosure.

Referring to FIG. 65, and with further reference to FIGS. 1A-63, a method 830 of filtering water with the filter unit 10 includes step 832 of aligning the filter unit 10 with the filter housing 600. The locating feature (e.g., the lobe 54) on the filter unit 10 is aligned with the insertion sleeve 622 of the filter housing 600, which is shaped to complement the filter unit 10. Further, the first indicator 570 on the body portion 12 may be aligned with the second indicator 572 on the knob 204. In step 834, the filter unit 10 is inserted into the filter housing 600 to the engaged state 450. Any latching features or the projections 640 on the insertion sleeve 622 or the filter unit 10 may be actuated or adjusted to assist in securing the filter unit 10.

In step 836, the bypass actuator 18 is rotated to move the filter unit 10 from the engaged state 450 to the installed state 454. The filter unit 10 is axially adjusted toward the fluid manifold 22. In step 838, the bypass valve 20 is moved from the bypass position 374 to the filtering position 480. Generally, the bypass valve 20 is rotated and moved axially within the fluid manifold 22 to move between the bypass position 374 and the filtering position 480. In step 840, the inlet and outlet valves 242, 244 are moved to the opened positions 466 to allow fluid to flow between the filter unit 10 and the fluid manifold 22. In step 842, water is filtered by the filter unit 10. The water flows from a source through the tubing 36, through the fluid manifold 22, through the filter inlet 82 of the filter unit 10, and into the body portion 12. The water flows through the water filter 14 to be filtered. Once filtered, the water flows through the filter outlet 86 of the filter unit 10, through the fluid manifold 22, and through the tubing 38 to an end location.

To remove the filter unit 10 from the fluid manifold 22, in step 844, the bypass valve 20 is adjusted from the filtering position 480 to the bypass position 374. The water flowing through the fluid manifold 22 is generally diverted through the bypass channel 376. In step 846, the inlet and outlet valves 242, 244 are adjusted to the closed positions 350. In step 848, the bypass actuator 18 is rotated to adjust the filter unit 10 from the installed state 454 to the engaged state 450. In step 850, the filter unit 10 is disengaged from the fluid manifold 22 and removed from the filter housing 600. It is understood that the steps of the methods 800, 830 may be performed in any order, simultaneously, independently, repeated, and/or omitted without departing from the teachings herein. Moreover, the methods 800, 830 may be performed in combination and/or independently.

The filter unit 10 disclosed herein is a pressure vessel for filtering fluid, which has a void extending through the body portion 12 thereof. The void or sleeve 156 extends through the entire body portion 12 to provide a space for the shaft 228 to engage the fastener 170. In various aspects, the sleeve 156 forms a solid wall, separating a space within the sleeve 156 from a space within the body portion 12 and outside of the sleeve 156. In such examples, the sleeve 156 defines a dry channel or void for the shaft 228 where fluid generally does not flow through.

In additional or alternative examples, the sleeve 156 may allow fluid communication between the space within the sleeve 156 and the space inside the body portion 12 and outside the sleeve 156. In such examples, the sleeve 156 defines a wet channel that receives the shaft 228 and allows fluid to flow therethrough. The sleeve 156 may be utilized to define the space for the water filter 14. Further, the sleeve 156 may separate the water filter 14 from the shaft 228, reducing potential interference with the rotation of the shaft 228 and, consequently, the bypass actuator 18. Alternatively, when the filter unit 10 includes the wet channel, the sleeve 156 may not be included in the filter unit 10. In such examples, the wet channel for the shaft 228 may be defined by the water filter 14.

Referring to FIGS. 1A-73B, the filter unit 10 is configured to engage the fluid manifold 22 to filter water. The bypass actuator 18 is configured to engage the fluid manifold 22 to retain the filter unit 10 in the installed state 454, move the bypass valve 20 to the filtering position 480, and axially move the filter unit 10 relative to the fluid manifold 22 for the projections 80, 84 to engage the inlet and outlet valves 242, 244. Typically, the projections 80, 84 respectively engage the inlet and outlet valves 242, 244. The bypass actuator 18 includes a variety of configurations and can be assembled as a single unit with the body portion 12 or as a separate feature. Further, the bypass actuator 18 may be a single unit or separate features. The filter unit 10 also includes various features, such as the lobe 54 and the indicators 570, 572, to assist the user in aligning the filter unit 10 with the fluid manifold 22. The filter unit 10 may be utilized in any practicable device or system for filtering water or fluid.

Use of the device of this disclosure may provide for a variety of advantages. For example, the engagement between the filter unit 10 and the fluid manifold 22 may provide a more precise initiation of filtering water through a slower opening of the inlet valve 242 and the outlet valve 244. This also may provide a better and/or more intuitive consumer experience through the installation and removal of the filter unit 10. Further, the fastener 170 engages the fluid manifold 22 and retains the filter unit 10 to the fluid manifold 22. Additionally, the filter unit 10 may have a more stable connection with the fluid manifold 22 as there are fewer moving components to provide the engagement. Moreover, the guide features 492, 494 of the bypass valve 20 operate to guide the rotational and axial motion of the bypass valve 20 driven by the fastener 170, which may help avoid filtering that is not intended or other undesired leakage. Additionally, the axial motion of the filter unit 10 relative to the fluid manifold 22 provides increased sealing between the fluid manifold 22 and the filter unit 10. Also, the substantially concurrent activation of the inlet valve 242, the outlet valve 244, and the bypass valve 20 minimizes leaks from installing the filter unit 10 into the fluid manifold 22. Additional benefits and advantages may be realized and/or achieved.

The device disclosed herein is further summarized in the following paragraphs and is further characterized by combinations of any and all of the various aspects described therein.

According to another aspect of the present disclosure, a filter unit includes a body portion that receives a water filter. An engaging portion is coupled to the body portion. A bypass actuator rotates relative to the engaging portion to rotationally and axially operate a bypass valve of a fluid manifold. The bypass actuator drives axial engagement of the engaging portion with a valve assembly of the fluid manifold. The bypass actuator extends through the body portion and the engaging portion.

According to another aspect, the bypass actuator rotates relative to the body portion.

According to yet another aspect, a sleeve extends through the body portion. The bypass actuator extends through the sleeve.

According to another aspect, the engaging portion includes a first projection defining an inlet and a second projection defining an outlet. The first projection and the second projection are configured to engage the valve assembly.

According to another aspect, the bypass actuator is disposed between and spaced from the inlet and the outlet.

According to another aspect, the bypass actuator, the inlet, and the outlet define a collinear arrangement.

According to another aspect of the present disclosure, a filter unit includes a bypass actuator configured to selectively engage a bypass valve of a fluid manifold. The bypass actuator is rotationally operable to drive each of a rotational motion of the bypass valve about a bypass rotational axis and an axial motion of the bypass valve along the bypass rotational axis. An engaging portion selectively cooperates with a rotational operation of the bypass actuator to axially engage a valve assembly of the fluid manifold in a direction parallel with the bypass rotational axis. The filter unit also includes a body portion. The bypass actuator is rotationally operable with respect to the body portion. The engaging portion is fixed with respect to the body portion.

According to another aspect, a bypass actuator is independently rotatable relative to an engaging portion and a body portion.

According to another aspect, a bypass actuator includes opposing retention structures that axially retain a bypass actuator relative to a body portion.

According to another aspect, a bypass actuator defines an interface for engaging a retaining feature of a fluid manifold.

According to another aspect, an interface includes a helical section.

According to another aspect, an engaging portion includes a projection defining an inlet.

According to another aspect, a bypass actuator extends through a body portion.

According to another aspect, a body portion receives a water filter. A bypass actuator extends through the water filter.

According to another aspect of the present disclosure, a filter unit includes an actuating assembly configured to selectively engage a fluid manifold in an engaged state. A bypass actuator is configured to selectively engage the fluid manifold when in the engaged state. The bypass actuator is rotationally operable relative to the actuating assembly. Rotation of the bypass actuator in the engaged state is configured to operate a bypass valve of the fluid manifold and also axially operate the actuating assembly relative to the valve assembly during operation from the engaged state to an installed state.

According to another aspect, a bypass actuator is axially fixed with respect to an actuating assembly.

According to another aspect, a bypass actuator is configured to abut a bypass valve in a mating engagement.

According to another aspect, an actuating assembly includes an engaging portion coupled to a body portion.

According to another aspect, a bypass actuator defines an interface for engaging a retaining feature of a fluid manifold. The interface includes a helical section.

According to another aspect, an interface includes a detent to retain a bypass actuator relative to a retaining feature of a fluid manifold.

According to another aspect, rotation of a bypass valve of a fluid manifold is configured to axially operate a bypass valve According to another aspect, rotation of a bypass actuator is configured to rotationally and axially operate a bypass valve.

According to another aspect, a filter unit is used with an appliance having a manifold assembly including one or more valves for control of fluid passing through the manifold assembly. The filter unit includes a substantially cylindrical body portion extending between a first end and a second end along a longitudinal axis. The first end is configured to be selectively inserted along the longitudinal axis towards the manifold assembly of the appliance. An inlet extension projects from the first end and is associated with an inlet valve of the manifold assembly. An outlet extension projects from the first end and is associated with an outlet valve of the manifold assembly. An actuator assembly extends from the first end along the longitudinal axis and is disposed between the inlet extension and outlet extension. The actuator assembly is configured to engage a bypass valve located within a recess in the manifold assembly when the first end is selectively inserted towards the manifold assembly. The actuator assembly includes a receptacle configured to secure the body portion to the manifold assembly to resist movement along the longitudinal axis.

According to another aspect, an actuator assembly is configured to rotate with respect to a first end.

According to another aspect, an actuator assembly is configured to rotate with respect to a first end to cause rotational motion of a bypass valve in a manifold assembly.

According to another aspect, an actuator assembly is configured to rotate with respect to a first end to secure a body portion to a manifold assembly and to resist movement along a longitudinal axis.

According to another aspect, a receptacle includes a groove that cooperates with a retainer formed in a manifold assembly.

According to another aspect, a groove is a helical shape that cooperates with a retainer projecting from a surface of a manifold assembly.

According to another aspect, a groove includes a detent to receive a retainer formed in a manifold assembly.

According to another aspect, a first end further includes a gasket which cooperates with a manifold assembly to form a seal which separates an inlet to a water filter from an outlet of a water filter.

According to another aspect, an actuator assembly extends through a body portion, a water filter, and to a second end.

According to another aspect, a filter unit for use in an appliance including a manifold assembly with a bypass valve includes a body portion that houses a water filter and has a first end for insertion towards the manifold assembly. The first end is configured to, when the first end is inserted into the manifold assembly, engage a valve assembly and resist rotational movement of the first end with respect to the manifold assembly. A bypass actuator is disposed at the first end and rotates with respect to the first end. The bypass actuator is configured to, when the first end is inserted into the manifold assembly, drive rotational and axial motion of the bypass valve of the manifold assembly.

According to another aspect, a first end includes an inlet extension associated with an inlet valve of a manifold assembly. The first end includes a first opening to allow water to flow from the inlet valve of a manifold assembly into a water filter. The inlet extension resists rotational movement of the first end with respect to the manifold assembly when inserted therein.

According to another aspect, a first end includes an outlet extension associated with an outlet valve of a manifold assembly. The first end includes a second opening to allow water to flow from an inlet valve of the manifold assembly into a water filter. An inlet extension resists rotational movement of the first end with respect to the manifold assembly when inserted therein.

According to another aspect, a gasket is disposed on a first end to separate an inlet valve of a manifold assembly from an outlet valve of the manifold assembly.

According to another aspect, a gasket is disposed on an inlet extension and a second gasket is disposed on an outlet extension to separate an inlet valve of a manifold assembly from an outlet valve of the manifold assembly by creating one or more seals therebetween.

According to another aspect, a knob is proximate a second end of a body portion and operatively connected to a bypass actuator.

According to another aspect, a bypass actuator, an inlet extension, and an outlet extension each project from a first end of a body portion by at least 1 cm in a same direction.

According to another aspect, a body portion includes a symmetrical plane that intersects an inlet extension, an outlet extension, and a bypass actuator.

According to another aspect, a bypass actuator includes an interlock for cooperating with a bypass valve in a manifold assembly.

According to another aspect, a bypass actuator includes a fastener which is configured to retain a first end to a manifold assembly.

According to another aspect, a filter unit includes an actuating assembly configured to selectively engage a fluid manifold in an engaged state. Fluid is configured to flow through a bypass channel of the fluid manifold when the actuating assembly is in the engaged state. The actuating assembly is configured to house a filter media. A bypass actuator extends through the actuating assembly and is configured to selectively engage the fluid manifold when in the engaged state. The bypass actuator is rotationally operable relative to the actuating assembly. Rotation of the bypass actuator in the engaged state is configured to operate a bypass valve of the fluid manifold and also axially operate the actuating assembly relative to a valve assembly of the fluid manifold during operation from the engaged state to an installed state. The fluid is configured to flow through the filter media when the actuating assembly is in the installed state.

According to another aspect, a rotatable fastener is also configured to drive rotational and axial movement of a bypass valve in a manifold assembly while the rotatable fastener is selectively securing a body portion to a manifold assembly.

According to another aspect, an extension is configured to activate a valve of a manifold assembly while a rotatable fastener is selectively securing a body portion to a manifold assembly.

According to another aspect, a rotatable fastener includes at least a receptacle configured to secure a body portion to a manifold assembly to resist movement in a second direction.

According to another aspect, a rotatable fastener extends from an elongated body portion and at least partially into a recess located in a manifold assembly that includes a bypass valve.

According to another aspect, an extension includes an opening for fluid passage between a manifold and a water filter.

According to another aspect, a filter unit includes a body portion that receives a water filter and a fluid directing end coupled to the body portion. The fluid directing end includes a fluid inlet configured to receive water from a water source and a fluid outlet configured to expel the water from said filter unit. A bypass actuator extends through the body portion. The bypass actuator has an actuating end positioned between the fluid inlet and the fluid outlet and an operating end positioned at an opposing end of the body portion. The bypass actuator is rotationally operable about a rotational axis relative to the fluid inlet and the fluid outlet. A reference plane extends through the fluid inlet and the fluid outlet and includes the rotational axis of the bypass actuator. The actuating end of the bypass actuator includes a sloped channel having a receiving section that intersects the reference plane at an engaging portion of the reference plane. Rotation of the bypass actuator translates the sloped channel through the reference plane from the engaging portion to an installed portion of the reference plane. The axial distance from the engaging portion to the installed portion represents an insertion depth of the fluid inlet and the fluid outlet relative to the water source.

According to another aspect, a filter unit includes an actuating assembly that has a body portion defining a hollow interior for housing a water filter. The body portion includes a first end and a second end. The actuating assembly also includes a fluid delivery portion coupled to the second end of the body portion. The fluid delivery portion includes a first projection defining an inlet and a second projection defining an outlet. The first projection is spaced from the second projection. A bypass actuator extends through the actuating assembly. The bypass actuator includes a knob disposed proximate the first end of the body portion and a fastener disposed within the space defined between the first projection and the second projection. The fastener rotates relative to the fluid portion end. The fastener, the first projection, and the second projection define a collinear arrangement. The fastener defines at least one sloped groove extending from a distal end toward a proximal end of the fastener. The bypass actuator also includes a shaft coupling the knob and the fastener. Rotation of the knob causes rotation of the fastener. The shaft extends through the hollow interior of the body portion.

According to another aspect, a first end of a body portion includes a recessed region defining a receiving space. A knob is disposed at least partially within the receiving space.

According to another aspect, a body portion includes a lobe extending along a length thereof.

According to another aspect, a fastener includes a radial flange. A cover is disposed proximate to the radial flange and is coupled to a fluid delivery portion to retain the fastener in an axial position relative to the fluid delivery portion.

According to another aspect, a fluid delivery portion includes a sleeve that extends into a hollow interior of a body portion.

According to another aspect, a shaft extends through a sleeve.

According to another aspect, at least one sloped groove includes a first sloped groove and a second sloped groove. An opening of the first sloped groove at a distal end is on an opposing side of a fastener relative to an opening of the second sloped groove.

According to another aspect, each of a first sloped groove and a second sloped groove include a helical section.

According to another aspect, a filter unit includes a body portion that receives a water filter. An engaging portion is coupled to the body portion. A bypass actuator has an operating end and a fastener. The operating end causes rotation of the fastener to rotationally and axially operate a bypass valve of a fluid manifold. The bypass actuator is configured to drive axial engagement of the engaging portion with a valve assembly of the fluid manifold. The bypass actuator extends through the body portion and the engaging portion.

According to another aspect, rotational motion of an operating end causes rotation of a fastener.

According to another aspect of the present disclosure, a filter unit includes a body portion that receives a water filter. An engaging portion is coupled to the body portion. A bypass actuator moves relative to the engaging portion to rotationally and axially operate a bypass valve of a fluid manifold. The bypass actuator drives axial engagement of the engaging portion with a valve assembly of the fluid manifold. The bypass actuator extends through the body portion and the engaging portion.

According to another aspect, a bypass actuator is configured to drive direct rotational and axial movement of a bypass valve.

According to another aspect, a bypass actuator is configured to drive proportional rotational and axial movement of a bypass valve.

According to another aspect, proportional rotational and axial movement of a bypass valve is configured to be a 1:1 relationship driven by a bypass actuator.

According to another aspect, a bypass actuator is configured to drive simultaneous rotational and axial movement of a bypass valve.

According to another aspect, a bypass actuator for a filter unit includes a shaft having a first end and a second end. A fastener has a proximal end and a distal end. The proximal end of the fastener is coupled to the first end of the shaft. The fastener defines sloped grooves that extend from the distal end toward the proximal end for receiving retaining features of a fluid manifold, and wherein each sloped groove includes a helical section.

According to another aspect, a method of installing a filter unit includes inserting a water filter section into a filter unit body portion having an engaging portion; inserting a bypass actuator through the water filter section, the filter unit body portion, and the engaging portion; and rotating the bypass actuator with respect to the water filter section and the engaging portion to axially engage the engaging portion with a valve assembly of a fluid manifold. The water filter section has a first retainer that is disposed proximate a first end of the body portion and a second retainer disposed proximate a second end of the body portion and a rim of the engaging portion so that the water filter section is sealed with respect to the engaging portion.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A filter unit, comprising:
   a body portion configured to receive a water filter;
   an engaging portion coupled to the body portion, wherein the engaging portion includes:
      a first projection defining an inlet; and
      a second projection defining an outlet; and
   a bypass actuator extending through the body portion and the engaging portion, wherein the bypass actuator includes:
      an actuating end positioned between the inlet and the outlet, wherein the actuating end defines an interlock for engaging a bypass valve of a fluid manifold and an interface for engaging retaining features of the fluid manifold, and wherein the interface includes a helical section;
      an operating end positioned at an opposing end of the body portion relative to the actuating end, wherein rotation of the operating end causes rotation of the actuating end; and
      a shaft coupled to the actuating end and the operating end, wherein the bypass actuator is configured to rotate relative to the engaging portion and the body portion to rotationally and axially operate the bypass valve, and wherein the bypass actuator is further configured to drive axial engagement of the engaging portion with a valve assembly of the fluid manifold.

2. The filter unit of claim 1, wherein the engaging portion is configured to selectively engage the fluid manifold in an engaged state, and wherein fluid is configured to flow through a bypass channel of the fluid manifold when the engaging portion is in the engaged state, and wherein rotation of the bypass actuator in the engaged state is configured to operate the bypass valve of the fluid manifold and also axially operate the engaging portion relative to the valve assembly during operation from the engaged state to an installed state, and further wherein the fluid is configured to flow through the water filter when the engaging portion is in the installed state.

3. The filter unit of claim 1, wherein the bypass actuator, the inlet, and the outlet define a collinear arrangement.

4. The filter unit of claim 1, wherein the bypass actuator is independently rotatable relative to the engaging portion and the body portion, and wherein the engaging portion is fixed with respect to the body portion.

5. The filter unit of claim 1, further comprising:
   a sleeve extending through the body portion, wherein the bypass actuator extends through the sleeve.

6. The filter unit of claim 1, wherein the bypass actuator is axially fixed with respect to the engaging portion and the body portion.

7. The filter unit of claim 1, wherein the operating end includes a knob, and wherein the actuating end includes a fastener.

8. The filter unit of claim 7, wherein the fastener defines a sloped groove extending from a distal end toward a proximal end of the fastener, and wherein the sloped groove includes the helical section.

9. The filter unit of claim 7, wherein the fastener includes a radial flange, and wherein a cover is disposed proximate to the radial flange and is coupled to the engaging portion to retain the fastener in an axial position relative to the engaging portion.

10. The filter unit of claim 7, wherein the fastener defines a first sloped groove and a second sloped groove, wherein an opening of the first sloped groove at a distal end of the fastener is on an opposing side of the fastener relative to an opening of the second sloped groove.

11. The filter unit of claim 1, wherein the body portion includes a lobe extending along a length thereof.

12. The filter unit of claim 1, wherein the bypass actuator is configured to drive simultaneous and proportional rotational and axial movement of the bypass valve.

13. The filter unit of claim 2, wherein the operating end includes a knob, and wherein the actuating end includes a fastener.

14. The filter unit of claim 13, wherein the fastener defines a first sloped groove and a second sloped groove, wherein an opening of the first sloped groove at a distal end of the fastener is on an opposing side of the fastener relative to an opening of the second sloped groove.

15. The filter unit of claim 14, wherein the bypass actuator is independently rotatable relative to the engaging portion and the body portion, and wherein the engaging portion is fixed with respect to the body portion.

16. The filter unit of claim 15, wherein the bypass actuator is axially fixed with respect to the engaging portion and the body portion.

17. The filter unit of claim 16, wherein the bypass actuator is configured to drive simultaneous and proportional rotational and axial movement of the bypass valve.

18. The filter unit of claim 17, wherein the bypass actuator, the inlet, and the outlet define a collinear arrangement.

19. The filter unit of claim 18, further comprising:
   a sleeve extending through the body portion, wherein the bypass actuator extends through the sleeve.

20. The filter unit of claim 19, wherein the body portion includes a lobe extending along a length thereof.

* * * * *